US011987064B2

(12) United States Patent
Murayama

(10) Patent No.: US 11,987,064 B2
(45) Date of Patent: May 21, 2024

(54) CASSETTE

(71) Applicant: BROTHER KOGYO KABUSHIKI KAISHA, Nagoya (JP)

(72) Inventor: Kentaro Murayama, Kasugai (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 87 days.

(21) Appl. No.: 17/489,713

(22) Filed: Sep. 29, 2021

(65) Prior Publication Data

US 2022/0016918 A1 Jan. 20, 2022

Related U.S. Application Data

(63) Continuation of application No. PCT/JP2020/011087, filed on Mar. 13, 2020.

(30) Foreign Application Priority Data

Mar. 31, 2019 (JP) ................................ 2019-069561

(51) Int. Cl.
*B41J 32/00* (2006.01)
*B41J 3/36* (2006.01)
(Continued)

(52) U.S. Cl.
CPC ................ *B41J 32/00* (2013.01); *B41J 3/36* (2013.01); *B41J 15/044* (2013.01); *B41J 15/06* (2013.01); *B41J 31/10* (2013.01)

(58) Field of Classification Search
None
See application file for complete search history.

(56) References Cited

U.S. PATENT DOCUMENTS 3,672,603 A 6/1972 Swain
3,804,227 A 4/1974 Cappotto et al.
(Continued)

FOREIGN PATENT DOCUMENTS

CA 1119549 A 3/1982
CN 1769059 A 5/2006
(Continued)

OTHER PUBLICATIONS

Japanese Office Action for the related Japanese Patent Application No. 2019-069561 dated Nov. 1, 2022.
(Continued)

*Primary Examiner* — Matthew G Marini
(74) *Attorney, Agent, or Firm* — KENEALY VAIDYA LLP

(57) ABSTRACT

A cassette includes a printing tape roll being rotatable and into which a printing tape as a medium to be printed is wound, and an outer peripheral wall disposed on one side in a first direction relative to the printing tape roll. The first direction is a width direction of the printing tape. The outer peripheral wall includes a first side wall extending in a second direction orthogonal to the first direction, a second side wall extending in a third direction orthogonal to the first direction and intersecting with the second direction, and a recess wall defining a recess extending from the second side wall toward one side in the second direction. The recess extends in the third direction on one side in the second direction further than the second side wall. At least a portion of the recess overlaps the printing tape roll in the first direction.

21 Claims, 54 Drawing Sheets

(51) Int. Cl.

| | |
|---|---|
| ***B41J 15/04*** | (2006.01) |
| ***B41J 15/06*** | (2006.01) |
| ***B41J 31/10*** | (2006.01) |

(56) References Cited

U.S. PATENT DOCUMENTS

| | | | | | |
|---|---|---|---|---|---|
| 3,823,808 | A | | 7/1974 | Murata et al. | |
| 4,034,935 | A | | 7/1977 | Plaza et al. | |
| 4,402,619 | A | | 9/1983 | Paque et al. | |
| 4,668,961 | A | | 5/1987 | Hiramatsu | |
| 5,216,441 | A | | 6/1993 | Isobe | |
| 5,618,119 | A | | 4/1997 | Misu et al. | |
| 6,135,657 | A | * | 10/2000 | Martinez | B41J 33/52 400/208 |
| 9,415,618 | B2 | | 8/2016 | Cao et al. | |
| 2006/0092193 | A1 | | 5/2006 | Block et al. | |
| 2007/0172293 | A1 | | 7/2007 | Vandermeulen | |
| 2010/0202816 | A1 | | 8/2010 | Block et al. | |
| 2011/0143073 | A1 | | 6/2011 | Vandermeulen | |
| 2015/0360493 | A1 | | 12/2015 | Cao et al. | |
| 2016/0176210 | A1 | | 6/2016 | Tanaka | |
| 2016/0368294 | A1 | * | 12/2016 | Sakano | B41J 17/32 |
| 2017/0190195 | A1 | | 7/2017 | Kosuge et al. | |
| 2018/0056681 | A1 | | 3/2018 | Du et al. | |

FOREIGN PATENT DOCUMENTS

| | | | | | |
|---|---|---|---|---|---|
| CN | 104417103 | A | | 3/2015 | |
| CN | 105612059 | A | | 5/2016 | |
| CN | 105799335 | A | | 7/2016 | |
| CN | 207224868 | U | | 4/2018 | |
| CN | 207630759 | U | | 7/2018 | |
| EP | 0473132 | A2 | | 3/1992 | |
| EP | 2310208 | A1 | | 4/2011 | |
| GB | 2016411 | A | | 9/1979 | |
| JP | S50-36734 | B1 | | 11/1975 | |
| JP | S54-111914 | A | | 9/1979 | |
| JP | S59-95180 | A | | 6/1984 | |
| JP | S60-36255 | U | | 3/1985 | |
| JP | S60-48456 | U | | 4/1985 | |
| JP | S60-224571 | A | | 11/1985 | |
| JP | S63-156762 | U | | 10/1988 | |
| JP | H02-9562 | U | | 1/1990 | |
| JP | H02-37568 | Y2 | | 10/1990 | |
| JP | H03-284973 | A | | 12/1991 | |
| JP | H4-110172 | A | | 4/1992 | |
| JP | H04-152176 | A | | 5/1992 | |
| JP | 06-328800 | A | * | 11/1994 | |
| JP | H06-328800 | A | | 11/1994 | |
| JP | H08-39908 | A | | 2/1996 | |
| JP | H8-90877 | A | | 4/1996 | |
| JP | H11-240232 | A | | 9/1999 | |
| JP | 2001-096875 | A | | 4/2001 | |
| JP | 2002308518 | A | * | 10/2002 | B41J 15/044 |
| JP | 2004-255656 | A | | 9/2004 | |
| JP | 2008-023823 | A | | 2/2008 | |
| JP | 2009-196804 | A | | 9/2009 | |
| JP | 2011-37223 | A | | 2/2011 | |
| JP | 2017226226 | A | * | 12/2017 | B41J 11/009 |
| WO | 2010/015666 | A1 | | 2/2010 | |
| WO | 2010/125127 | A1 | | 11/2010 | |

OTHER PUBLICATIONS

The Extended European Search Report for the corresponding European patent application No. 20783843.4. dated Oct. 18, 2022.
Chinese Office Action for the related Chinese Patent Application No. 202080026096.2 dated May 6, 2022.
International Preliminary Report on Patentability and English language Written Opinion of the International Search Report for PCT/JP2020/011087 dated Sep. 28, 2021.
Chinese Office Action for the related Chinese Patent Application No. 202080026096.2 dated Dec. 14, 2022.
International Search Report and Written Opinion of the International Search Report for PCT/JP2020/011087 dated Apr. 28, 2020.
Russian Office Action for the related Russian Patent Application No. 2021128436 dated Jun. 8, 2023.
Indian Office Action for the related Indian Patent Application No. 202117043905 dated Apr. 20, 2023.
Philippine Office Action for the related Philippine Patent Application No. 1/2021/552450 dated Jul. 25, 2023.
Brazilian Office Action for the related Brazilian Patent Application No. 112021019447-9 dated Nov. 14, 2023.

* cited by examiner

CASSETTE

CROSS-REFERENCE TO RELATED APPLICATION

This is a continuation application of International Application No. PCT/JP2020/011087 filed on Mar. 13, 2020 which claims priority from Japanese Patent Application No. 2019-069561 filed on Mar. 31, 2019. The entire contents of the earlier applications are incorporated herein by reference.

TECHNICAL FIELD

The disclosure relates to a cassette to be detachably attached to a printing device.

BACKGROUND

A known cassette includes a tape and an ink ribbon for printing on the tape. For example, an ink ribbon cartridge includes a ribbon cartridge and a printing sheet cartridge. The ribbon cartridge accommodates an ink ribbon and a take-up spool for taking up the ink ribbon. The printing sheet cartridge accommodates a printing sheet. Set claws are provided on an outer peripheral wall of the printing sheet cartridge. The printing sheet cartridge and the ribbon cartridge are joined to each other by engagement of the set claws with the ribbon cartridge in a state where the printing sheet cartridge is placed on an upper side of the ribbon cartridge. The ribbon cartridge has a head opening to receive a head of the printing device. In the printing sheet cartridge, a sheet opening that allows the printing sheet to pass therethrough is provided at a position opposite to the head opening with respect to a roll of the printing sheet. The printing sheet is drawn from the roll to the outside of the printing sheet cartridge through the sheet opening. Thereafter, the printing sheet runs along and around the outer peripheral wall of the printing sheet cartridge and passes through the head opening. In the head opening, the printing sheet and the ink ribbon are laid on each other. In such a state, printing is performed by the head of the printing device. The printing sheet printed is guided to a film gate by the claws. The ink ribbon used for printing is taken up by the take-up spool.

SUMMARY

The ink ribbon cartridge is provided with the ink ribbon and a head opening at different positions in a direction in which the ribbon cartridge and the printing sheet cartridge are arranged, that is, in an up-down direction, thereby downsizing the cartridge in a direction orthogonal to the up-down direction. The cartridge is to be further downsized in a direction orthogonal to the up-down direction.

Aspects of the disclosure provide a cassette downsized in a direction orthogonal to the up-down direction.

According to an aspect of the disclosure, a cassette includes a printing tape roll being rotatable and into which a printing tape as a medium to be printed is wound, and an outer peripheral wall disposed on one side in a first direction relative to the printing tape roll. The first direction is a width direction of the printing tape. The outer peripheral wall includes a first sidewall extending in a second direction orthogonal to the first direction, a second sidewall extending in a third direction orthogonal to the first direction and intersecting with the second direction, and a recess wall defining a recess extending from the second sidewall toward one side in the second direction. The recess extends in the third direction on one side in the second direction further than the second sidewall. At least a portion of the recess overlaps the printing tape roll in the first direction.

According to an aspect of the disclosure, a cassette includes a printing tape roll into which a printing tape is wound, a spacer film disposed in contact with the printing tape roll in a first direction being a width direction of the printing tape, and an outer peripheral wall disposed on one side in the first direction relative to the printing tape roll and the spacer film. The outer peripheral wall includes a first sidewall extending in a second direction orthogonal to the first direction; a second sidewall extending in a third direction orthogonal to the first direction and intersecting with the second direction, and a recess wall defining a recess extending from the second sidewall toward one side in the second direction. The recess extends in the third direction on one side in the second direction further than the second sidewall. At least a portion of the recess overlaps the spacer film in the first direction.

DETAILED DESCRIPTION

Hereinafter, embodiments of the disclosure will be described with reference to the accompanying drawings.

Embodiments

First Embodiment

Figure 1:
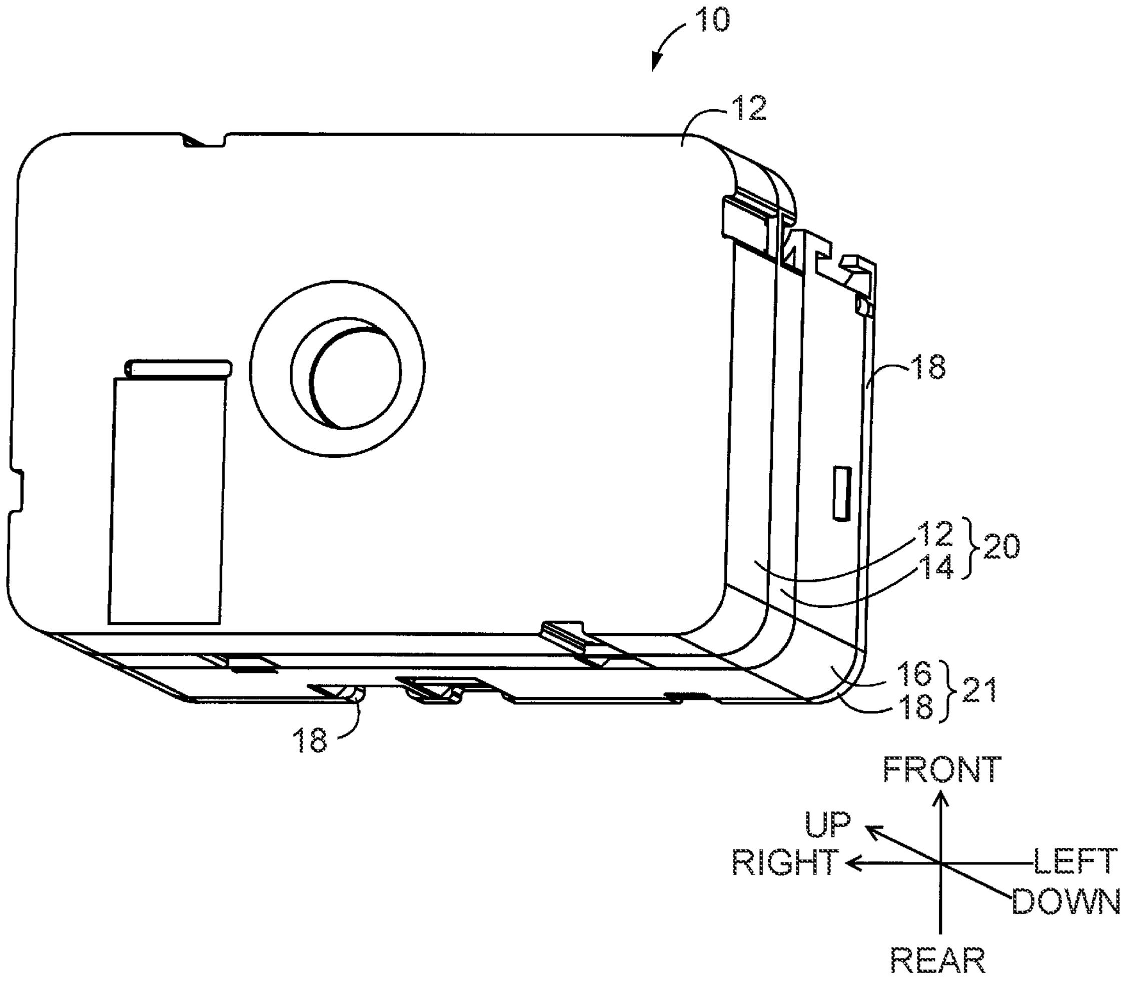
FIG. 1 is a perspective view illustrating an upper surface side of a cassette according to a first embodiment of the disclosure.
Figure 2:
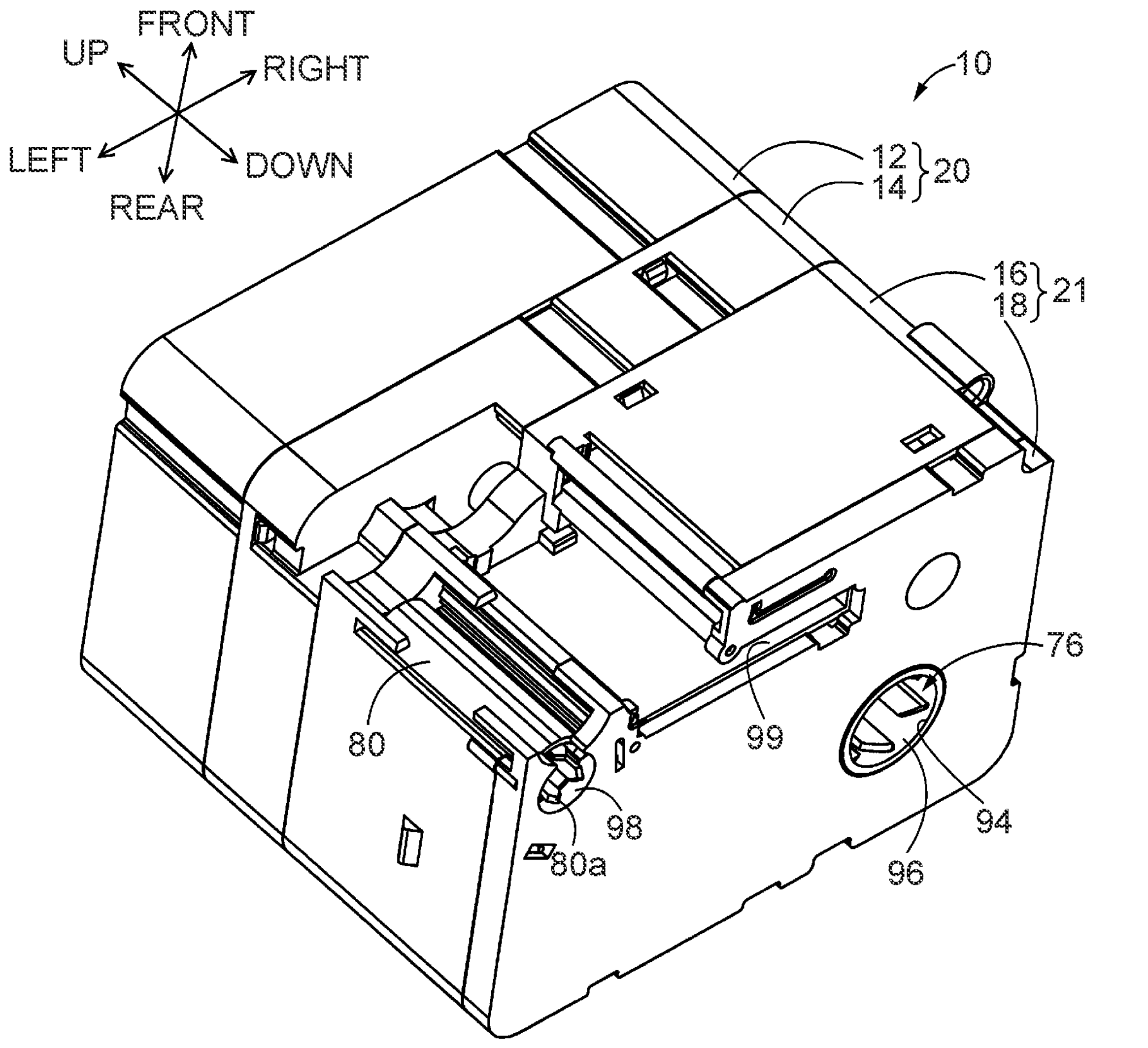
FIG. 2 is a perspective view illustrating a lower surface side of the cassette of FIG. 1.
Figure 3:
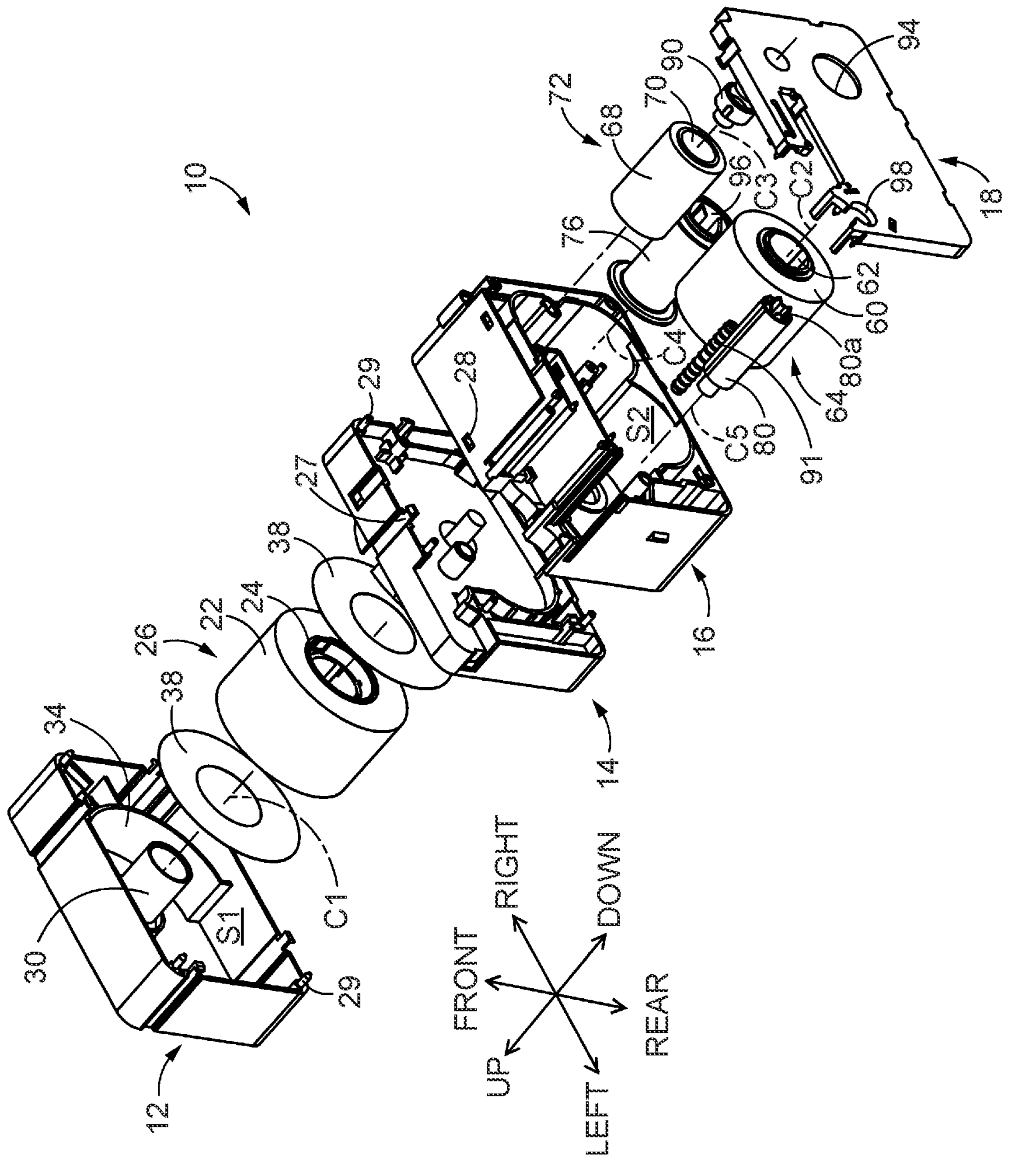
FIG. 3 is a disassembled perspective view of the cassette of FIG. 1, illustrating a configuration of a case of the cassette and an internal configuration thereof the cassette, wherein the case includes a first case member, a second case member, a third case member, and a fourth case member.

FIG. 1 is a perspective view illustrating a cassette 10 according to a first embodiment of the disclosure, from an obverse surface side, that is, an upper surface side, of the cassette 10. In the description of the present embodiment, an upper side, lower side, right side, and left side of FIG. 1 refer to a front side, rear side, left side, and right side of the cassette 10, respectively. An upper left side and lower right side of FIG. 1 refer to an upper side and lower side of the cassette 10, respectively. FIG. 2 is a perspective view illustrating the cassette 10, from a back surface side, that is, a lower surface side, of the cassette 10. FIG. 3 is a disassembled perspective view of the cassette 10, illustrating an internal configuration of the cassette 10, wherein a first case member 12, a second case member 14, a third case member 16, and a fourth case member 18 constituting the cassette 10 are disassembled. The cassette 10 has a rectangular parallelepiped shape. The cassette 10 is detachably attachable to a cassette mounting portion 104 of a printing device 102 illustrated in FIG. 18. The cassette 10 includes a first case that is a tape case 20 including the first case member 12 and the second case member 14, and a second case that is a ribbon case 21 including the third case member 16 and the fourth case member 18. The first case member 12, the second case member 14, the third case member 16, and the fourth case member 18 are stacked on one another in an up-down direction as illustrated in FIG. 1. The first case member 12, the second case member 14, the third case member 16, and the fourth case member 18 include locking claws 27, fixing claws 28, and positioning projections 29 at appropriate positions of their peripheral walls. The first case member 12, the second case member 14, the third case member 16, and the fourth case member 18 are securely joined to each other in a stacked manner by engagement between the locking claws 27 and the fixing claws 28 while the first case member 12, the second case member 14, the third case member 16, and the fourth case member 18 are positioned relative to each other by the positioning projections 29. In the present embodiment, a surface of each of the case members 12 to 18 facing upward is referred to as an upper surface or obverse surface of each of the case members 12 to 18, and a surface of each of the case members 12 to 18 facing downward is referred to as a lower surface or back surface of each of the case members 12 to 18.

The ribbon case 21 is positioned on one side in the up-down direction relative to the tape case 20. In other words, the ribbon case 21 is positioned on one side of the tape case 20 in the up-down direction. In the present embodiment, the ribbon case 21 is positioned on a lower side, which is one side, in the up-down direction relative to the tape case 20. The tape case 20 defines therein a first space S1 in which a printing tape roll 26, into which a printing tape 22 as a medium to be printed is wound, is rotatably accommodated. In the printing tape roll 26, the printing tape 22 that is a continuous strip is wound around a printing tape spool 24 that is a cylindrical shaft core member. The printing tape 22 is wound such that a width direction of the printing tape 22 corresponds to the up-down direction that is an example of a first direction. A radial direction of the printing tape roll 26 is a front-rear direction and a right-left direction, and the radial direction is an orthogonal direction orthogonal to the up-down direction. The orthogonal direction can be referred to as any direction parallel to a plane orthogonal to the up-down direction. The printing tape 22, the printing tape spool 24, and the printing tape roll 26 correspond to a medium to be printed, a printing medium spool, and a printing medium roll, respectively.

The ribbon case 21 defines therein a second space S2 in which an ink ribbon roll 72, a laminating tape roll 64, and a take-up spool 76 are rotatably accommodated. In the ink ribbon roll 72, an ink ribbon 68 that is a continuous strip is wound around the take-up spool 76 such that a width direction of the ink ribbon 68 corresponds to the up-down direction. The ink ribbon 68 is used for printing to be performed on the printing tape 22 that is a continuous strip. The take-up spool 76 takes up the ink ribbon 68 to be drawn from the ink ribbon roll 72. In the laminating tape roll 64, a laminating tape 60 that is a continuous strip to be adhered to a printed portion of the printing tape 22 is wound around a laminating tape spool 62 such that a width direction of the laminating tape 60 corresponds to the up-down direction.

As illustrated in FIG. 2, the fourth case member 18 of the cassette 10 has a take-up spool support hole 94 in the lower surface of the fourth case member 18. A coupling hole 96, described later, in the take-up spool 76 is exposed from the take-up spool support hole 94. The coupling hole 96 is to receive therein a take-up spool drive shaft 108 provided in the cassette mounting portion 104 of the printing device 102 as the cassette 10 is mounted on the cassette mounting portion 104. A recess 99 is defined by a side surface of the third case member 16 and a side surface of the fourth case member 18, which are a part of an outer peripheral wall 16*w* of the ribbon case 21, and a part of an outer peripheral wall of the second case member 14. The recess 99 receives a print head 106 located in the cassette mounting portion 104 of the printing device 102 as the cassette 10 is mounted on the cassette mounting portion 104. As illustrated in FIG. 2, the upper end of the recess 99 is defined by a lower surface of the second case member 14.

Figure 4:
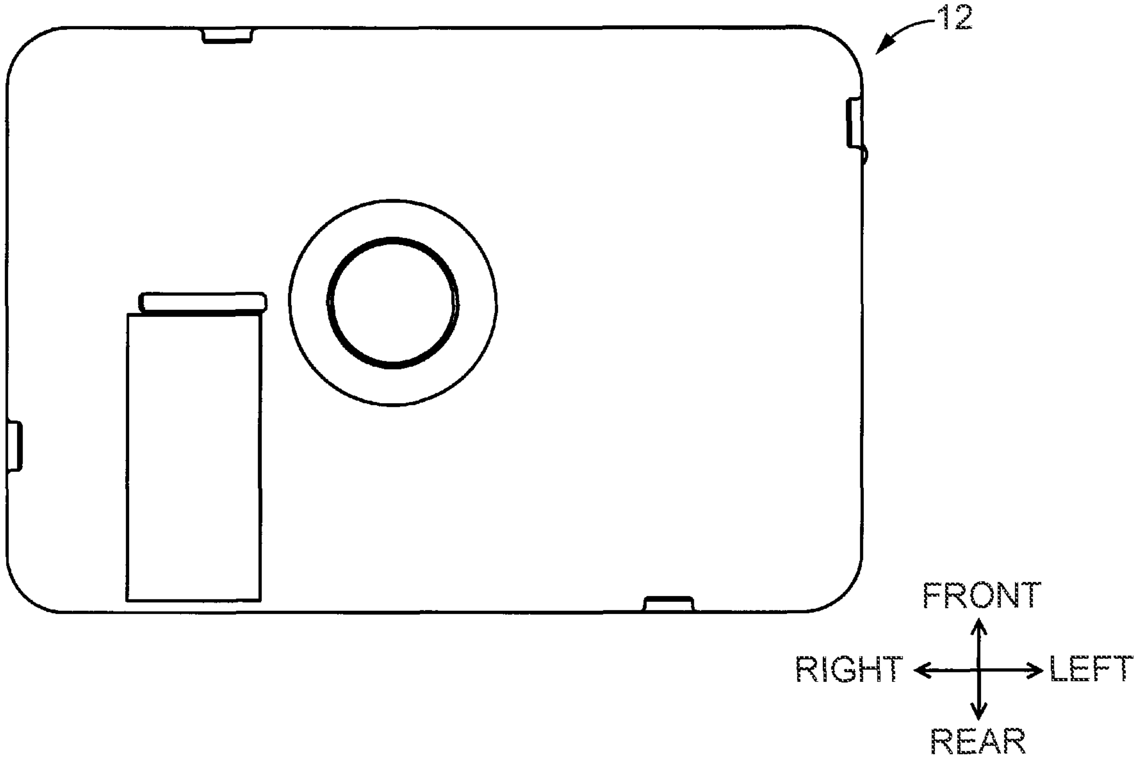
FIG. 4 is a front view illustrating an upper surface side of the first case member of FIG. 1.
Figure 5:
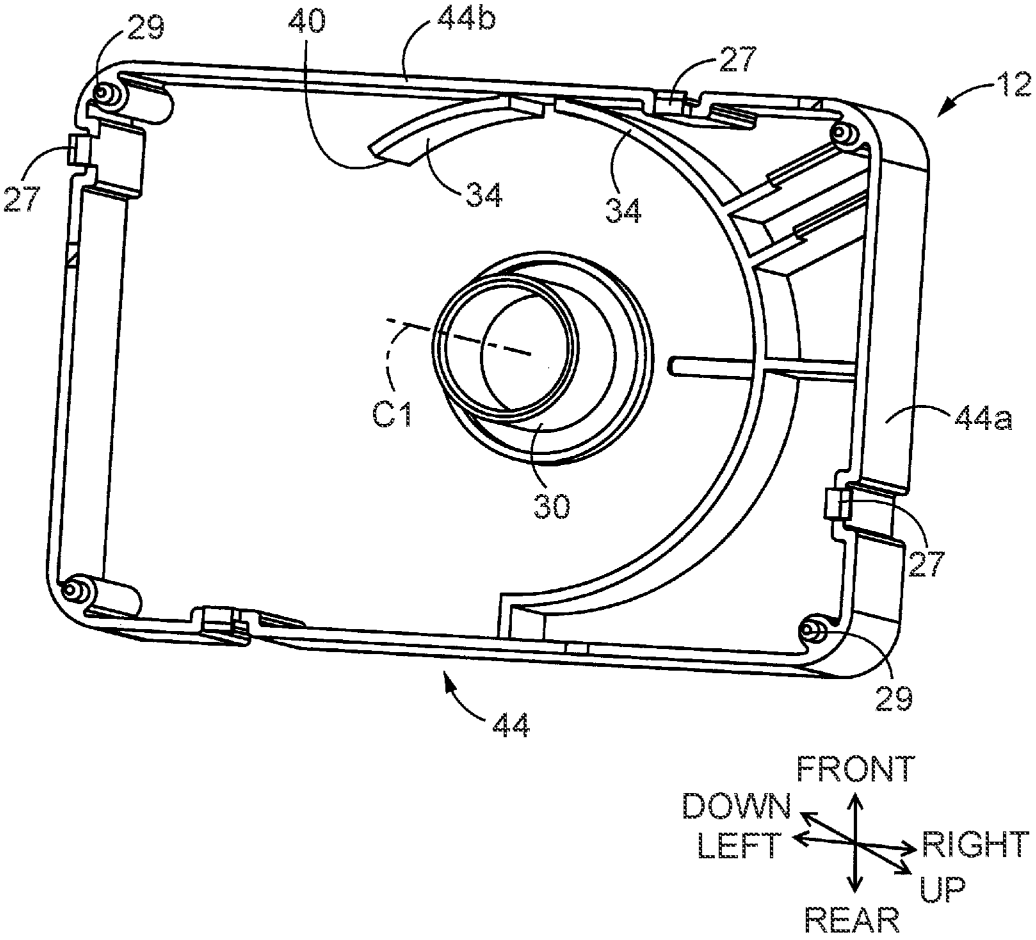
FIG. 5 is a perspective view illustrating a lower surface side of the first case member of FIG. 1.
Figure 6:
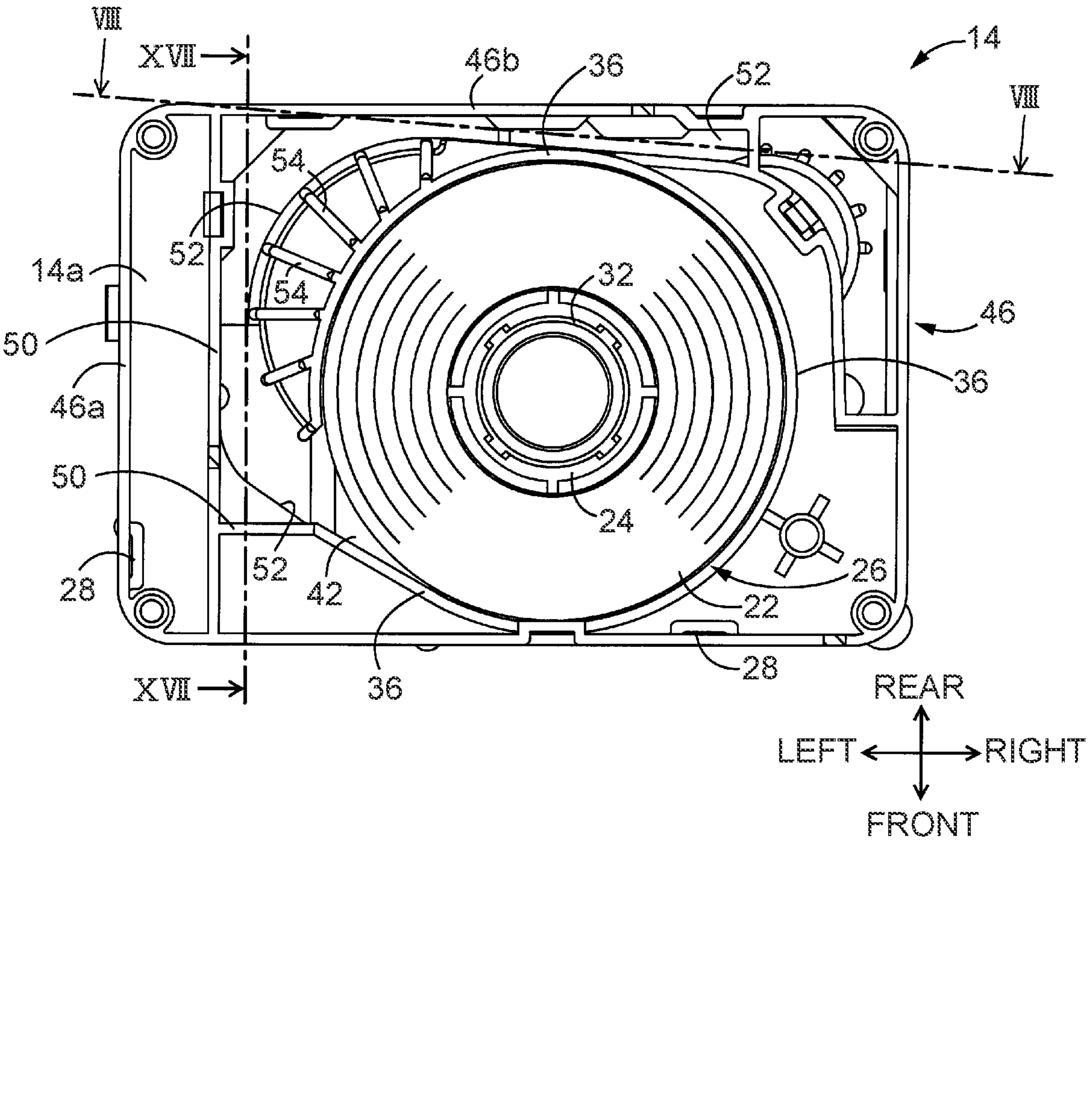
FIG. 6 is a front view illustrating an upper surface side of the second case member of FIG. 1 with a printing tape roll.
Figure 7:
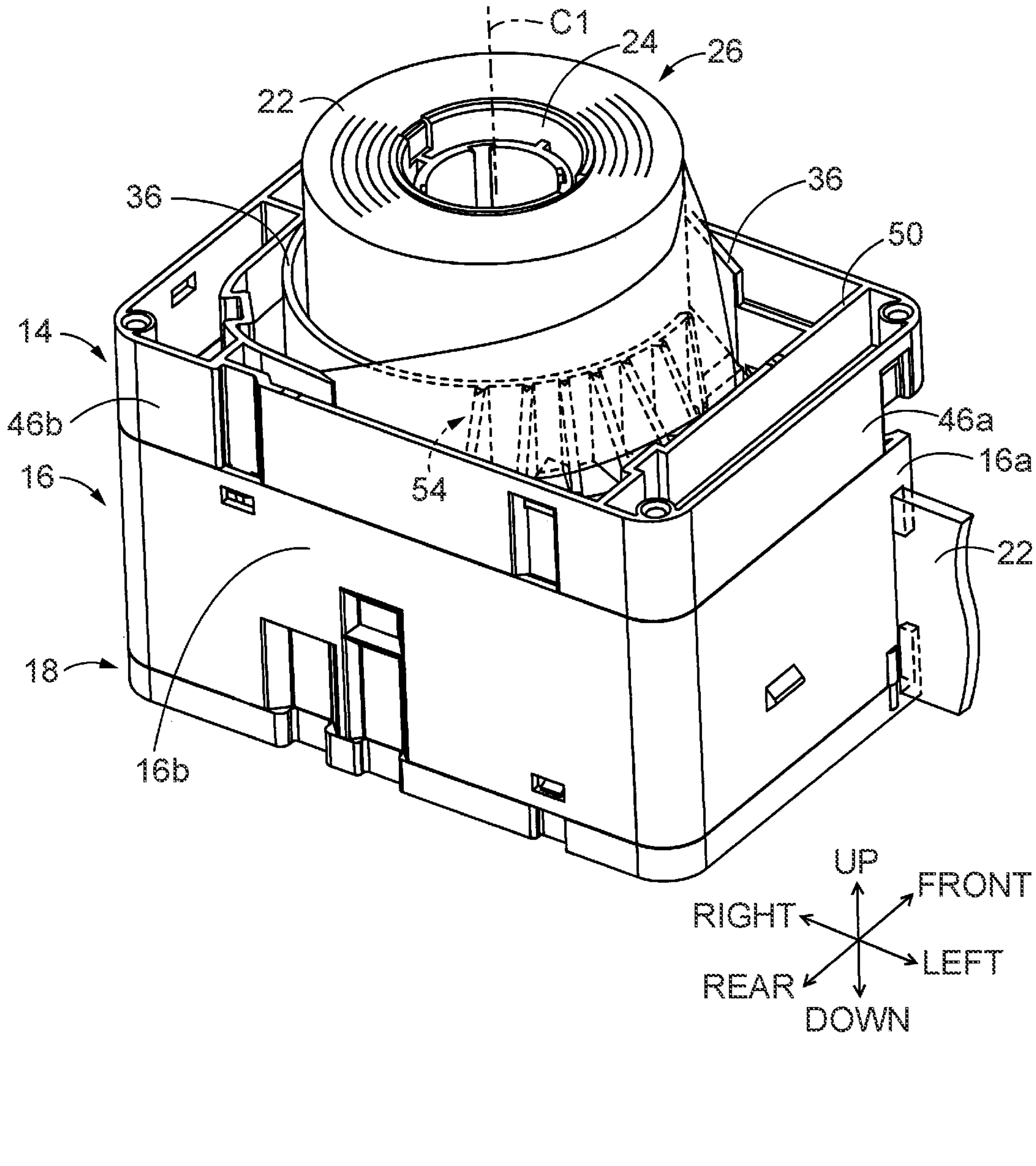
FIG. 7 is a perspective view of the cassette of FIG. 1 with the first case member removed.
Figure 8:
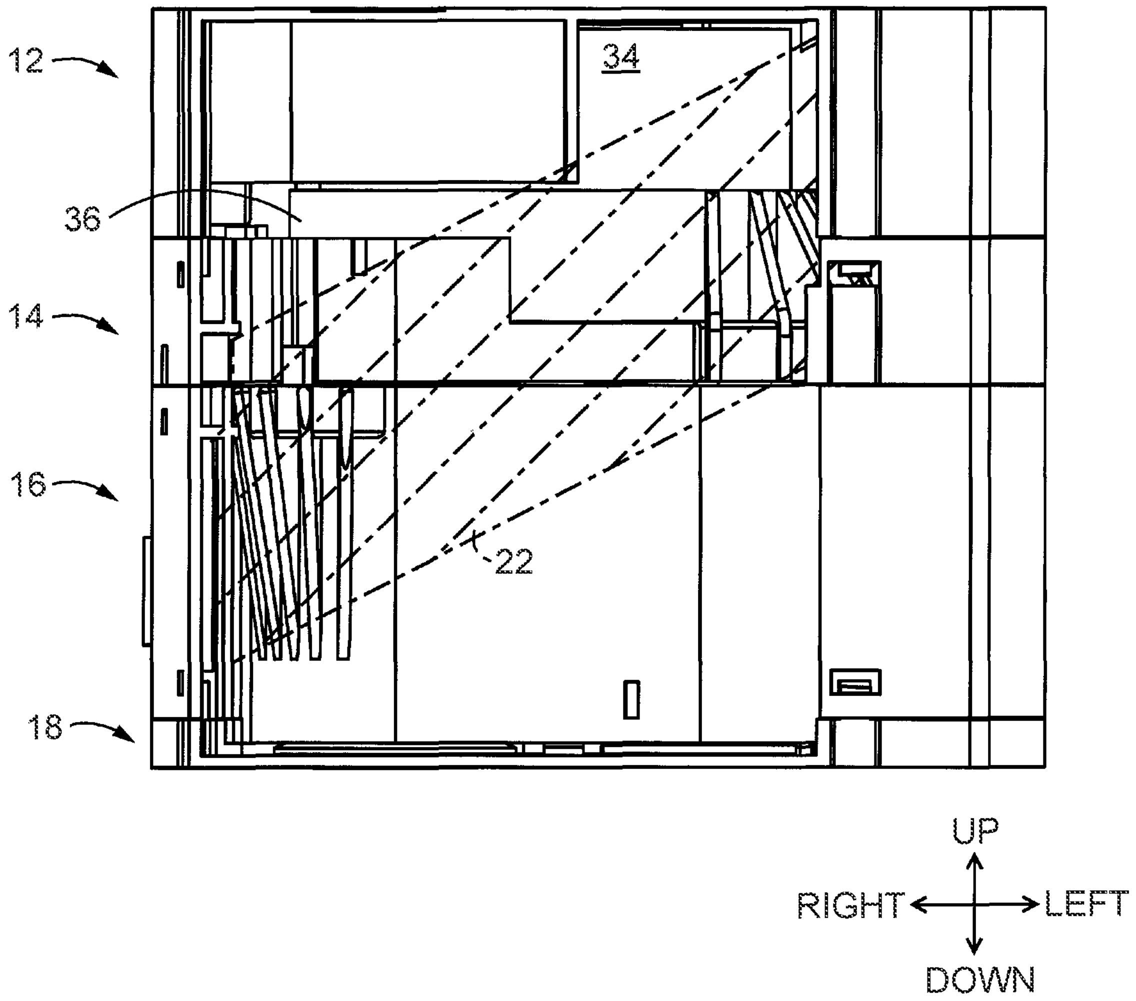
FIG. 8 is a cross sectional view taken along line VIII-VIII in FIG. 6, illustrating a state where a printing tape extends from the inside of a tape case to the inside of a ribbon case.
Figure 9:
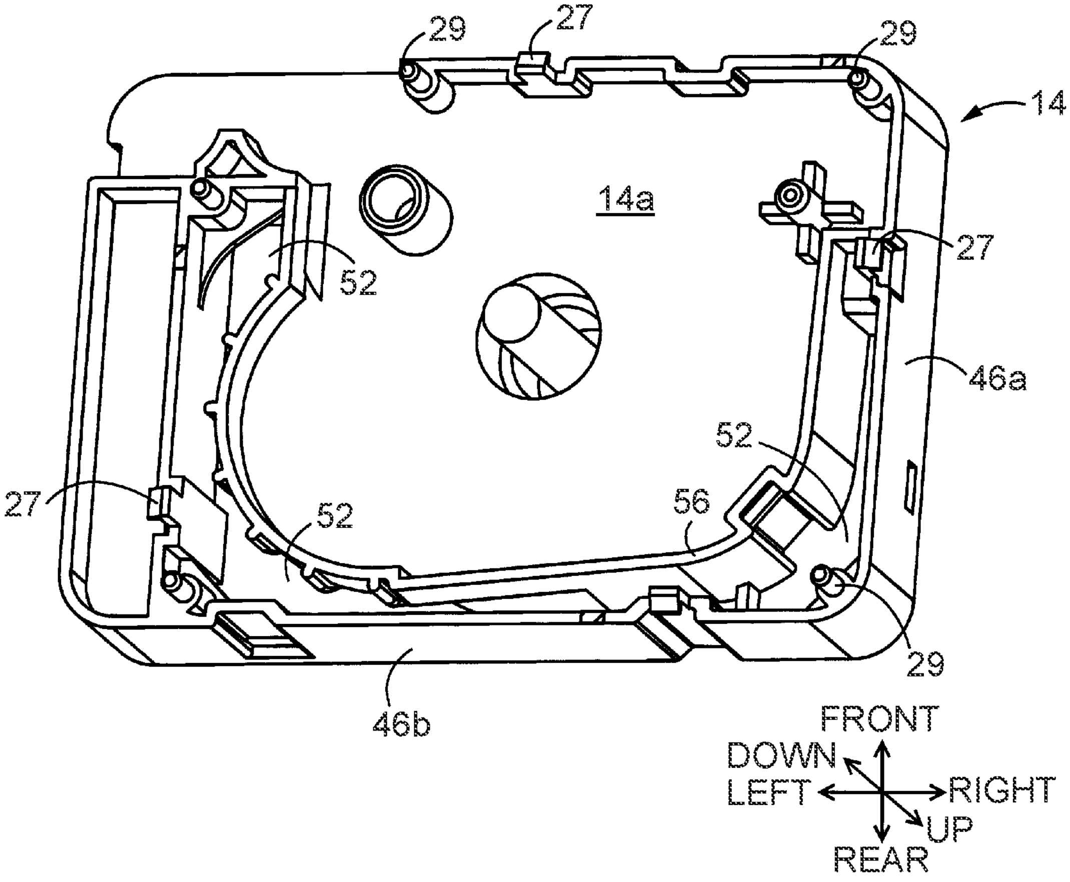
FIG. 9 is a perspective view illustrating a lower surface side of the second case member of FIG. 1.
Figure 10:
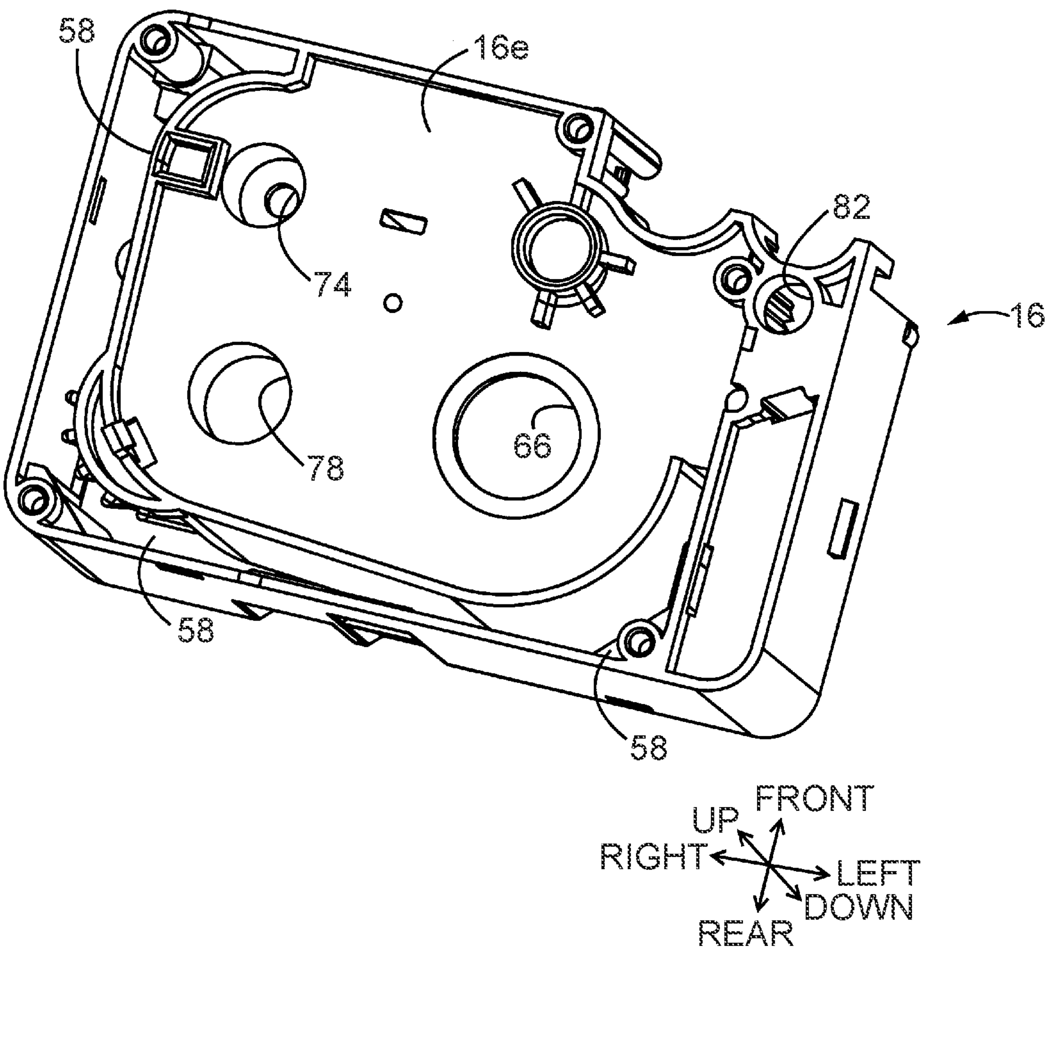
FIG. 10 is a perspective view illustrating an upper surface side of the third case member of FIG. 1.
Figure 11:
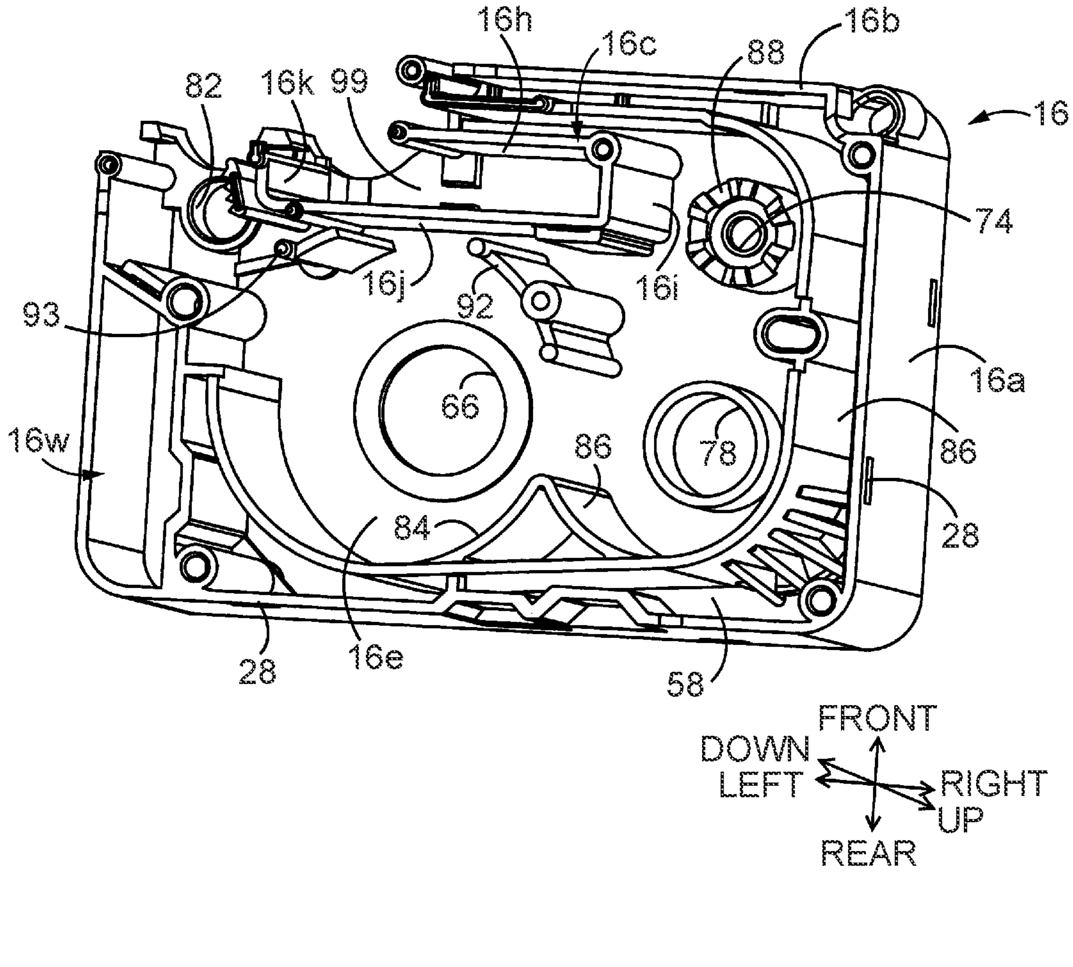
FIG. 11 is a perspective view illustrating a lower surface side of the third case member of FIG. 1.
Figure 12:
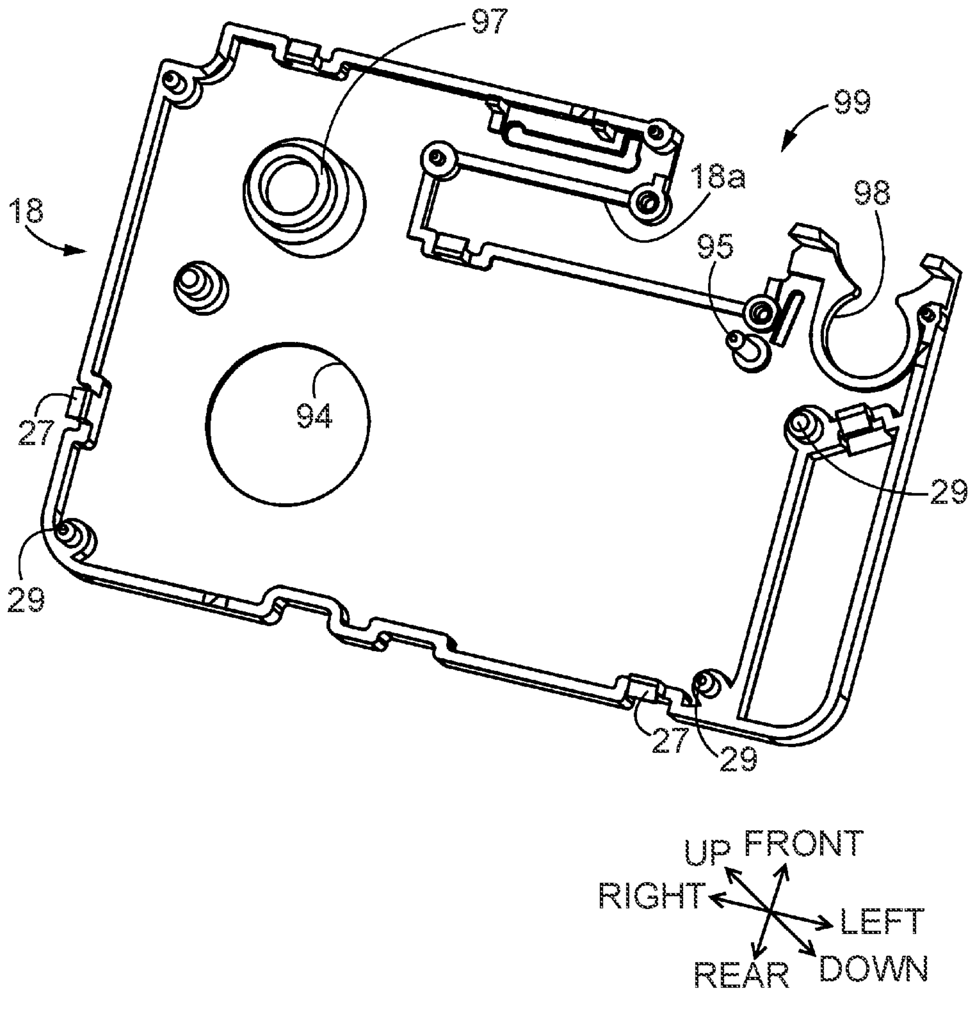
FIG. 12 is a perspective view illustrating an upper surface side of the fourth case member of FIG. 1.
Figure 13:
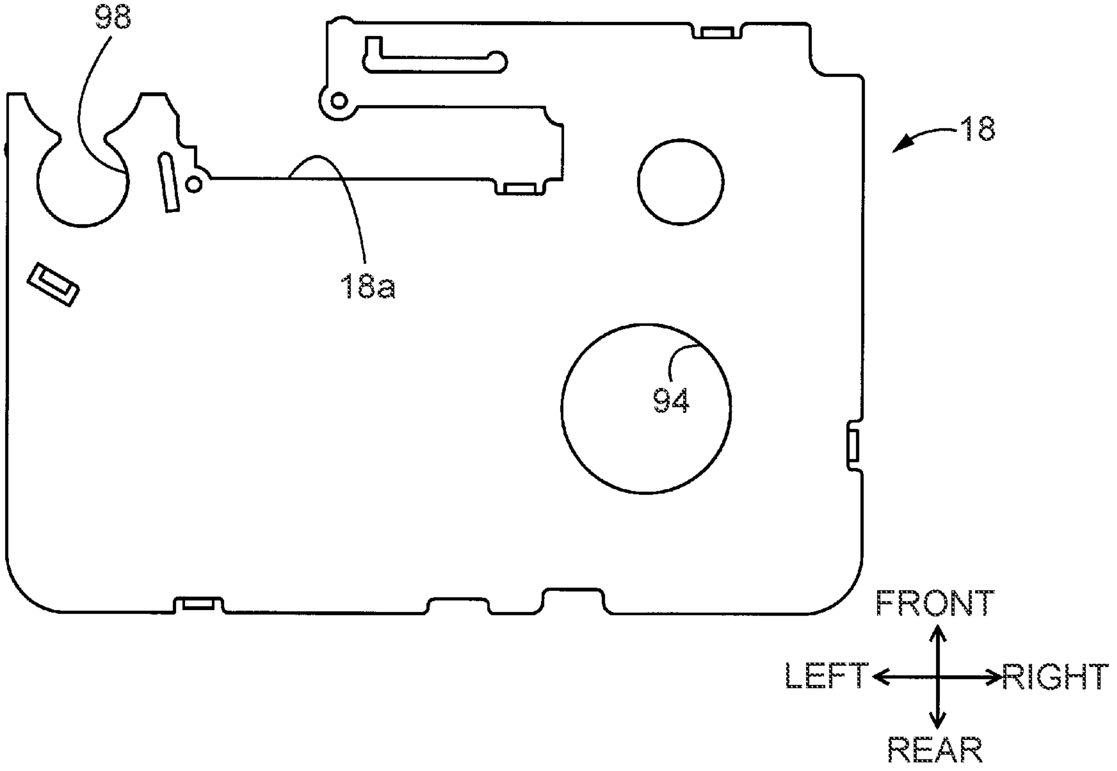
FIG. 13 is a bottom view illustrating a lower surface side of the fourth case member of FIG. 1.

FIG. 4 is a front view illustrating the upper surface side of the first case member 12. FIG. 5 is a perspective view illustrating the lower surface side of the first case member 12. FIG. 6 is a front view illustrating an upper surface side of the second case member 14 with a printing tape roll. In FIG. 6, a portion of the printing tape 22 drawn from the printing tape roll 26 is not illustrated. FIG. 7 is a perspective view illustrating the upper surface side of the second case member 14. FIG. 8 is a cross sectional view taken along line VII-VII in FIG. 6, illustrating a state where the printing tape 22 extends from the inside of the tape case 20 to the inside of the ribbon case 21. FIG. 9 is a perspective view illustrating the lower surface side of the second case member 14. FIG. 10 is a perspective view illustrating the upper surface side of the third case member 16. FIG. 11 is a perspective view illustrating the lower surface side of the third case member 16. FIG. 12 is a perspective view illustrating the upper surface side of the fourth case member 18. FIG. 13 is a bottom view illustrating the lower surface side of the fourth case member 18.

Figure 15:
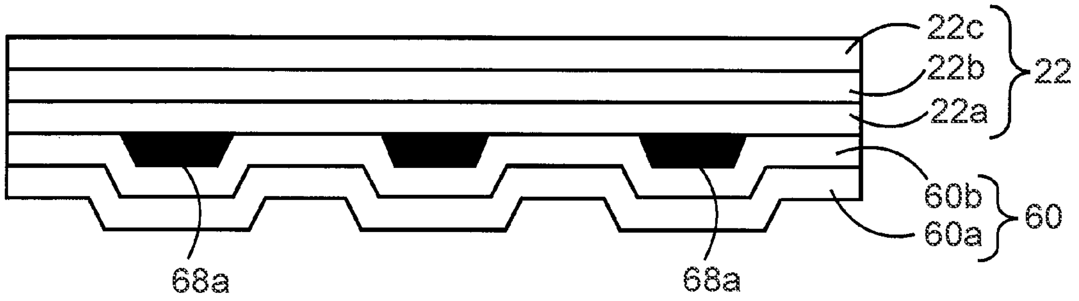
FIG. 15 illustrates a laminate of the printing tape and the laminating tape both discharged from the cassette of FIG. 1.

In the first space S1 defined between the first case member 12 and the second case member 14, the printing tape roll 26 is accommodated rotatably about a first rotation axis C1 parallel to the up-down direction. The first rotation axis C1 is a rotation axis of a printing tape spool 24 as well as a rotation axis of the printing tape roll 26. The first case member 12 and the second case member 14 each have a rectangular shape. The first rotation axis C1 is offset to the right from the centers of the first case member 12 and the second case member 14 with respect to the right-left direction corresponding to the second direction, and coincides with the centers of the first case member 12 and the second case member 14 with respect to the front-rear direction corresponding to the third direction. For example, as illustrated in FIG. 15, the printing tape 22 is structured by stacking a to-be-printed tape 22*a*, an adhesive 22*b*, and a release tape 22*c*. The to-be-printed tape 22*a* has a printing surface. The release tape 22*c* is stacked on a surface opposite to the printing surface of the to-be-printed tape 22*a* via the adhesive 22*b*.

As illustrated in FIGS. 3 and 5, a lower surface of the first case member 12 is provided with a cylindrical first support projection 30 and a first circular wall 34. The first support projection 30 is inserted into the cylindrical printing tape spool 24 to support the printing tape roll 26 rotatably. The first circular wall 34 has an inside diameter greater than an outside diameter of the printing tape roll 26. The first support projection 30 and the first circular wall 34 have an axis that is coaxial with the first rotation axis C1, and protrude downward from the lower surface of the first case member 12. As illustrated in FIGS. 6 and 7, an upper surface of the second case member 14 is provided with a cylindrical second support projection 32 and a second circular wall 36. The second support projection 32 is inserted into the cylindrical printing tape spool 24 to support the printing tape roll 26 rotatably. The second circular wall 36 has an inside diameter greater than the outside diameter of the printing tape roll 26. The second support projection 32 and the second circular wall 36 have an axis that is coaxial with the first rotation axis C1, and protrude upward from the upper surface of the second case member 14. The printing tape roll 26 is disposed between the first case member 12 and the second case member 14 while spacer films 38 are each positioned on an upper or lower side of the printing tape roll 26. Each spacer film 38 has a disc-shape having an outside diameter equal to the outside diameter of the printing tape roll 26. The spacer films 38 are used to facilitate rotation of the printing tape roll 26. The spacer films 38 are made from a sheet of resin, for example, polytetrafluoroethylene.

As illustrated in FIGS. 5 and 6, in order for the printing tape 22 to be drawable from the printing tape roll 26 at a certain position, the first case member 12 defines, on its lower surface, a printing tape gate 40 formed by cutting off a portion of the first circular wall 34, and the second case member 14 defines, on its upper surface, a printing tape gate 42 formed by cutting off a portion of the second circular wall 36. As illustrated in FIG. 7, the second case member 14 defines, on its upper surface, a guide wall 50 extending leftward from a left end of the second circular wall 36 defining the printing tape gate 42 to guide the printing tape 22 drawn from the printing tape roll 26 in a predetermined direction.

As illustrated in FIG. 6, the guide wall 50 extending leftward from the left end of the second circular wall 36 bends toward a long side portion **46*b* of the outer peripheral wall 46, that is, rearward, before reaching a short side portion 46*a*, and extends to the long side portion 46*b* along the short side portion 46*a***.

As illustrated in FIG. 6, a bottom plate **14*a* of the second case member 14 is formed with a through hole 52. The through hole 52 extends in the front-rear direction and in the right-left direction along the guide wall 50 and the long side portion 46*b* of the outer peripheral wall 46. The through hole 52 has an L shape in a front view. Guide ribs 54 are formed on the bottom plate 14*a*. The guide ribs 54 are positioned between the through hole 52 and a portion of the second circular wall 36 facing the guide wall 50 and the long side portion 46*b*. The guide ribs 54 guide the printing tape 22 drawn from the printing tape roll 26 and fed through the printing tape gates 40 and 42 into the through hole 52**.

FIG. 7 illustrates the cassette 10 with the first case member 12 removed. As illustrated in FIG. 7, the printing tape 22 drawn from the printing tape roll 26 is guided via the through hole 52 to the second space S2 defined between the third case member 16 and the fourth case member 18. The printing tape 22 thus extends between the tape case 20 and the ribbon case 21 via the through hole 52 defined in the bottom plate **14*a*** that separates the first space S1 and the second space S2 from each other.

Figure 14:
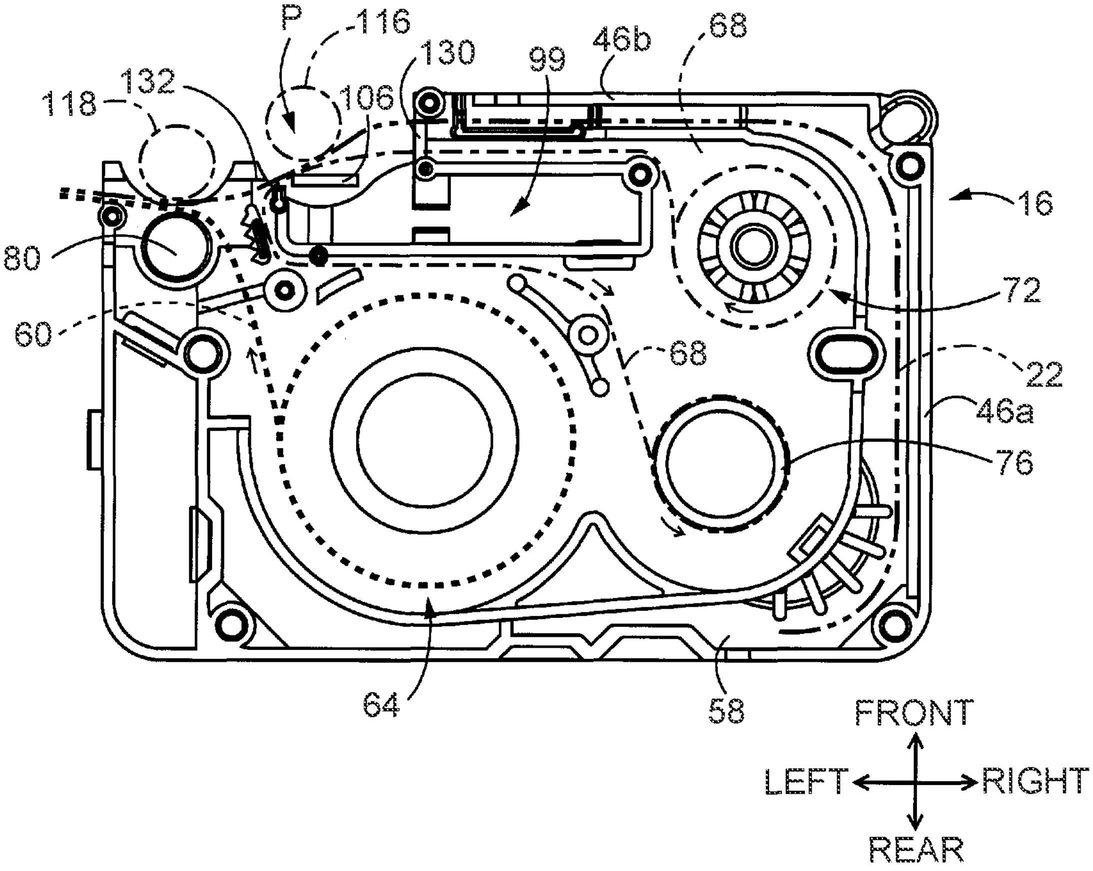
FIG. 14 is a view illustrating a path of the printing tape drawn from the printing tape roll, a path of a laminating tape drawn from a laminating tape roll, and a path of the ink ribbon drawn from an ink ribbon roll, using a view illustrating the lower surface of the third case member of FIG. 1.

As illustrated in FIG. 8, the printing tape 22 obliquely extends from the inside of the tape case 20 to the inside of the ribbon case 21 via the through hole 52. More specifically, as illustrated in FIG. 14 described later, the printing tape 22 extends to the recess 99 of the ribbon case 21. FIG. 9 illustrates the lower surface side of the second case member 14. As illustrated in FIG. 9, the bottom plate **14*a* of the second case member 14 has the through hole 52 penetrating therethrough, and a guide wall 56 standing thereon in the up-down direction along the through hole 52. FIG. 10 illustrates the upper surface side of the third case member 16. A ceiling plate 16*e* of third case member 16 is formed with a through hole 58, a laminating tape roll support hole 66, an ink ribbon support hole 74, a take-up spool support hole 78, and a roller support hole 82. The through hole 58 is defined at a position corresponding to the through hole 52 of the second case member 14 so that the printing tape 22 drawn from the printing tape roll 26 is routed to the second space S2 via the through hole 58. That is, the through hole 52 and the through hole 58** partially overlap each other in the up-down direction.

The bottom plate **14*a* of the second case member 14 and the ceiling plate 16*e* of the third case member 16 separate the first space S1 of the tape case 20 and the second space S2 of the ribbon case 21** from each other.

The laminating tape roll support hole 66 receives one end of the laminating tape spool 62 around which the laminating tape 60 is wound, and supports the laminating tape roll 64 rotatably about a second rotation axis C2 parallel to the first rotation axis C1. The second rotation axis C2 is a rotation axis of the laminating tape spool 62 as well as a rotation axis of the laminating tape roll 64. As illustrated in FIG. 15, the laminating tape 60 is formed of a transparent film **60*a* and an adhesive 60*b* entirely applied to a surface of the transparent film 60*a* to contact a printing surface of the printing tape 22. The laminating tape 60 is used for protecting the printing surface of the printing tape 22. The ink ribbon support hole 74 receive one end of a feed spool 70 around which the ink ribbon 68 is wound, and supports the ink ribbon roll 72 rotatably about a third rotation axis C3 parallel to the first rotation axis C1. The third rotation axis C3 is a rotation axis of the feed spool 70 as well as a rotation axis of the ink ribbon roll 72. The take-up spool support hole 78 receives one end of the take-up spool 76 that takes up the ink ribbon 68 drawn from the ink ribbon roll 72, and supports the take-up spool 76 rotatably about a fourth rotation axis C4 parallel to the first rotation axis C1. The fourth rotation axis C4 is a rotation axis of the take-up spool 76. The roller support hole 82 receives one end of a roller 80 and supports the roller 80 rotatably about a fifth rotation axis C5 parallel to the first rotation axis C1. The roller 80 nips the printing tape 22 and the laminating tape 60 in cooperation with a roller of the printing device 102 to press-contact a printing surface of the printing tape 22 and an adhesive surface of the laminating tape 60** with each other.

As illustrated in FIG. 11, a lower surface of the third case member 16 is formed with a laminating tape roll holding wall 84, an ink ribbon roll holding wall 86, a cylindrical projection 88, and an arc-shaped wall 92. The laminating tape roll holding wall 84 and the arc-shaped wall 92 are shaped like an arc of a circle centered on the laminating tape roll support hole 66 around the laminating tape roll support hole 66, in order to define an installation position of the laminating tape roll 64. The ink ribbon roll holding wall 86 is shaped like an arc of a circle centered on the take-up spool support hole 78 around the take-up spool support hole 78, in order to define an installation position of an ink ribbon roll into which the ink ribbon 68 is wound around the take-up spool 76. The cylindrical projection 88 protrudes downward from the periphery of the ink ribbon support hole 74. The cylindrical projection 88 has, at its distal end, ridges and grooves arranged in a circumferential direction of the cylindrical projection 88. The lower surface of the third case member 16 is provided with a support projection 93 to rotatably support an upper end portion of an anti-sticking roller 91 for preventing sticking of the laminating tape 60. As illustrated in FIG. 12, the upper surface of the fourth case member 18 is provided with a support projection 95 to support a lower end portion of the anti-sticking roller 91 so as to be connectable.

As illustrated in FIG. 3, a clutch spring holder 90 is engaged with the other end of the feed spool 70 around which the ink ribbon 68 is wound. The clutch spring holder 9X) accommodates a clutch spring. The clutch spring is configured to, when the ink ribbon roll 72 is rotated, apply an appropriate rotational resistance to the feed spool 70.

FIG. 12 illustrates the upper surface of the fourth case member 18. FIG. 13 illustrates the lower surface of the fourth case member 18. The fourth case member 18 has a take-up spool support hole 94 formed therethrough to receive the other end of the take-up spool 76 and support the take-up spool 76 rotatably. The fourth case member 18 is formed with a cylindrical support projection 97 to receive the other end of the feed spool 70 and support the feed spool 70 rotatably. As illustrated in FIG. 2, the take-up spool 76 has a coupling hole 96 at the other end thereof. The coupling hole 96 of the take-up spool 76 is exposed to the lower surface of the fourth case member 18 through the take-up spool support hole 94. In a state where the cassette 10 is mounted on the printing device 102, a take-up spool drive shaft 108 of the printing device 102 is inserted into the coupling hole 96 and coupled to the take-up spool 76, such that the take-up spool 76 is rotationally driven by the drive shaft.

The fourth case member 18 has a roller exposure hole 98 at a position corresponding to the roller support hole 82 of the third case member 16. The roller exposure hole 98 allows an end of a shaft of the roller 80 to be exposed. As illustrated in FIG. 2, the roller 80 has a coupling portion 80*a* at an end thereof pointing to the fourth case member 18. The coupling portion 80*a* of the roller 80 is exposed to the lower surface of the fourth case member 18 through the roller exposure hole 98. In a state where the cassette 10 is mounted on the printing device 102, the coupling portion 80*a* is coupled to a roller drive shaft 110 of the printing device 102 such that the roller 80 is rotationally driven by the roller drive shaft 110.

As illustrated in FIGS. 2 and 11, the ribbon case 21 including the third case member 16 and the fourth case member 18 has the recess 99. As the cassette 10 is mounted on the cassette mounting portion 104 illustrated in FIG. 18, the recess 99 accommodates a head holding plate 114 for holding the print head 106 that stands on the cassette mounting portion 104. As illustrated in FIG. 11, a part of the outer peripheral wall 16*w* of the third case member 16 is formed with a first sidewall 16*a*, a second sidewall 16*b*, and a recess wall 16*c*. The first sidewall 16*a* extends in a front-rear direction, as a second direction, orthogonal to the up-down direction that corresponds to a stacking direction. The second sidewall 16*b* extends from a front end portion of the first sidewall 16*a* in the left-right direction, as a third direction, orthogonal to both the up-down direction and the front-rear direction. The recess wall 16*c* is U-shaped in cross section and defines the recess 99 therein. The recess wall 16*c* comprises an inner wall 16*h* facing the second sidewall 16*b* in the front-rear direction and extending in the left-right direction, an inner wall 16*i* extending rearward from the right end of the inner wall 16*h*, an inner wall 16*j* extending leftward from the left end of the inner wall 16*i*, and an inner wall 16*k* extending frontward from the left end of the inner wall 16*j*. The second sidewall 16*b* and the recess wall 16*c* define the recess 99 such that the recess 99 extends rearward from the left end portion of the second sidewall 16*b* and extends in the left-right direction behind the second sidewall 16*b*. As illustrated in FIGS. 12 and 13, the fourth case member 18 has a U-shaped cutout 18*a* corresponding to the recess wall 16*c*. The recess wall 16*c* and the cutout 18*a* define the recess 99. As illustrated in FIG. 2, a portion of the upper end of the recess 99 is defined by the lower surface of the second case member 14. In other words, the recess 99 coincides with the second case member 14 and the first case member 12 in the up-down direction.

FIG. 14 illustrates the lower surface of the third case member 16 in a state where the cassette 10 is mounted on the cassette mounting portion 104 of the printing device 102. As described above, the printing tape 22 is drawn from the printing tape roll 26 and is routed such that the printing tape 22 obliquely extends from the first space S1 of the tape case 20 to the second space S2 of the ribbon case 21 via the through hole 52 and the through hole 58. Thus, in FIG. 14 illustrating the third case member 16, the printing tape 22 is illustrated as extending from the through hole 58 defined at the rear end portion of the third case member 16. As illustrated in FIG. 14, the printing tape 22 and the laminating tape 60 are nipped between the roller 80 and a pressing roller 118 of the printing device 102 and drawn from the printing tape roll 26 and the laminating tape roll 64, respectively as the roller 80 is driven. As the take-up spool 76 is driven, the ink ribbon 68 is drawn from the ink ribbon roll 72 and taken up by the take-up spool 76. FIG. 14 illustrates conveyance paths of the printing tape 22, the ink ribbon 68, and the laminating tape 60. The printing tape 22 is indicated by a double-dotted-and-dashed line. The laminating tape 60 is indicated by a dashed line. The ink ribbon 68 is indicated by a dotted-and-dashed line.

As illustrated in FIG. 14, as the take-up spool 76 and the roller 80 are rotationally driven, the printing tape 22 and the ink ribbon 68 are discharged an outlet 130 toward a printing position P where the printing tape 22 and the ink ribbon 68 overlap each other. The outlet 130 is an opening that is defined by the left end portion of the second sidewall 16*b* and the left end portion of the inner wall 16*h* and is open in the left-right direction. At the printing position P between the print head 106 and a platen roller 116, the printing tape 22 is pressed to the print head 106 via the ink ribbon 68. In this state, heating elements disposed at a surface of the print head 106 are selectively driven to generate heat locally, whereby part of ink 68*a* provided on an entire surface of the ink ribbon 68 is transferred to the printing tape 22, and characters, symbols, and other representations are printed on the printing tape 22. The ribbon case 21 has an inlet 132. The used ink ribbon 68 that has passed the printing position P is conveyed into the ribbon case 21 through the inlet 132 and is taken up by the take-up spool 76. The inlet 132 is located to the left of the outlet 130 and provided in the third case member 16. The transparent laminating tape 60 is pressed and adhered to the printing surface of the printing tape 22 that has passed the printing position P by the roller 80. The printing surface of the printing tape 22 is thus protected by the laminating tape 60.

FIG. 15 schematically illustrates a tape laminate including the printing tape 22 and the laminating tape 60 discharged from the cassette 10. The laminating tape 60 is formed of the transparent film 60*a* with its surface entirely coated with the adhesive 60*b*. The laminating tape 60 is adhered to a surface to be printed of the to-be-printed tape 22*a* of the printing tape 22. This protects ink 68*a* transferred on the printing surface of the printing tape 22. In FIG. 15, not all components 22*a* to 22*c*, 60*a*. 60*b*, and 68*a* of the laminate are accurately illustrated in size or proportion.

Figure 16:
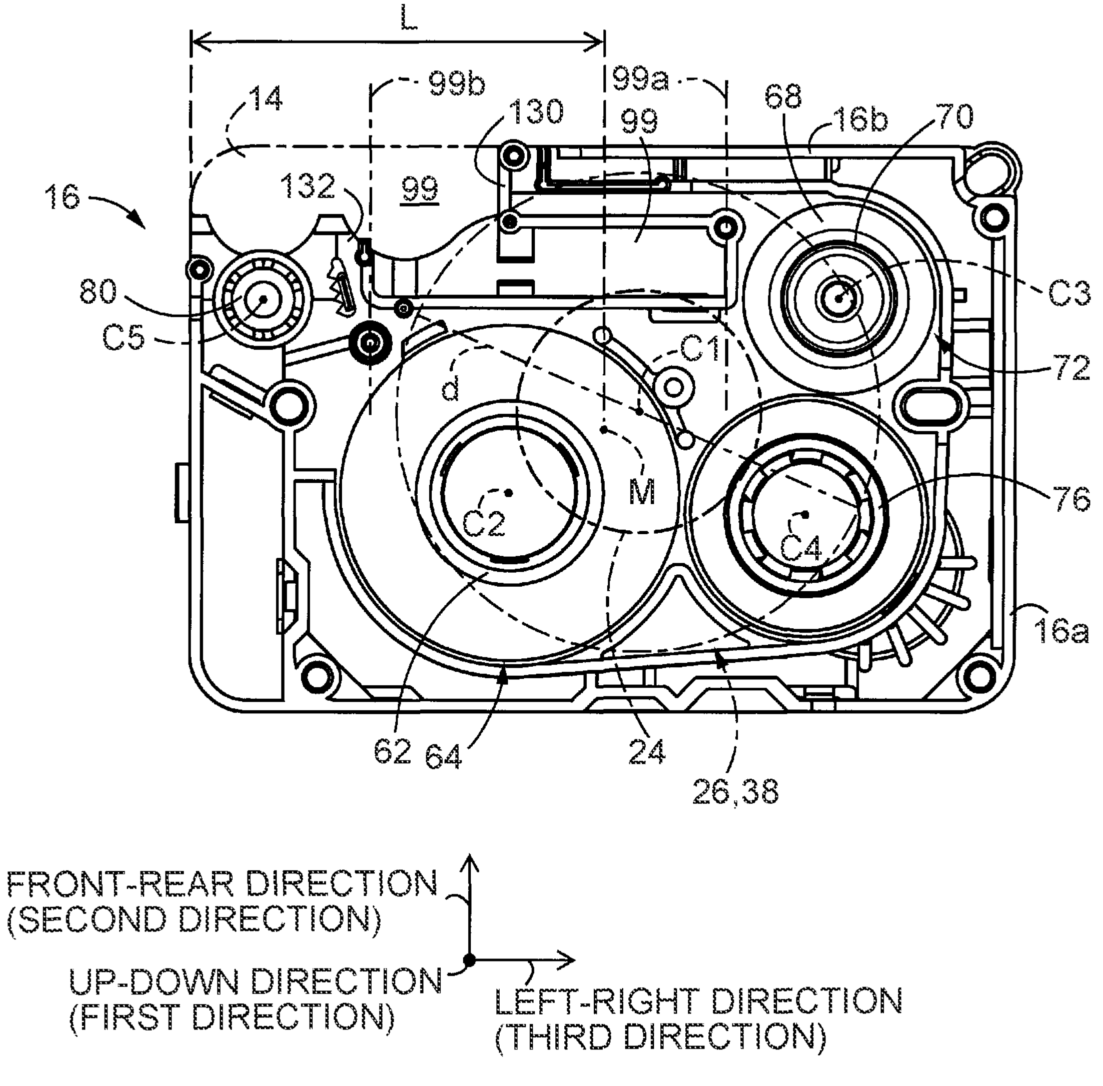
FIG. 16 is a plan view of the cassette of FIG. 1, illustrating relative positions of the printing tape roll, the laminating tape roll, the ink ribbon roll, and the take-up spool.

FIG. 16 illustrates the lower surface of the third case member 16. The laminating tape roll 64, the ink ribbon roll 72, the take-up spool 76, and the roller 80 are accommodated in the second space S2 defined between the third case member 16 and the fourth case member 18, that is, accommodated in the ribbon case 21. As described above, the ribbon case 21 is disposed below the tape case 20 in a stacked manner. In a case where the printing tape roll 26 and the spacer films 38 accommodated in the tape case 20 are projected in the up-down direction onto a projection plane extending in the front-rear direction and the right-left direction in the second space S2, projected positions of the printing tape roll 26 and the spacer films 38 are indicated by a dotted-and-dashed line in FIG. 16. The spacer films 38 have the same diameter as the diameter of the printing tape roll 26. In FIG. 16, the dotted-and-dashed line indicates the printing tape roll 26 and the spacer films 38 collectively. As illustrated in FIG. 16, the laminating tape roll 64, the ink ribbon roll 72, and the take-up spool 76 are disposed in positions overlapping the printing tape roll 26 in the up-down direction. At least a portion of the laminating tape roll 64 and at least a portion of the laminating tape spool 62 overlap the printing tape roll 26 in the up-down direction. More specifically, a portion of the laminating tape roll 64 and a portion of the laminating tape spool 62 overlap the printing tape spool 24 and the printing tape 22 wound around the printing tape spool 24 in the up-down direction, respectively.

In FIG. 16, the printing tape roll 26 and the spacer films 38 having the same diameter as that of the printing tape overlap at least a portion of the laminating tape roll 64 including the laminating tape spool 62, the second rotation axis C2 thereof, at least a portion of the ink ribbon roll 72, the third rotation axis C3 thereof, at least of the take-up spool 76, the fourth rotation axis C4 thereof, at least a portion of the recess 99, and at least a portion of the recess wall 16*c* in the up-down direction. The laminating tape roll 64, the second rotation axis C2 thereof, the ink ribbon roll 72, the third rotation axis C3 thereof, the take-up spool 76, the fourth rotation axis C4 thereof, the recess 99, and the recess wall 16*c* are located in a projected area of the printing tape roll 26 and the spacer films 38 projected in the up-down direction. At least a portion of the recess 99 and at least a portion of the recess wall 16*c* overlap the printing tape spool 24 in the up-down direction. In the left-right direction, a portion of the printing tape roll 26 and the first rotation axis C1 that is a rotation axis of the printing tape spool 24 are located between a right end 99*a* and left end 99*b* of the recess 99. The right end 99*a* is one end of the recess 99 in the left-right direction, and the left end 99*b* is the other end of the recess 99 in the left-right direction, respectively. The first rotation axis C1 that is a rotation axis of the printing tape spool 24 is located between the outlet 130 and the right end 99*a* of the recess 99 in the left-right direction. The laminating tape spool 62 is located between the right end 99*a* and left end 99*b* of the recess 99 in the left-right direction. The second rotation axis C2 that is a rotation axis of the laminating tape spool 62 is located between the outlet 130 and the right end 99*a* of the recess 99 in the left-right direction. In FIG. 16, a center position M is a center of the cassette 10 in the front-rear direction and the left-right direction. In the front-rear direction and the left-right direction, a distance from the center position M to the first rotation axis C1 of the printing tape roll 26 is set to less than a distance from the center position M to the recess 99.

Figure 17:
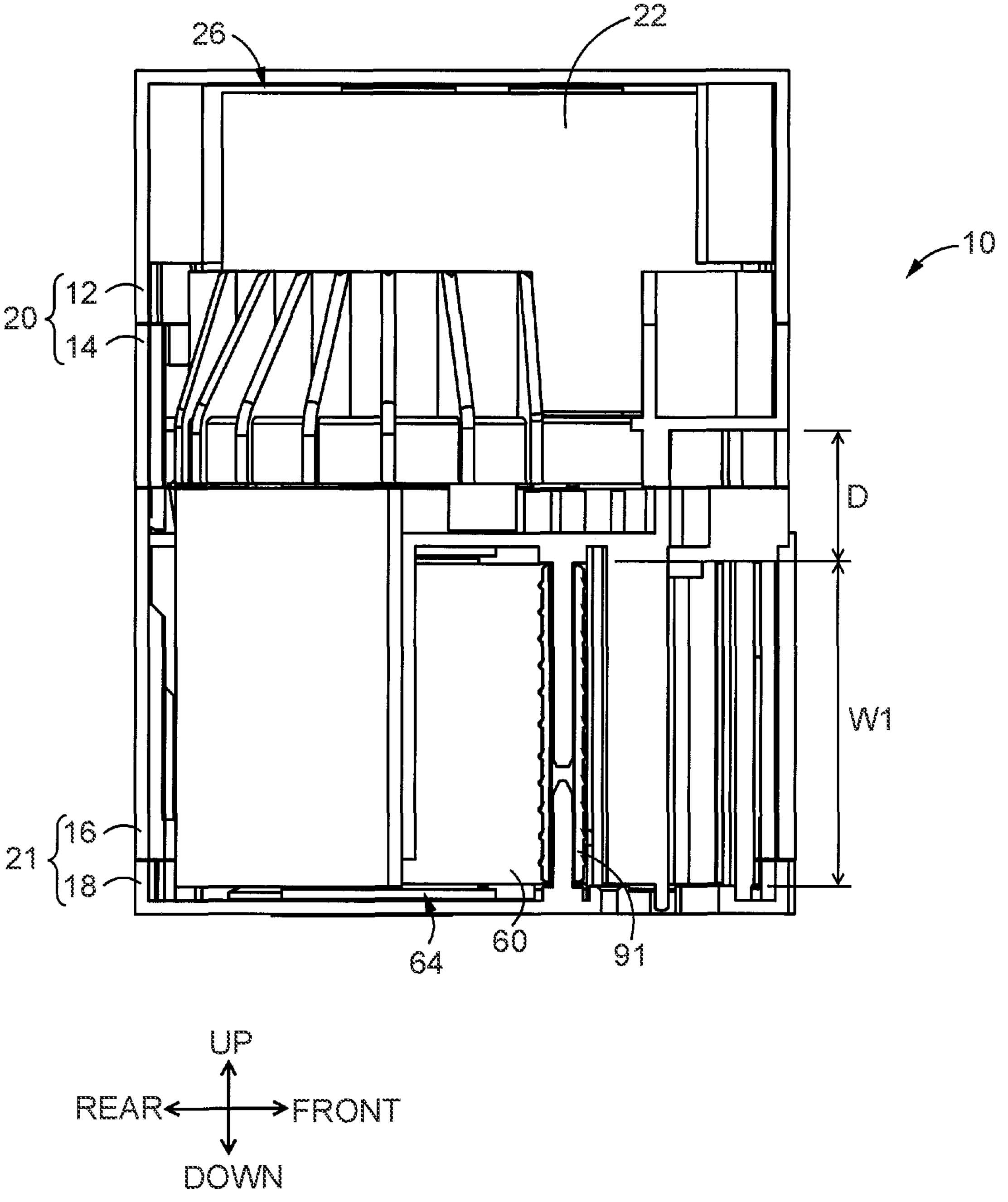
FIG. 17 is a sectional view taken along line XVII-XVII of FIG. 6.

FIG. 17 is a sectional view taken along line XVII-XVII of FIG. 6. In the up-down direction, a distance D between one end (e.g., a lower end) of the printing tape roll 26 and the other end (e.g., an upper end) of the laminating tape roll 64 is less than a width W1 of the laminating tape 60. The printing tape 22 and the laminating tape 60 have the same width. Thus, the distance D is less than the width of the printing tape roll 26.

Figure 18:
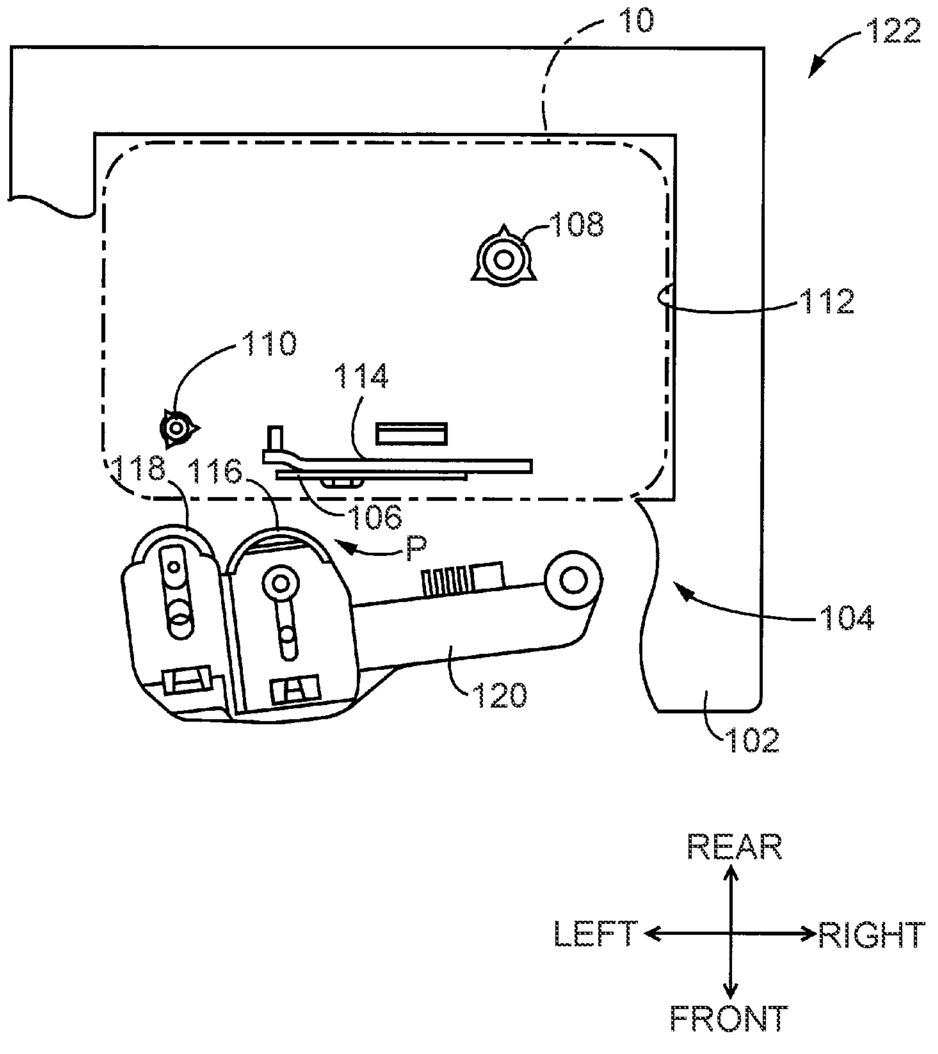
FIG. 18 illustrates a cassette mounting portion of a printing device on which the cassette of FIG. 1 is to be mounted.

FIG. 18 illustrates the cassette mounting portion 104 of the printing device 102 included in a printing system 122. The cassette mounting portion 104 is provided with a rectangular positioning hole 112 for positioning the cassette 10 inserted therein, and the take-up spool drive shaft 108 and the roller drive shaft 110 standing on a lower surface of the positioning hole 112. The positioning hole 112 functions as a receiving portion for receiving a portion of the ribbon case 21, which is a lower case of the cassette 10. The take-up spool drive shaft 108 and the roller drive shaft 110 are driven to rotate in the same direction by a stepping motor via a gearing system. A head holding plate 114 to which the thermal print head 106 is fixed stands on the lower surface of the positioning hole 112 of the cassette mounting portion 104, and a platen holding member 120 provided with, at its distal end portion, the platen roller 116 and the pressing roller 118, is provided rotatably about its proximal end. The head holding plate 114 is a metal plate made of, for example, aluminum, and also serves as a heat sink of the print head.

The take-up spool drive shaft 108 and the roller drive shaft 110 standing on the cassette mounting portion 104 are to be coupled to the take-up spool 76 and the roller 80, respectively, as the cassette 10 is mounted on the cassette mounting portion 104 of the printing device 102. As a cover of the printing device 102 is closed with the cassette 10 mounted on the cassette mounting portion 104, the platen holding member 120 pivots about the proximal end thereof so that the platen roller 116 and the pressing roller 118 are pressed against the print head 106 and the roller 80 of the cassette 10, respectively. The printing device 102 and the cassette 10 constitute the printing system 122.

The cassette 10 according to the present embodiment includes: (a) a printing tape roll 26 being rotatable and into which a printing tape 22 as a medium to be printed is wound; and (b) an outer peripheral wall 16*w* disposed on one side in a first direction (i.e., on a lower side) relative to the printing tape roll 26, the first direction being a width direction of the printing tape 22, the outer peripheral wall 16*w* including: a first sidewall 16*a* extending in a second direction orthogonal to the first direction; a second sidewall 16*b* extending in a third direction orthogonal to the first direction and intersecting with the second direction; and a recess wall 16*c* defining a recess 99 extending from the second sidewall 16*b* toward one side in the second direction, and (c) at least a portion of the recess 99 overlaps the printing tape roll 26 in the first direction. The cassette 10 is thus downsized in a direction orthogonal to the up-down direction, as the printing tape roll 26 and the recess wall 16*c* below the printing tape roll 26 overlap each other in the first direction, that is, the up-down direction, and at least a portion of the recess 99 overlaps the printing tape roll 26 in the first direction.

According to the cassette 10 of the present embodiment, in the printing tape roll 26, the printing tape 22 is wound around the printing tape spool 24 that is rotatable, and at least a portion of the recess wall 16*c* overlaps the printing tape spool 24 in the first direction. The cassette 10 is thus downsized in a direction orthogonal to the up-down direction as compared with a case where at least a portion of the recess wall 16*c* does not overlap the printing tape spool 24 in the first direction.

According to the cassette 10 of the present embodiment, at least a portion of the recess 99 overlaps the printing tape spool 24 in the first direction. The cassette 10 is thus downsized in a direction orthogonal to the up-down direction as compared with a case where at least a portion of the recess 99 does not overlap the printing tape spool 24 in the first direction.

According to the cassette 10 of the present embodiment, the first rotation axis C1 that is a rotation axis of the printing tape roll 26 is located between one end 99*a* of the recess 99 and the other end 99*b* thereof in the third direction. The cassette 10 is thus downsized in a direction orthogonal to the up-down direction as compared with a case where the first rotation axis C1 is not located between one end of the recess 99 and the other end thereof in the third direction.

According to the cassette 10 of the present embodiment, in the printing tape roll 26, the printing tape 22 is wound around the printing tape spool 24 that is rotatable, and at least a portion of the printing tape spool 24 is located between one end 99*a* of the recess 99 and the other end 99*b* thereof in the third direction. The cassette is thus downsized in a direction orthogonal to the up-down direction as compared with a case where at least a portion of the printing tape spool 24 is not located between one end 99*a* of the recess 99 and the other end 99*b* thereof in the third direction.

According to the cassette 10 of the present embodiment, the first rotation axis C1 that is a rotation axis of the printing tape spool 24 is located between the outlet 130 and one end of the recess 99 in the third direction. The cassette 10 is thus downsized in a direction orthogonal to the up-down direction as compared with a case where the first rotation axis C1 of the printing tape spool 24 is not located between the outlet 130 and one end of the recess 99 in the third direction.

According to the cassette 10 of the present embodiment, the cassette 10 includes a tape case (e.g., a first case) 20 in which the printing tape roll 26 is accommodated, and a ribbon case (e.g., a second case) 21 which is located on the one side in the first direction relative to the tape case 20 and has the outer peripheral wall 16*w*. The ribbon case 21 has the outlet 130 that is defined by the second sidewall 16*b* and is located between the one end 99*a* of the recess 99 and the other end 99*b* thereof in the third direction to discharge the printing tape 22 to be fed from the printing tape roll 26 from the tape case 20 toward the recess 99. In the third direction, the first rotation axis C1 that is a rotation axis of the printing tape spool 26 is located between the outlet 130 and one end of the recess 99 in the third direction. The cassette 10 is thus downsized in a direction orthogonal to the up-down direction as compared with a case w % here the first rotation axis C1 of the printing tape roll 26 is not located between the outlet 130 and one end 99*a* of the recess 99 in the third direction.

According to the cassette 10 of the present embodiment, the recess 99 overlaps at least a portion of the tape case (e.g., a first case) 20 in the first direction. The cassette is thus downsized in a direction orthogonal to the up-down direction as compared with a case where the recess 99 does not overlap at least a portion of the tape case (as the first case) 20 in the first direction.

The cassette 10 according to the present embodiment includes: a feed spool 70 rotatable and disposed on the one side in the first direction relative to the printing tape roll 26, the feed spool 70 around which an ink ribbon 68 is wound, the ink ribbon 68 to be used for printing on the printing tape 22 fed from the printing tape roll 26; and a take-up spool 76 disposed on the one side in the first direction relative to the printing tape roll 26, the take-up spool 76 being rotatable to take up the ink ribbon 68 fed from the feed spool 70, and at least a portion of the feed spool 70 and at least a portion of the take-up spool 76 overlap the printing tape roll 26 in the first direction. The cassette 10 is thus downsized in a direction orthogonal to the up-down direction as compared with a case where at least a portion of the feed spool 70 and at least a portion of the take-up spool 76 do not overlap the printing tape spool 26 in the first direction.

According to the cassette 10 of the present embodiment, the cassette 10 includes the laminating tape roll 64 disposed on one side of the printing tape roll 26 in the first direction and including the laminating tape roll 64 into which the laminating tape 60 to be adhered to the printing tape 22 is wound. The laminating tape roll 64 is rotatable. At least a portion of the laminating tape roll 64 overlaps the printing tape roll 26 in the first direction. The cassette 10 is thus downsized in a direction orthogonal to the up-down direction as compared with a case where at least a portion of the laminating tape roll 64 does not overlap the printing tape roll 26 in the first direction.

According to the cassette 10 of the present embodiment, in the laminating tape roll 64, the laminating tape 60 is wound around the laminating tape spool 62, and the laminating tape spool 62 overlaps the printing tape roll 26 in the first direction. The cassette 10 is thus downsized in a direction orthogonal to the up-down direction as compared with a case where the laminating tape spool 62 does not overlap the printing tape roll 26 in the first direction.

According to the cassette 10 of the present embodiment, the second rotation axis C2 that is a rotation axis of the laminating tape spool 62 is located between one end 99*a* of the recess 99 and the other end 99*b* thereof in the third direction. The cassette 10 is thus downsized in a direction orthogonal to the up-down direction as compared with a case where the second rotation axis C2 of the laminating tape spool 62 is not located between one end 99*a* of the recess 99 and the other end 99*b* thereof in the third direction.

According to the cassette 10 of the present embodiment, in the second direction and the third direction, the distance from the center position M, which is the center of the cassette 10 in the second direction and the third direction, to the first rotation axis C1 of the printing tape roll 26 is less than the distance from the center position M to the recess 99. The cassette 10 is thus downsized in a direction orthogonal to the up-down direction as compared with a case where the distance from the center position M of the cassette 10 to the first rotation axis C1 of the printing tape roll 26 is greater than the distance from the center position M to the recess 99.

The cassette 10 according to the present embodiment includes: (a) a printing tape roll 26 into which a printing tape 22 is wound; (b) a spacer film 38 disposed in contact with the printing tape roll 26 in a first direction, and (c) an outer peripheral wall 16*w* disposed on one side in the first direction relative to the printing tape roll 26 and the spacer film 38, the outer peripheral wall 16*w* including: a first sidewall 16*a* extending in a second direction orthogonal to the first direction; a second sidewall 16*b* extending in a third direction orthogonal to the first direction and intersecting with the second direction; and a recess wall 16*c* shaped like a U letter to define a recess 99 extending from the second sidewall 16*b* toward one side in the second direction, the recess 99 extending in the third direction on one side in the second direction further than the second sidewall 16*b* (e.g., on the left side of FIG. 16), and (d) at least a portion of the recess 99 overlaps the spacer film 38 in the first direction. The cassette 10 can thus be downsized in a direction orthogonal to the up-down direction as at least a portion of the recess 99 overlaps the spacer film 38 in the first direction.

Second Embodiment

Next, another embodiment of the disclosure will be described. In the following description, portions common to the embodiments are denoted by the same reference numerals, and description thereof will be omitted.

Figure 19:
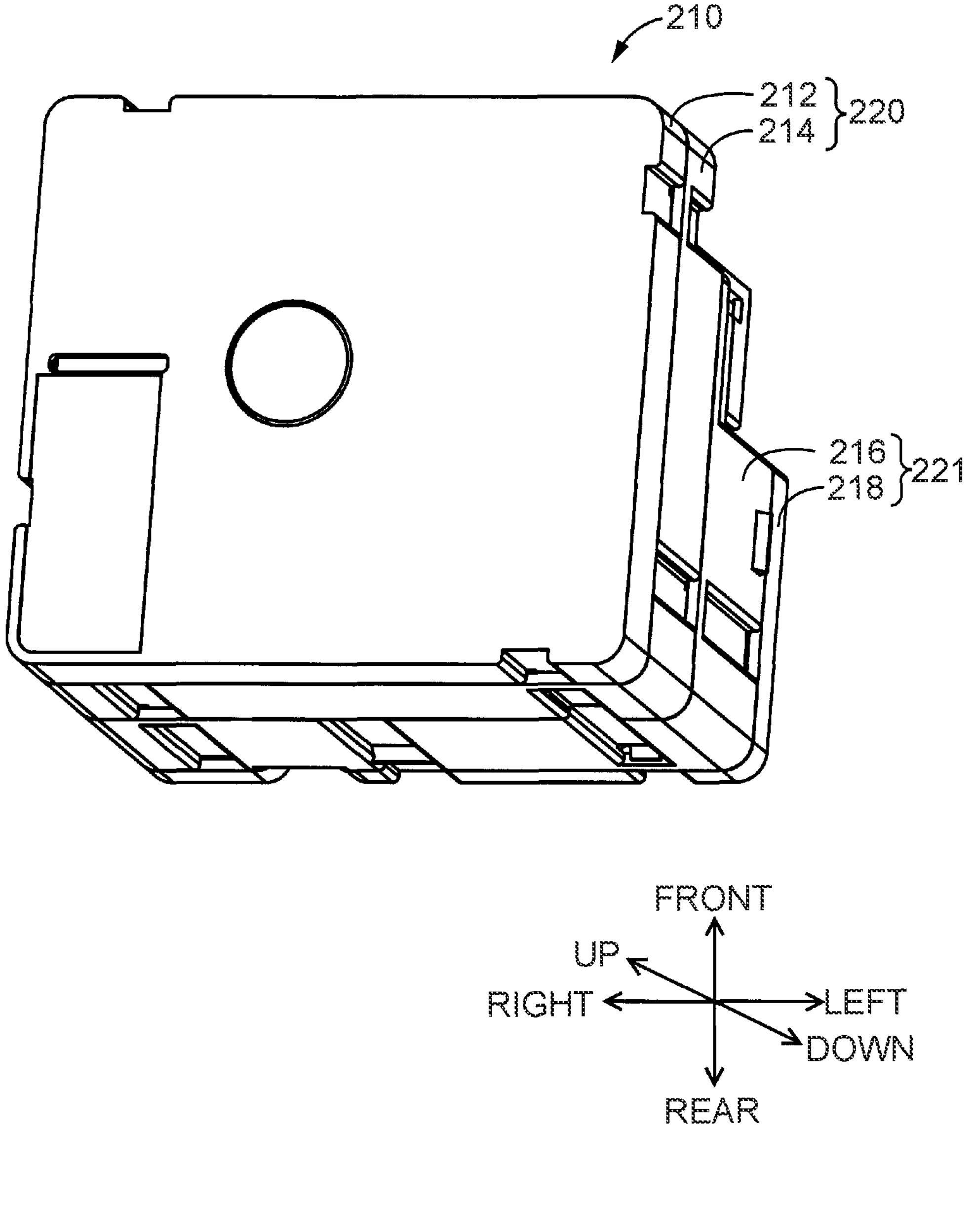
FIG. 19 is a perspective view illustrating an upper surface side of a non-laminated type cassette according to a second embodiment of the disclosure.
Figure 20:
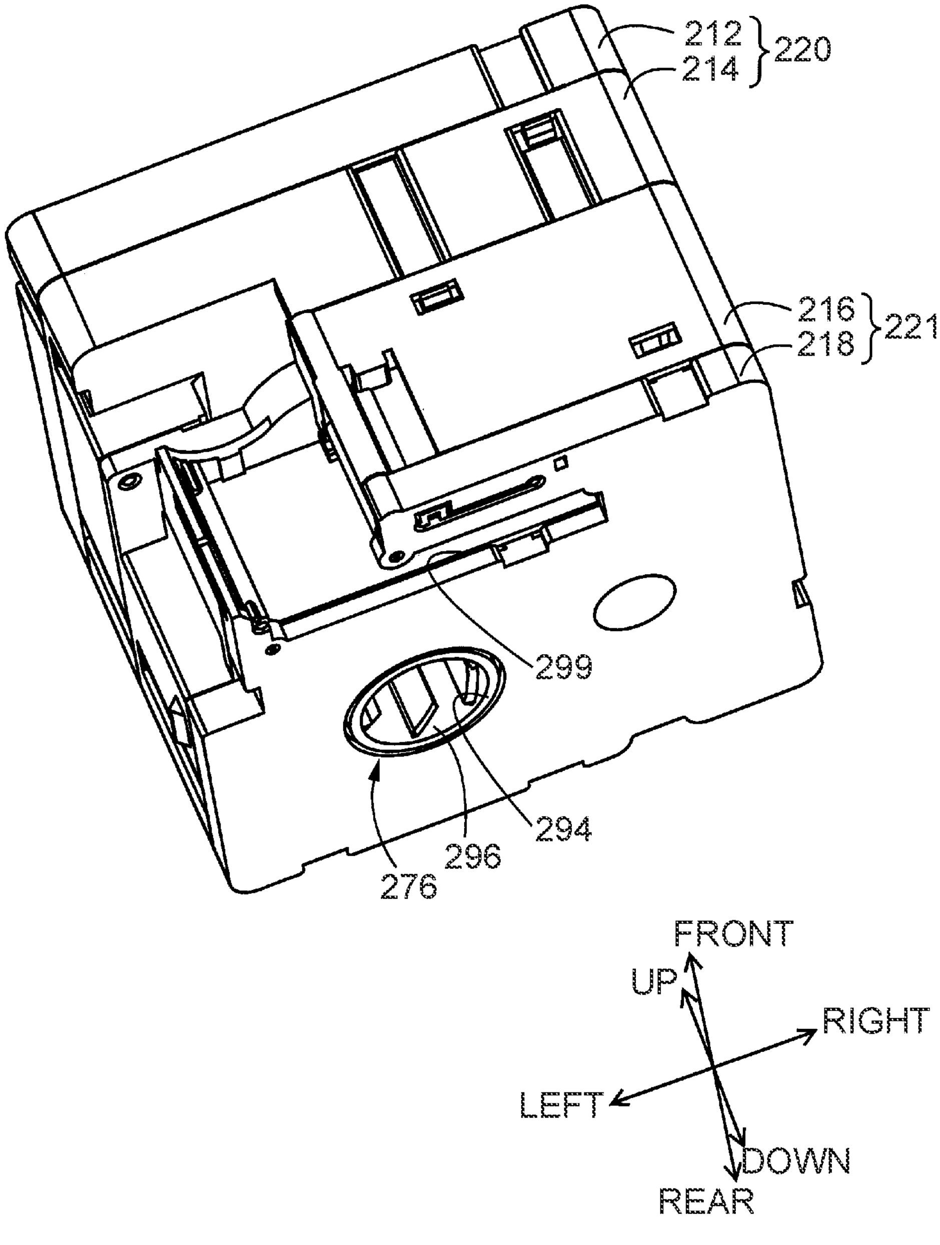
FIG. 20 is a perspective view illustrating a lower surface side of the cassette of FIG. 19.

FIG. 19 is a perspective view illustrating an obverse surface side, that is, an upper surface side, of a cassette 210 according to another embodiment of the disclosure. FIG. 20 is a perspective view illustrating a back surface side, that is, a lower surface side, of the cassette 210. The cassette 210 is of a non-laminated type without the use of the laminating tape roll 64. The cassette 210 has a rectangular parallelepiped shape as a whole. The cassette 210 is detachably attached to a printing device, which is configured similarly to the printing device 102 illustrated in FIG. 18. Although the printing device according to the second embodiment has dimensions slightly different from the dimensions of the printing device 102 and does not include the roller drive shaft 110, the printing device 102 of FIG. 18 is used as the printing device of the second embodiment. The cassette 210 of the present embodiment is a non-laminated type cassette that does not include the laminating tape roll 64 and the roller 80. Thus, the cassette 210 is smaller in size than the cassette 10 that is a laminated-type cassette. The cassette 210 includes a first case or tape case 220 and a second case or ribbon case 221 similarly to the cassette 10. The tape case 220 includes a first case member 212 and a second case member 214. The ribbon case 221 includes a third case member 216 and a fourth case member 218. The first case member 212, the second case member 214, the third case member 216, and the fourth case member 218 are stacked on one another in an up-down direction as illustrated in FIG. 19. The first case member 212, the second case member 214, the third case member 216, and the fourth case member 218 include locking claws 227, fixing claws 228, and positioning projections 229 at appropriate positions of their peripheral walls. The first case member 212, the second case member 214, the third case member 216, and the fourth case member 218 are mutually stacked on and fixed to one another by engagement between the locking claws 227 and the fixing claws 228 and by positioning at the positioning projections 229. In the present embodiment, a surface of each of the case members 212 to 218 facing upward is referred to as an upper surface or obverse surface of each of the case members 212 to 218, and a surface of each of the case members 212 to 218 facing downward is referred to as a lower surface or back surface of each of the case members 212 to 218.

The ribbon case 221 is positioned on one side in the up-down direction relative to the tape case 220. In other words, the ribbon case 221 is positioned on one side of the tape case 220 in the up-down direction. In the present embodiment, the ribbon case 221 is positioned on a lower side, which is one side, in the up-down direction relative to the tape case 220. The tape case 220 defines therein a first space S1 in which a printing tape roll 226, into which a printing tape 222 as a medium to be printed is wound, is rotatably accommodated. In the printing tape roll 226, the printing tape 222 that is a continuous strip is wound around a printing tape spool 224 that is a cylindrical shaft core member. The printing tape 222 is wound such that a width direction of the printing tape 222 corresponds to the up-down direction that is an example of a first direction. A radial direction of the printing tape roll 226 is the front-rear direction and the right-left direction, and the radial direction is an orthogonal direction orthogonal to the up-down direction. The orthogonal direction can be referred to as any direction parallel to a plane orthogonal to the up-down direction. The printing tape 222, the printing tape spool 224, and the printing tape roll 226 correspond to a printing medium, a printing medium spool, and a printing medium roll, respectively. The ribbon case 221 defines therein a second space S2 in which an ink ribbon roll 272 and a take-up spool 276 are rotatably accommodated. In the ink ribbon roll 272, an ink ribbon 268 that is a continuous strip is wound around a take-up spool 276 such that a width direction of the ink ribbon 268 corresponds to the up-down direction. The ink ribbon 268 is used for printing to be performed on the printing tape 222 that is a continuous strip. The take-up spool 276 takes up the ink ribbon 268 to be drawn from the ink ribbon roll 272.

As illustrated in FIG. 20, the fourth case member 218 of the cassette 210 has a take-up spool support hole 294 in the lower surface of the fourth case member 218. A coupling hole 296, described later, in the take-up spool 276 is exposed from the take-up spool support hole 294. The coupling hole 296 is to receive therein a take-up spool drive shaft 108 provided in the cassette mounting portion 104, on which the cassette 210 is mounted, of the printing device 102. A recess 299 is defined by a side surface of the third case member 216 and a side surface of the fourth case member 218 that are a part of an outer peripheral wall 216*w* of the ribbon case 221, and a part of an outer peripheral wall of the second case member 214. The recess 299 is to receive therein the print head 106 provided in the cassette mounting portion 104, on which the cassette 210 is mounted, of the printing device 102. As illustrated in FIG. 20, the upper end of the recess 299 is defined by a lower surface of the second case member 214.

Figure 21:
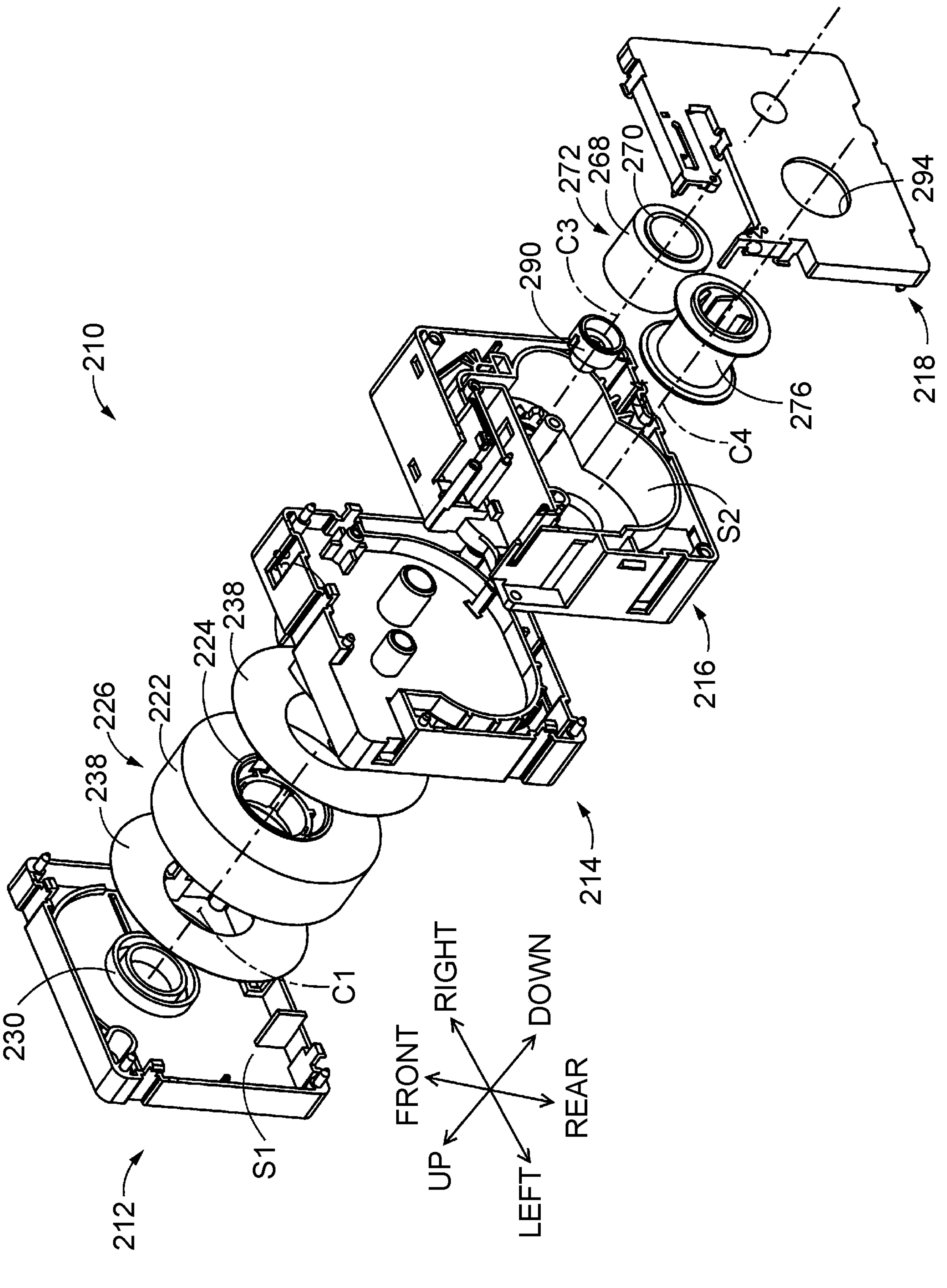
FIG. 21 is a disassembled perspective view of the cassette of FIG. 19, illustrating a configuration of a case of the cassette and an internal configuration of the cassette, wherein the case includes a first case member, a second case member, a third case member, and a fourth case member.
Figure 22:
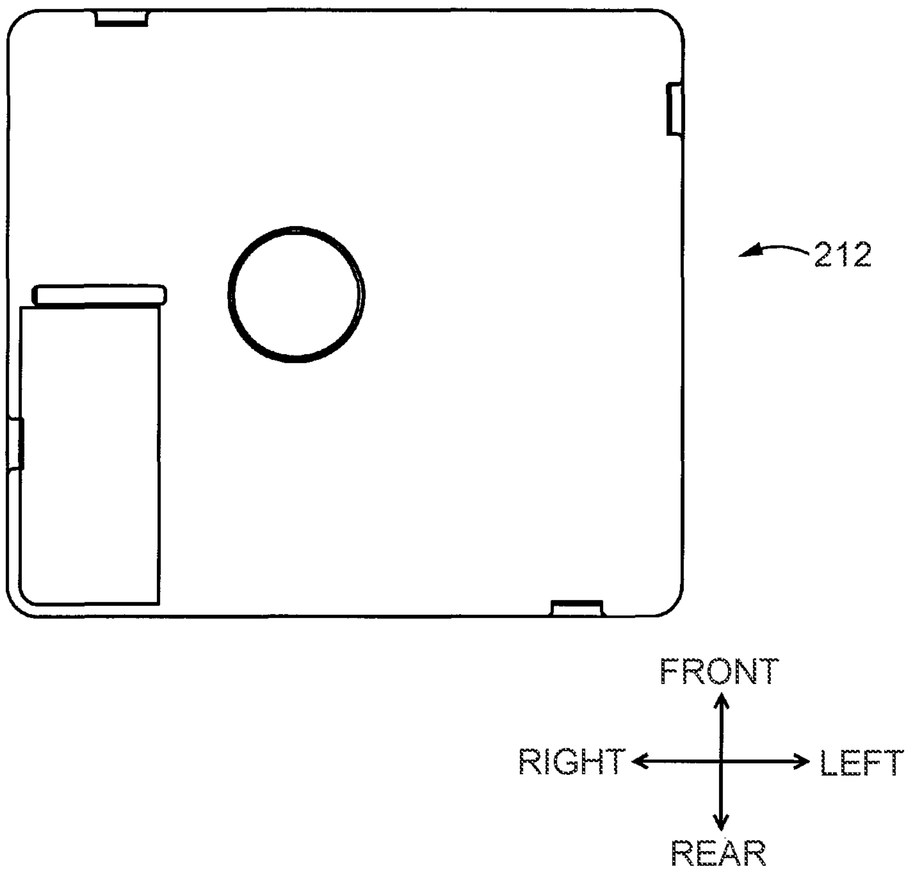
FIG. 22 is a front view illustrating an upper surface side of the first case member of FIG. 19.
Figure 23:
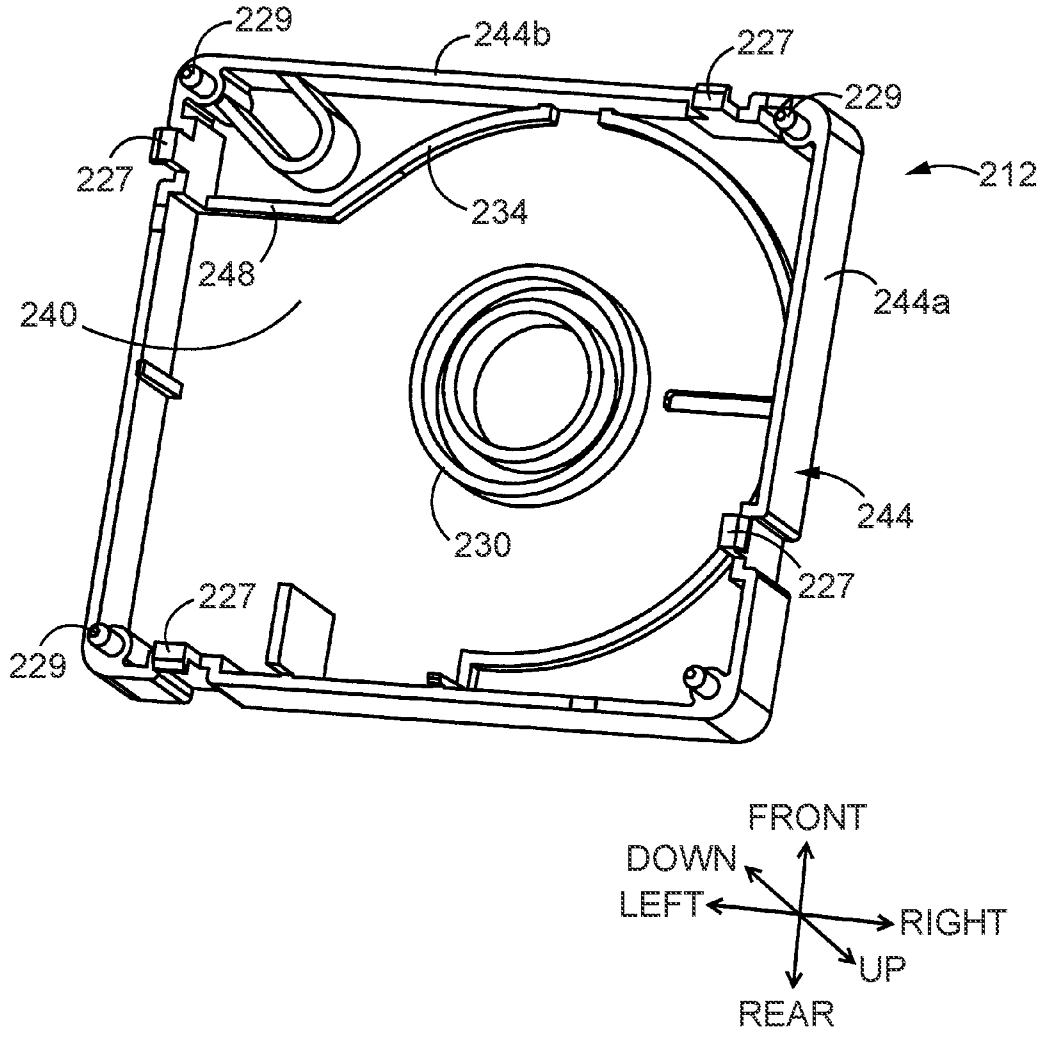
FIG. 23 is a perspective view illustrating a lower surface side of the first case member of FIG. 19.
Figure 24:
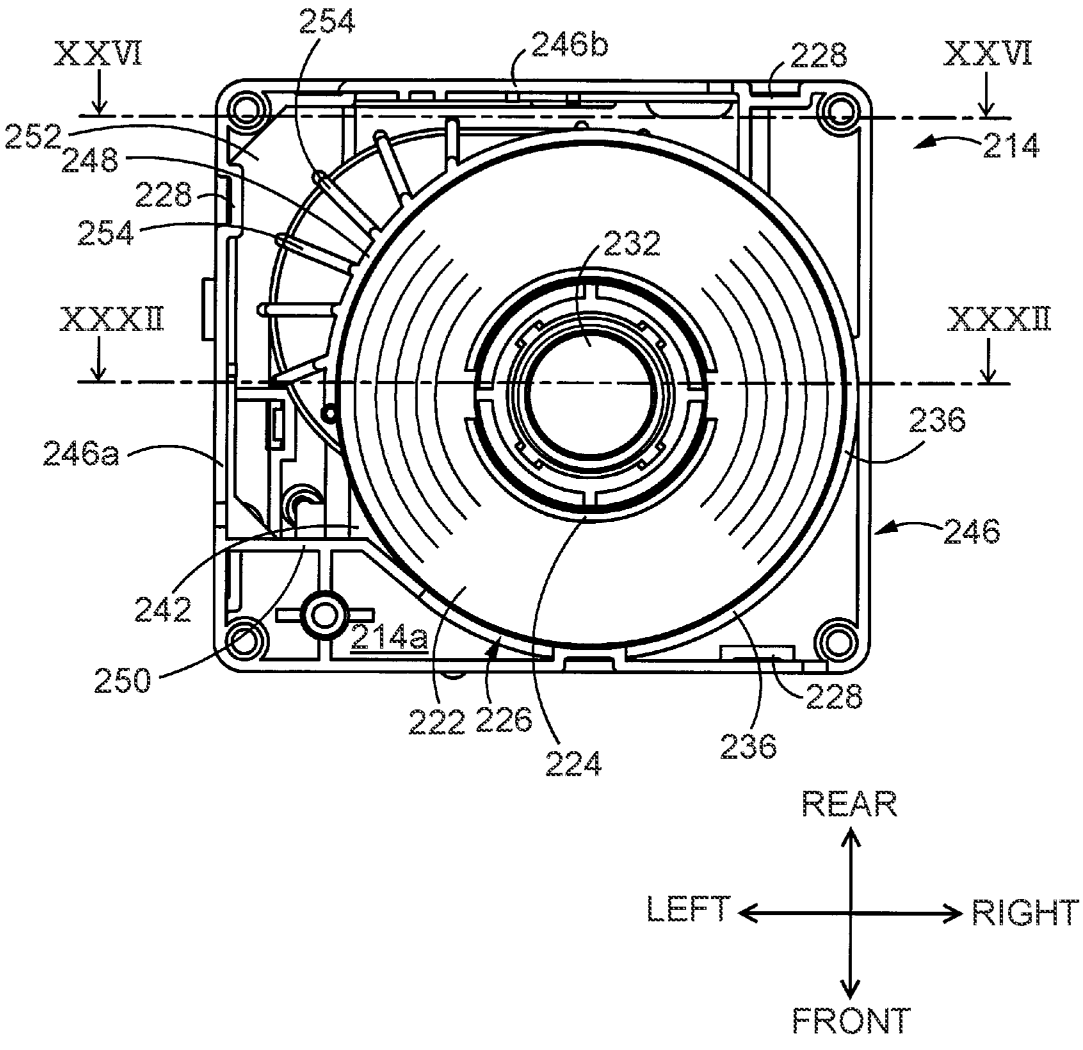
FIG. 24 is a front view illustrating an upper surface side of the second case member of FIG. 19 with a printing tape roll.
Figure 25:
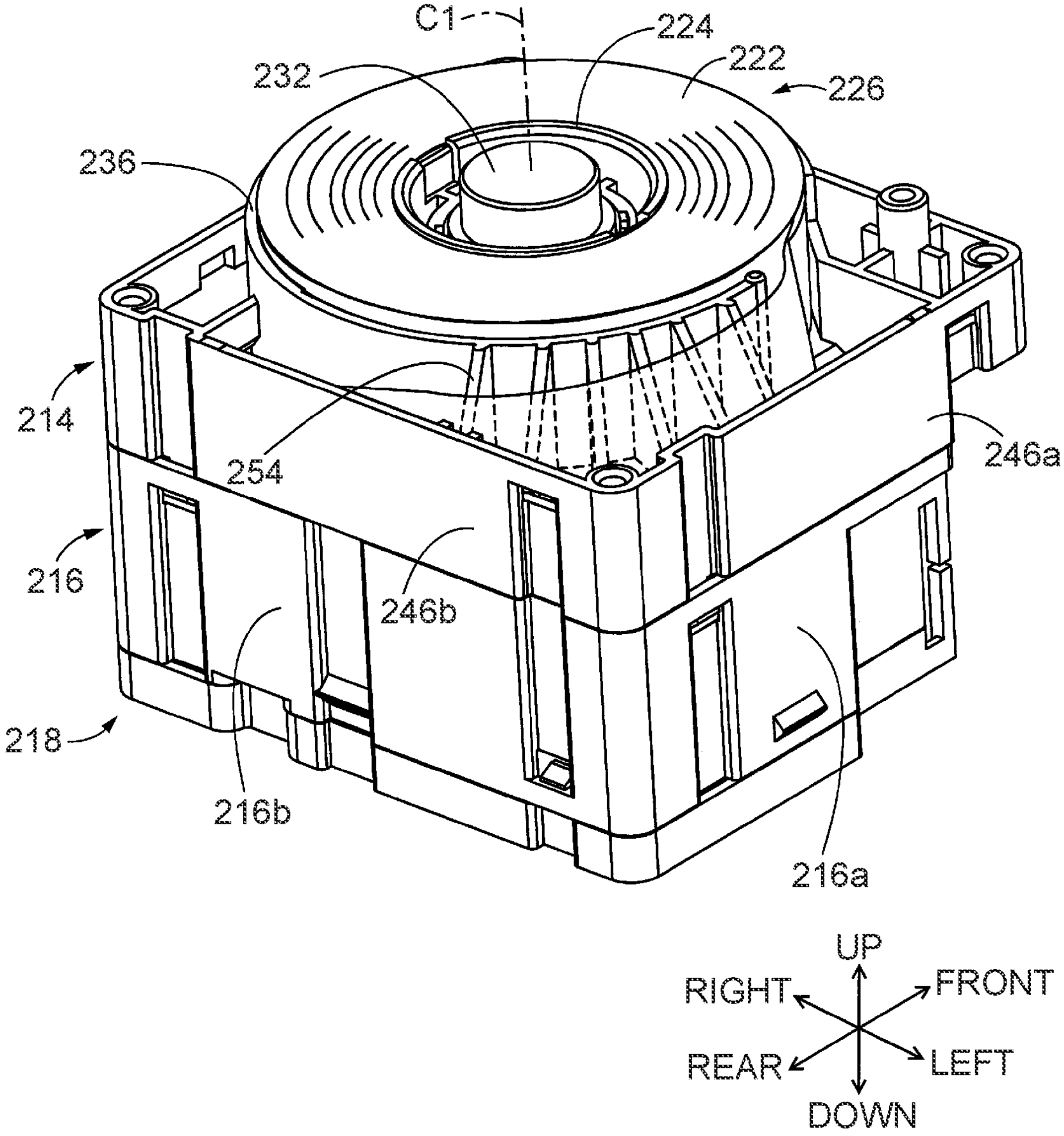
FIG. 25 is a perspective view of the cassette of FIG. 19 with the first case member removed.
Figure 26:
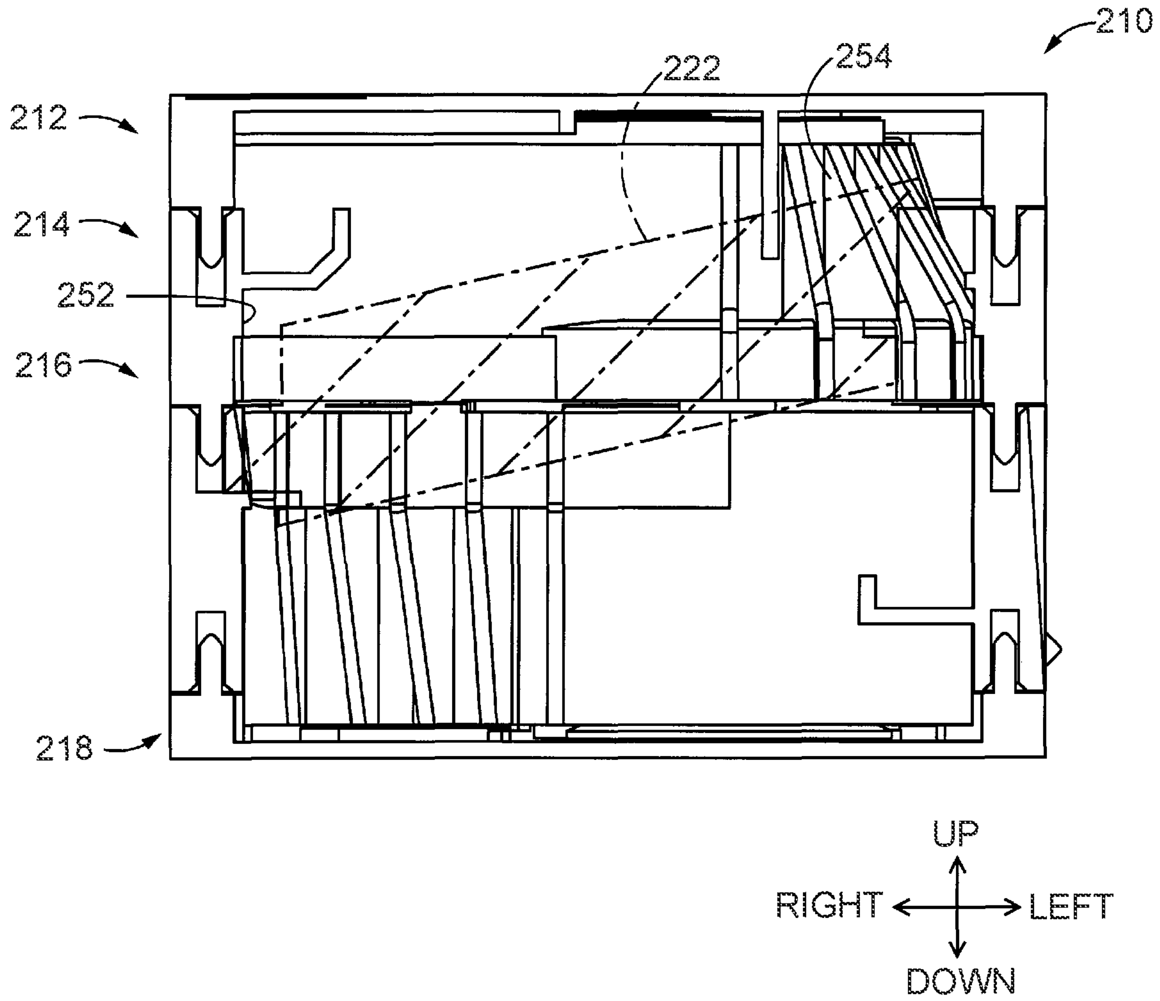
FIG. 26 is a cross sectional view taken along line XXVI-XXVI in FIG. 24, illustrating a state where a printing tape extends from the inside of a tape case to the inside of a ribbon case in the cassette of FIG. 19.
Figure 27:
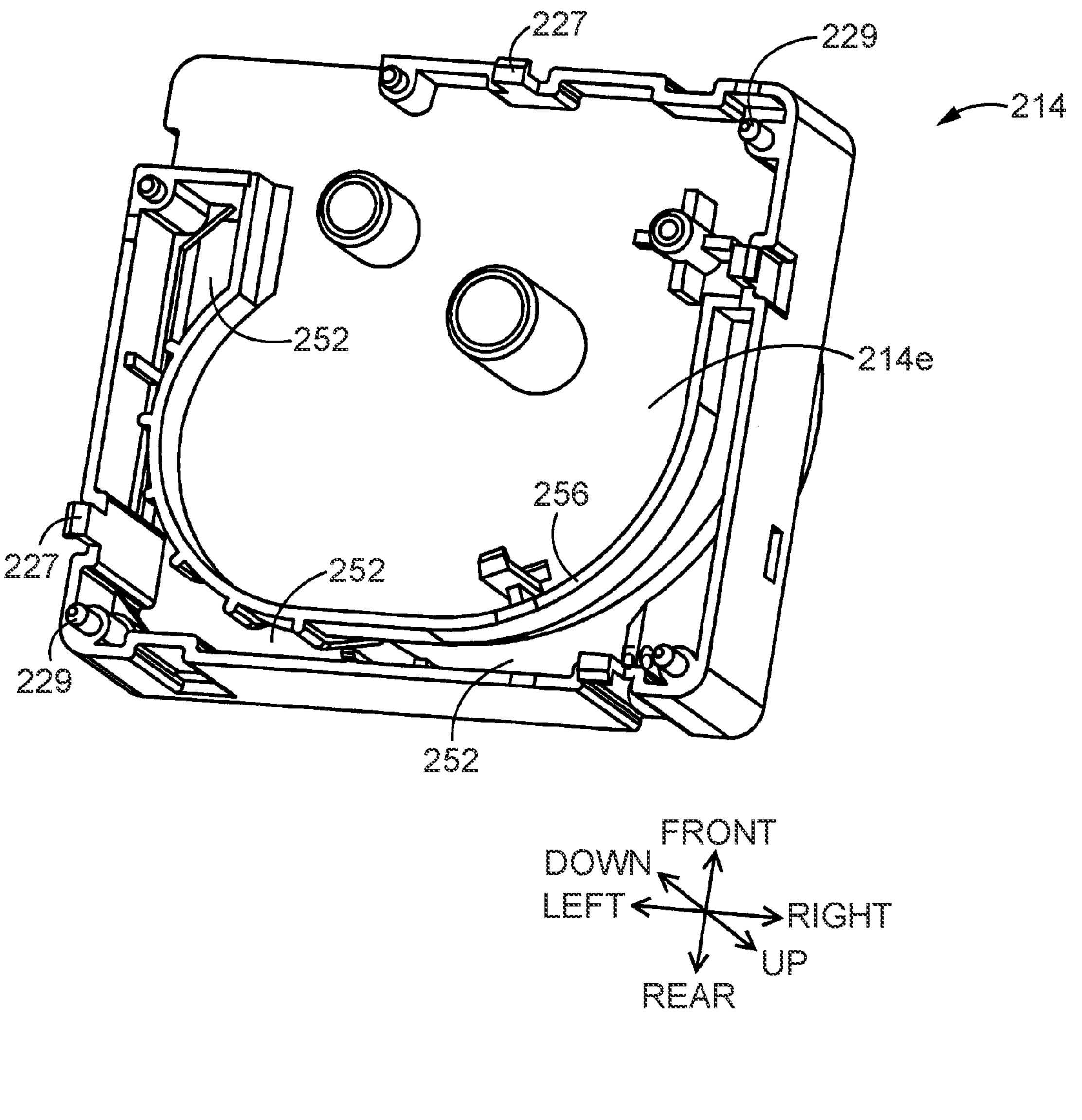
FIG. 27 is a perspective view illustrating a lower surface side of the second case member of FIG. 19.
Figure 28:
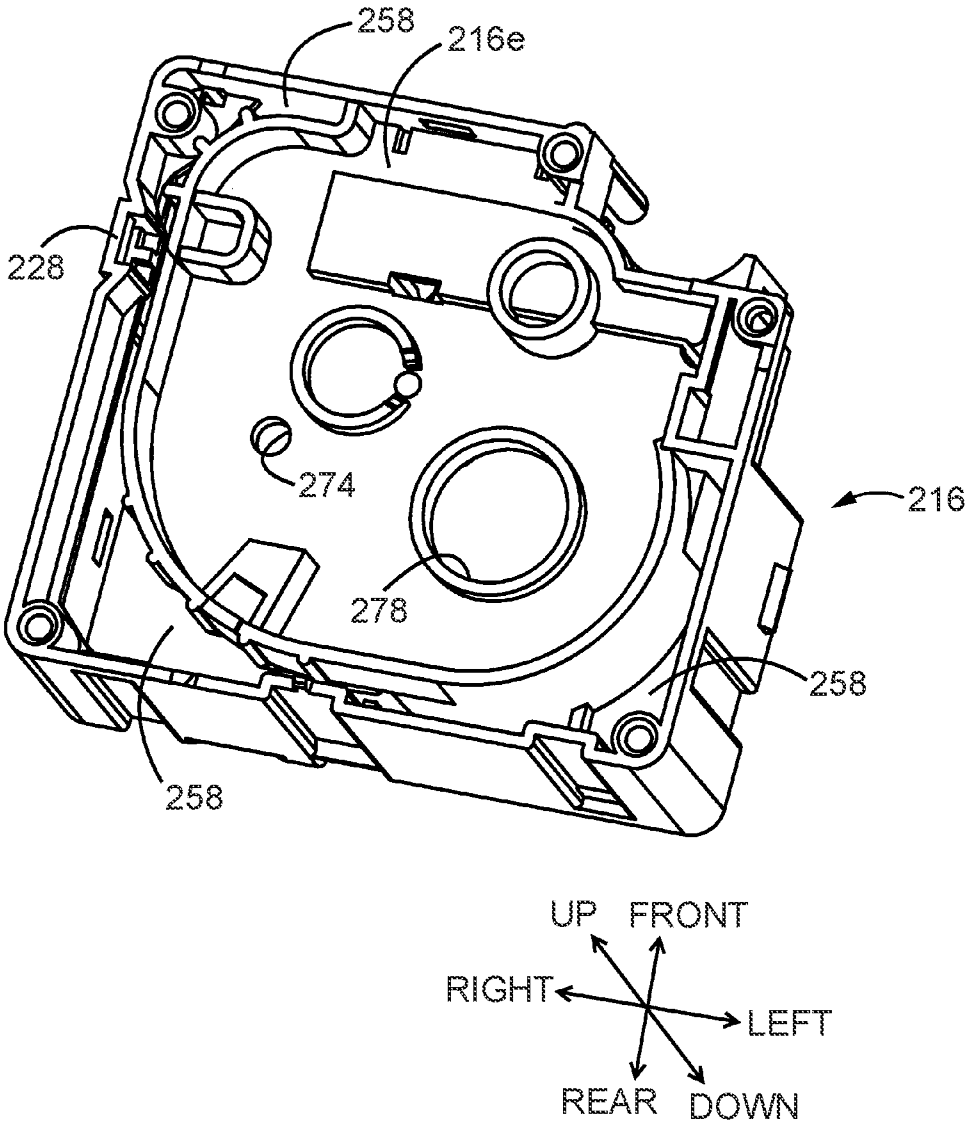
FIG. 28 is a perspective view illustrating an upper surface side of the third case member of FIG. 19.
Figure 29:
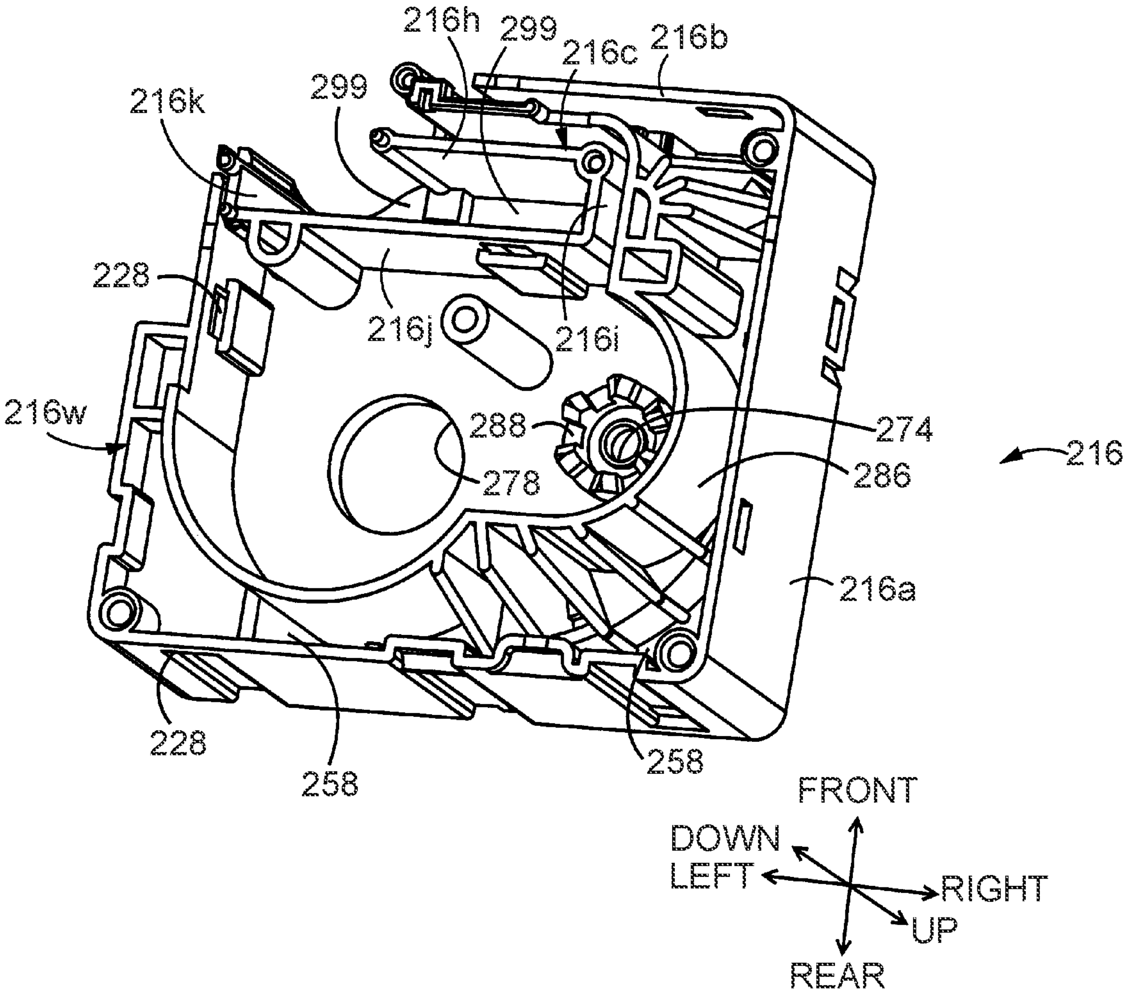
FIG. 29 is a perspective view illustrating a lower surface side of the third case member of FIG. 19.
Figure 30:
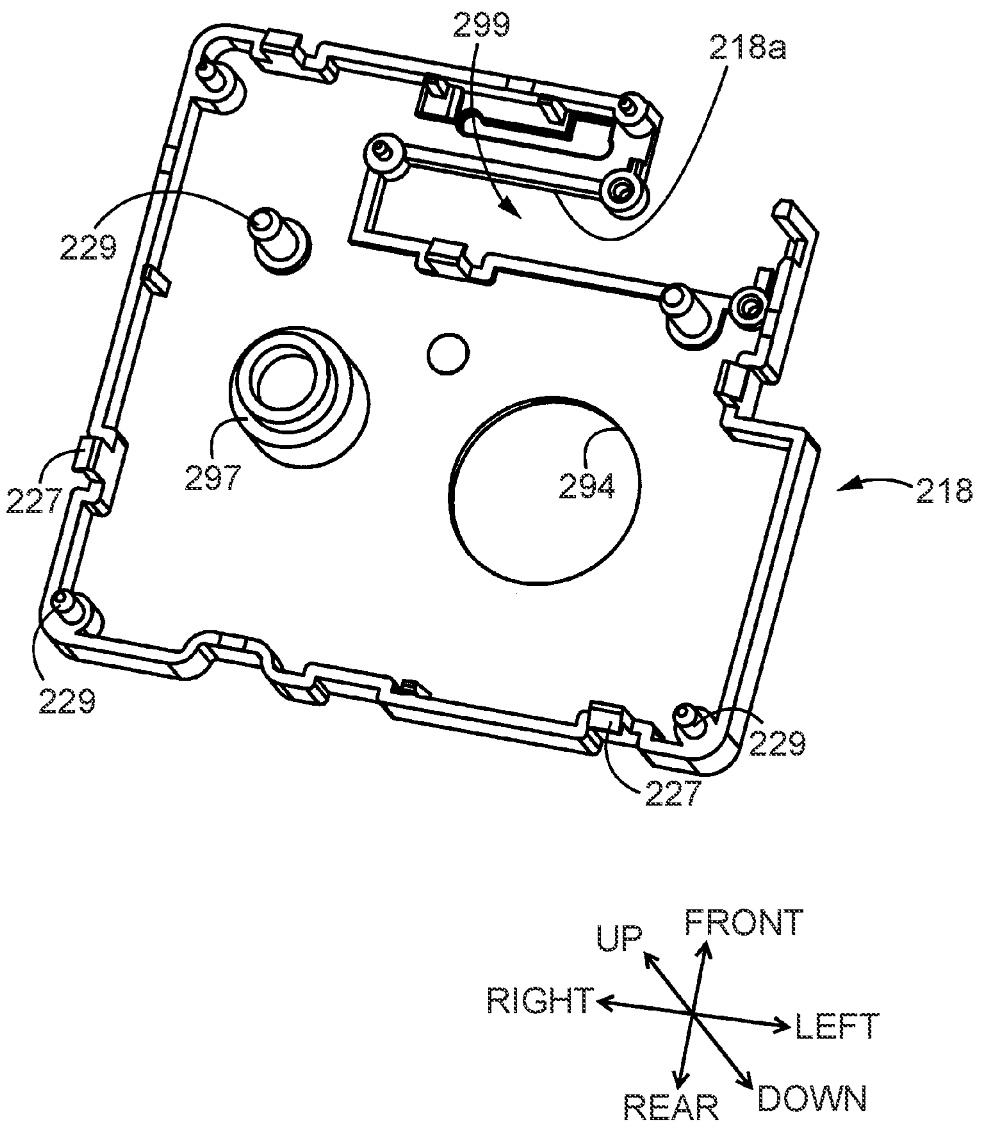
FIG. 30 is a perspective view illustrating an upper surface side of the fourth case member of FIG. 19.
Figure 31:
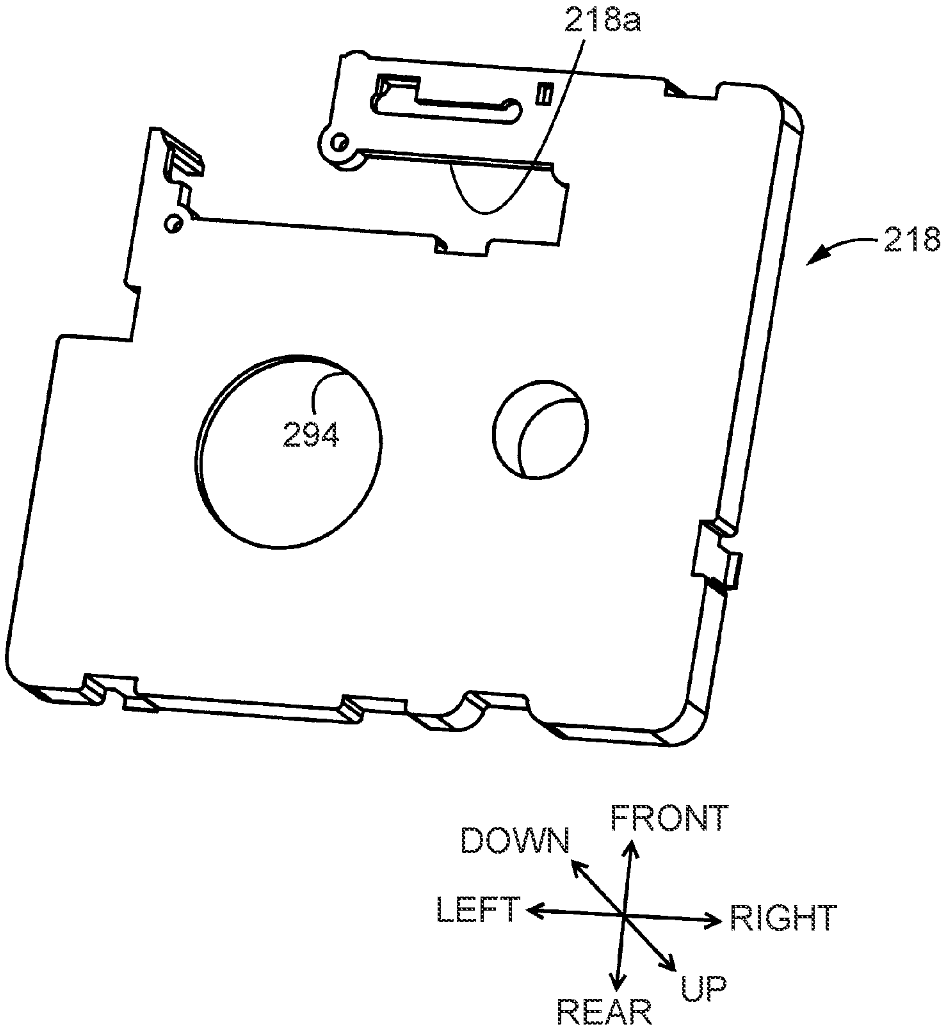
FIG. 31 is a perspective view illustrating a lower surface side of the fourth case member of FIG. 19.

FIG. 21 is a disassembled perspective view of the cassette 210, illustrating an internal configuration of the cassette 210, wherein the first case member 212, the second case member 214, the third case member 216, and the fourth case member 218 constituting the cassette 210 are disassembled. FIG. 22 is a front view illustrating the upper surface side of the first case member 212. FIG. 23 is a perspective view illustrating the lower surface side of the first case member 212. FIG. 24 is a front view illustrating the upper surface side of the second case member 214. FIG. 25 is a perspective view illustrating the lower surface side of the second case member 214. FIG. 26 is a cross sectional view taken along line XXVI-XXVI in FIG. 24, illustrating a state where the printing tape 222 extends from the inside of the tape case 220 to the inside of the ribbon case 221. FIG. 27 is a side view of the second case member 214. FIG. 28 is a perspective view illustrating the upper surface side of the third case member 216. FIG. 29 is a perspective view illustrating the lower surface side of the third case member 216. FIG. 30 is a perspective view illustrating the upper surface side of the fourth case member 218. FIG. 31 is a perspective view illustrating the lower surface side of the fourth case member 218.

Figure 34:
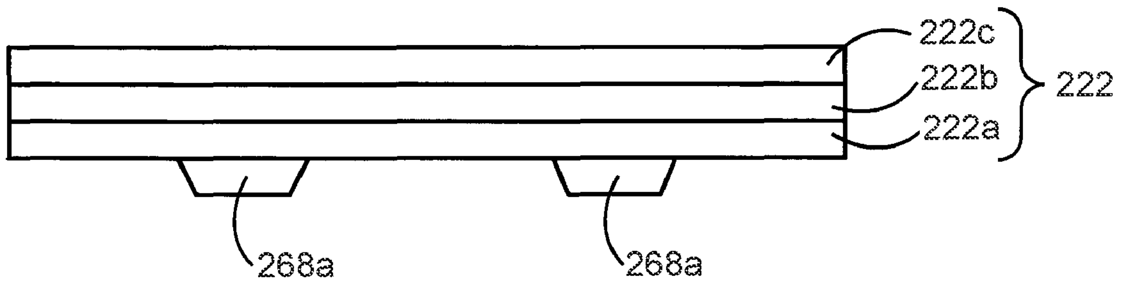
FIG. 34 illustrates a laminate of the printing tape and the laminating tape both discharged from the cassette of FIG. 19.

In the first space S1 defined between the first case member 212 and the second case member 214, the printing tape roll 226 is accommodated rotatably about a first rotation axis C1 extending parallel to the up-down direction. The first case member 212 and the second case member 214 each have a rectangular shape. The first rotation axis C1 is offset to the right from the centers of the first case member 212 and the second case member 214 in the right-left direction corresponding to the second direction, and is located in the vicinity of the centers of the first case member 212 and the second case member 214 in the front-rear direction corresponding to the third direction. For example, as illustrated in FIG. 34, the printing tape 222 is structured by stacking a to-be-printed tape 222*a*, an adhesive 222*b*, and a release tape 222*c*. The to-be-printed tape 222*a* has a printing surface.

The release tape 222*c* is stacked on a surface opposite to the printing surface of the to-be-printed tape 222*a* via the adhesive 222*b*.

As illustrated in FIGS. 21 and 23, a lower surface of the first case member 212 is provided with a cylindrical first support projection 230 and a first circular wall 234. The first support projection 230 is inserted into the cylindrical printing tape spool 224 to support the printing tape roll 226 so as to be rotatable. The first circular wall 234 has an inside diameter greater than an outside diameter of the printing tape roll 226. The first support projection 230 and the first circular wall 234 have an axis that is coaxial with the first rotation axis C1, and protrude downward from the lower surface of the first case member 212. As illustrated in FIGS. 24 and 25, an upper surface of the second case member 214 is provided with a cylindrical second support projection 232 and a second circular wall 236. The second support projection 232 is inserted into the cylindrical printing tape spool 224 to support the printing tape roll 226 rotatably. The second circular wall 236 has an inside diameter greater than the outside diameter of the printing tape roll 226. The second support projection 232 and the second circular wall 236 have an axis that is coaxial with the first rotation axis C1, and protrude upward from the upper surface of the second case member 214. The printing tape roll 226 is disposed between the first case member 212 and the second case member 214 while spacer films 238 are each positioned on an upper or lower side of the printing tape roll 226. Each spacer film 238 has a disc-shape having an outside diameter equal to the outside diameter of the printing tape roll 226.

As illustrated in FIGS. 23 and 24, in order for the printing tape 222 to be drawable from the printing tape roll 226 at a certain position, the first case member 212 defines, on its lower surface, a printing tape gate 240 formed by cutting off a portion of the first circular wall 234, and the second case member 214 defines, on its upper surface, a printing tape gate 242 formed by cutting off a portion of the second circular wall 236. As illustrated in FIG. 23, the first case member 212 defines, on its lower surface, a guide wall 248 extending leftward from the first circular wall 234 defining the printing tape gate 240 to guide the printing tape 222 drawn from the printing tape roll 226 in a predetermined direction. As illustrated in FIG. 24, the second case member 214 defines, on its lower surface, a guide wall 250 extending leftward from the second circular wall 236 defining the printing tape gate 242 to guide the printing tape 222 drawn from the printing tape roll 226 in a predetermined direction.

As illustrated in FIG. 24, a bottom plate 214*a* of the second case member 214 has a through hole 252 extending in the front-rear direction and in the right-left direction along a space between the second circular wall 236, a short side portion 246*a* of an outer peripheral wall 246, and a long side portion 46*b* thereof. The through hole 252 is substantially L-shaped in a front view. Guide ribs 254 are formed between the through hole 252 and a portion of the second circular wall 236 facing a corner at which the short side portion 246*a* and the long side portion 46*b* meet each other. The guide ribs 254 guide the printing tape 222 drawn from the printing tape roll 226 and fed through the printing tape gates 240 and 242 into the through hole 252. FIG. 25 illustrates the cassette 210 with the first case member 212 removed. As illustrated in FIG. 25, the printing tape 222 drawn from the printing tape roll 226 is guided via the through hole 252 to a second space S2 defined between the third case member 216 and the fourth case member 218. The printing tape 222 thus extends between the tape case 220 and the ribbon case 221 via the through hole 252 defined in the bottom plate 214*a* that separates the first space S1 and the second space S2 from each other.

Figure 33:
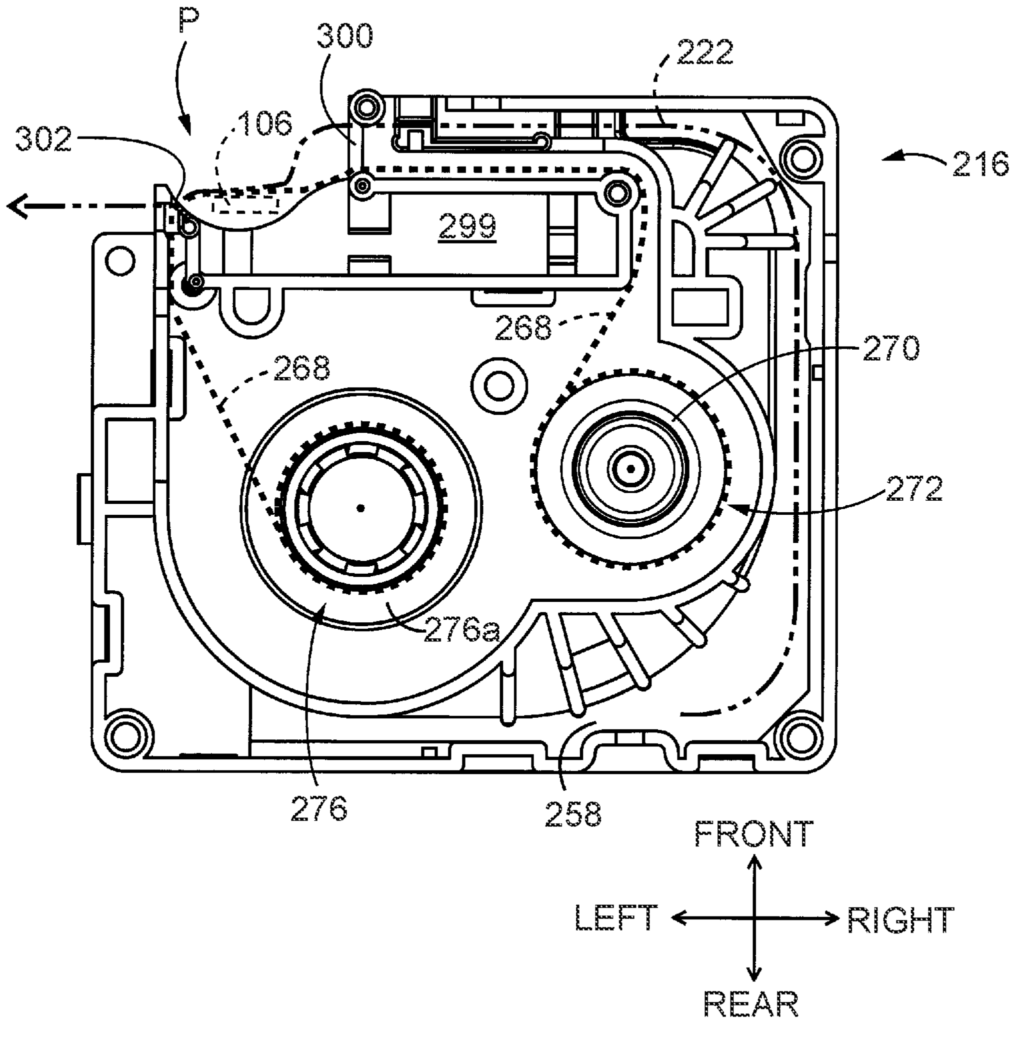
FIG. 33 is a view illustrating a path of the printing tape drawn from the printing tape roll and a path of an ink ribbon drawn from an ink ribbon roll, using a view illustrating the lower surface of the third case member of FIG. 19.

As illustrated in FIG. 26, the printing tape 222 obliquely extends from the inside of the tape case 220 to the inside of the ribbon case 221 via the through hole 252. More specifically, as illustrated in FIG. 33, the printing tape 222 extends to the recess 299 of the ribbon case 221. FIG. 27 illustrates the lower surface side of the second case member 214. As illustrated in FIG. 27, on the back surface of the bottom plate 214*a* of the second case member 214, the through hole 252 is open, and a guide wall 256 stands along the through hole 252 in the up-down direction. FIG. 28 illustrates the upper surface side of the third case member 216. A ceiling plate 216*e* of the third case member 216 is formed with a through hole 258, an ink ribbon support hole 274, and a take-up spool support hole 278. The through hole 258 is defined at a position corresponding to the through hole 252 of the second case member 214 so that the printing tape 222 drawn from the printing tape roll 226 is routed to the second space S2 via the through hole 258. That is, the through hole 252 and the through hole 258 partially overlap each other in the up-down direction.

The bottom plate 214*a* of the second case member 214 and the ceiling plate 216*e* of the third case member 216 separate the first space S1 of the tape case 220 and the second space S2 of the ribbon case 221 from each other.

The ink ribbon support hole 274 receives one end of a feed spool 270 around which the ink ribbon 268 is wound, and supports the ink ribbon roll 272 rotatably about a third rotation axis C3 parallel to the first rotation axis C1. The take-up spool support hole 278 receives one end of the take-up spool 276 and supports the take-up spool 276 rotatably about a fourth rotation axis C4 parallel to the first rotation axis C1. The take-up spool 276 takes up the ink ribbon 268 drawn from the ink ribbon roll 272.

As illustrated in FIG. 29, a lower surface of the third case member 216 is provided with an ink ribbon roll holding wall 286 and a cylindrical projection 288. The ink ribbon roll holding wall 286 is shaped like an arc of a circle centered on the take-up spool support hole 278 around the take-up spool support hole 278, in order to define an installation position of an ink ribbon roll into which the ink ribbon 268 is wound around the take-up spool 276. The cylindrical projection 288 protrudes downward from the periphery of the ink ribbon support hole 274. The cylindrical projection 288 has ridges and grooves at its distal end. The ridges and grooves are alternately arranged in a circumferential direction of the cylindrical projection 288.

As illustrated in FIG. 21, a clutch spring holder 290 accommodates a clutch spring, and is positioned between the one end of the feed spool 270 around which the ink ribbon 268 is wound and the distal end of the cylindrical projection 288. The clutch spring in the clutch spring holder 90 is to apply an appropriate rotational resistance to the ink ribbon roll 72 around the feed spool 70.

FIG. 30 illustrates the upper surface of the fourth case member 218. FIG. 31 illustrates the lower surface of the fourth case member 218. The fourth case member 218 has a take-up spool support hole 294 formed therethrough to receive the other end of the take-up spool 76 and support the take-up spool 76 rotatably. The fourth case member 218 is formed with s a cylindrical support projection 297 that engages with the other end of the feed spool 270 and supports the feed spool 270 rotatably. As illustrated in FIG. 21, the take-up spool 276 has a coupling hole 296 at the other end thereof. The coupling hole 296 of the take-up spool 276 is exposed from the lower surface of the fourth case member 218 through the take-up spool support hole 294. In a state where the cassette 210 is mounted on the printing device 102, the take-up spool 276 is coupled to the take-up spool drive shaft 108 of the printing device 102 via the coupling hole 296 and is rotationally driven by the take-up spool drive shaft 108.

Figure 32:
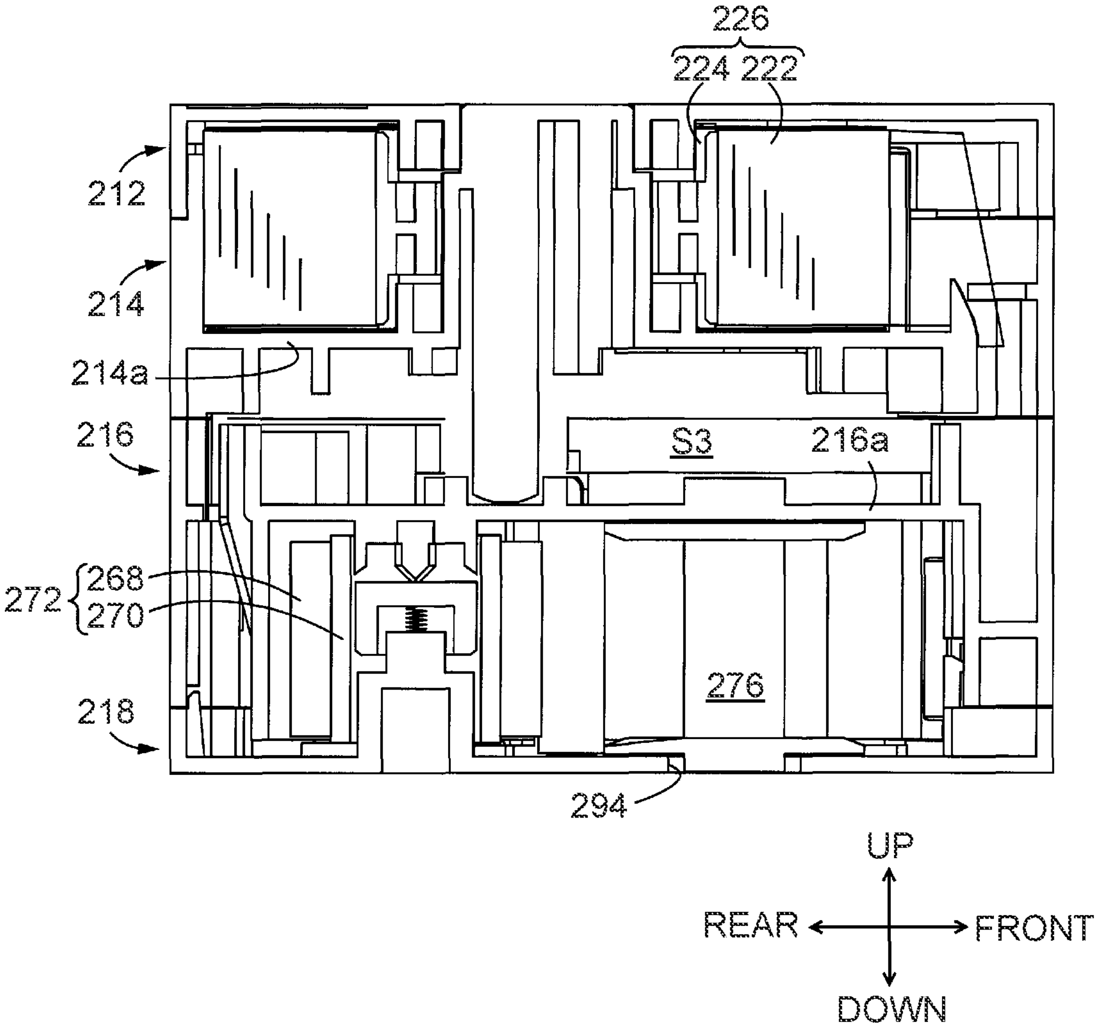
FIG. 32 is a cross sectional view of the cassette of FIG. 19 taken along line XXXII-XXXII of FIG. 24.

FIG. 32 is a sectional view taken along line XXXII-XXXIII of FIG. 24. A third space S3 is defined between the tape case 220 and the ribbon case 221, that is, between the bottom plate 214*a* of the second case member 214 and the ceiling plate 216*e* of the third case member 216. The third space S3 has a certain volume.

As illustrated in FIGS. 20 and 29, the ribbon case 221 including the third case member 216 and the fourth case member 218 has a recess 299. As the cassette 210 is mounted on the cassette mounting portion 104 illustrated in FIG. 18, the recess 299 accommodates a head holding plate 114 that holds the print head 106 that stands on the cassette mounting portion 104. As illustrated in FIG. 29, a portion of the outer peripheral wall 216*w* of the third case member 216 is formed with a first sidewall 216*a*, a second sidewall 216*b*, and a recess wall 216*c*. The first sidewall 216*a* extends in a front-rear direction orthogonal to the up-down direction. The second sidewall 216*b* extends in the left-right direction orthogonal to both the up-down direction and the front-rear direction. The recess wall 216*c* is U-shaped in cross section and defines the recess 299 therein. The recess wall 216*c* includes an inner wall 216*h* facing the second sidewall 216*b* in the front-rear direction and extending in the left-right direction, an inner wall 216*i* extending rearward from the right end of the inner wall 216*h*, an inner wall 216*j* extending leftward from the left end of the inner wall 216*i*, and an inner wall 216*k* extending frontward from the left end of the inner wall 216*j*. The second sidewall 216*b* and the recess wall 216*c* define the recess 299 such that the recess 299 extends rearward from the left end of the second sidewall 216*b* and extends in the left-right direction behind the second sidewall 216*b*. As illustrated in FIGS. 30 and 31, the fourth case member 218 has a U-shaped cutout 218*a* corresponding to the recess wall 216*c*. The recess wall 216*c* and the cutout 218*a* define the recess 299. As illustrated in FIG. 21, a portion of the upper end of the recess 299 is defined by a lower surface of the second case member 214. In other words, the recess 299 coincides with the second case member 214 and the first case member 212 in the up-down direction.

FIG. 33 illustrates the lower surface of the third case member 216 in a state where the cassette 10 is mounted on the cassette mounting portion 104 of the printing device 102. As described above, the printing tape 222 is drawn from the printing tape roll 226 and is routed such that the printing tape 222 obliquely extends from the first space S1 of the tape case 20 to the second space S2 of the ribbon case 221 via the through hole 252 and the through hole 258. Thus, in FIG. 33 illustrating the third case member 216, the printing tape 222 is illustrated as extending from the through hole 258 defined at the rear end portion of the third case member 216. In a state where the cassette 210 is mounted on the cassette mounting portion 104 on which the take-up spool drive shaft 108 stands, the take-up spool 276, which is rotationally driven by the take-up spool drive shaft 108, takes up the ink ribbon 268, so that the printing tape 222 nipped together with the ink ribbon 268 between the print head 106 and the platen roller 116 is drawn from the printing tape roll 226. In FIG. 33, the path in which the printing tape 222 is routed is indicated by a double-dotted-and-dashed line, and the path in which the ink ribbon 268 drawn from the ink ribbon roll 272 by the driving of the take-up spool 276 is indicated by a dashed line.

As illustrated in FIG. 33, the printing tape 222 and the ink ribbon 268 are discharged from the outlet 300 toward a printing position P. The outlet 300 is an opening that is defined by the left end portion of the second sidewall 216*b* and the left end portion of the inner wall 216*h* and is open in the left-right direction. In the printing position P between the print head 106 and the platen roller 116, the printing tape 222 is pressed to the print head 106 via the ink ribbon 268. In this state, heating elements disposed at a surface of the print head 106 are selectively driven to generate heat locally, whereby part of ink 268*a* provided on an entire surface of the ink ribbon 268 is transferred to the printing tape 222, and characters, symbols, and other representations are printed on the printing tape 222. The used ink ribbon 268 having passed the printing position P is conveyed through an inlet 302 into the ribbon case 221 and is taken up by the take-up spool 276. The inlet 302 is located to the left of the outlet 300 and provided in the third case member 216.

FIG. 34 schematically illustrates a lamination structure of the printing tape 222 discharged from the cassette 210. The printing tape 222 is a laminate of the to-be-printed tape 222*a*, the adhesive 222*b*, and the release tape 222*c*. The release tape 222*c* is adhered to a non-print surface of the to-be-printed tape 222*a* via the adhesive 222*b*. The printing surface of the to-be-printed tape 222*a* has ink 68*a* transferred from the ink ribbon 268. In FIG. 34, not all components of the laminate are accurately illustrated in size or proportion.

Figure 35:
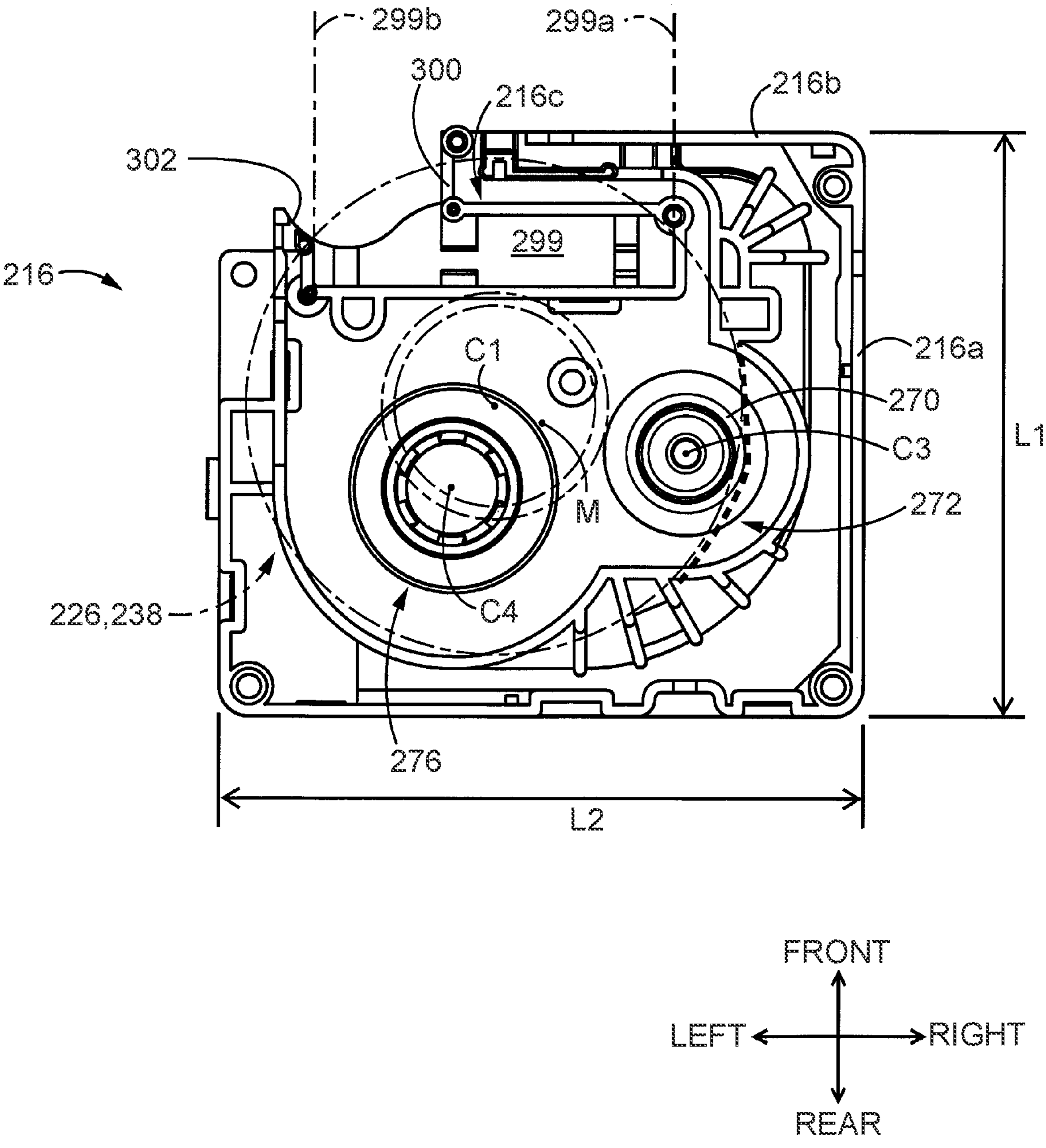
FIG. 35 is a view of the cassette of FIG. 19, illustrating relative positions of the printing tape roll, the ink ribbon roll, a take-up spool, and a recess.

FIG. 35 illustrates the lower surface of the third case member 216. The ink ribbon roll 272 and the take-up spool 276 are accommodated in the second space S2 defined between the third case member 216 and the fourth case member 218, that is, in the ribbon case 221. As described above, the ribbon case 221 is disposed below the tape case 220 in a stacked manner. In a case where the printing tape roll 226 and the spacer films 238 accommodated in the tape case 220 are projected in the up-down direction onto a projection plane extending in the front-rear direction and the right-left direction in the second space S2, projected positions of the printing tape roll 226 and the spacer films 238 are indicated by a dotted-and-dashed line in FIG. 35. The spacer films 238 have the same diameter as the diameter of the printing tape roll 226. In FIG. 35, only the dotted-and-dashed line indicating the printing tape roll 226 is shown. As illustrated in FIG. 35, the ink ribbon roll 272 and the take-up spool 276 are disposed in positions overlapping the printing tape roll 226 in the up-down direction.

At least a portion of the feed spool 270, at least a portion of the ink ribbon 268 or the ink ribbon roll 272, and at least a portion of the used ink ribbon 268 that has passed the take-up spool 276 and the printing position P and is about to be taken up by the take-up spool 276, overlap the printing tape roll 226 and the spacer films 238 in the up-down direction. In other words, at least a portion of the ink ribbon roll 272 or the ink ribbon 268 already wound around the take-up spool 276 or in the process of being conveyed from the inlet 302 to be taken up by the take-up spool 76 is located in a projected area of the printing tape roll 226 and the spacer films 238 in the up-down direction.

In FIG. 35, the printing tape roll 226 and the spacer films 238 overlap at least a portion of the ink ribbon roll 272, the third rotation axis C3 thereof, at least a portion of the take-up spool 276, the fourth rotation axis C4 thereof, at least a portion of the recess 299, and at least a portion of the recess wall 216*c* in the up-down direction. In other words, at least a portion of the ink ribbon roll 272, the third rotation axis C3 thereof, at least a portion of the take-up spool 276, the fourth rotation axis C4 thereof, at least a portion of the recess 299, and at least a portion of the recess wall 216*c* are located in the projected area of the printing tape roll 226 and the spacer films 238 projected in the up-down direction. At least a portion of the recess 299 and at least a portion of the recess wall 216*c* overlap the printing tape spool 224 in the up-down direction. In the left-right direction, a portion of the printing tape roll 226 and the first rotation axis C1 that is a rotation axis of the printing tape spool 224 are located between a right end 299*a*, which is one end in the left-right direction, and left end 299*b*, which is the other end in the left-right direction, of the recess 299. The first rotation axis C1 that is a rotation axis of the printing tape spool 224 is located between the outlet 300 and the right end 299*a* of the recess 299 in the left-right direction. In FIG. 35, a center position M is a center of the cassette 210 in the front-rear direction and the left-right direction of the cassette 10. In the front-rear direction and the left-right direction, a distance from the center position M to the first rotation axis C1 of the printing tape roll 226 is set to less than a distance from the center position M to the recess 299.

The cassette 210 according to the present embodiment includes: (a) a printing tape roll 226 being rotatable and into which a printing tape 222 as a medium to be printed is wound; and (b) an outer peripheral wall 16*w* disposed on one side in a first direction relative to the printing tape roll 26, the first direction being a width direction of the printing tape 222, the outer peripheral wall 215 including: a first sidewall 216*a* extending in a second direction orthogonal to the first direction; a second sidewall 216*b* extending in a third direction orthogonal to the first direction and intersecting with the second direction; and a recess wall 216*c* shaped like a U letter to define a recess 299 extending in the third direction on one side in the second direction from the second sidewall 216*b*, and (c) at least a portion of the recess 299 overlaps the printing tape roll 226 in the first direction. The cassette 210 is thus downsized in a direction orthogonal to the up-down direction, as the tape case 220 including the printing tape roll 226 and the ribbon case 221 including the recess wall 216*c* overlap each other in the first direction, that is, the up-down direction, and at least a portion of the recess 299 overlaps the printing tape roll 226 in the first direction.

According to the cassette 210 of the present embodiment, in the printing tape roll 224, the printing tape 222 is wound around the printing tape spool 224 that is rotatable, and at least a portion of the recess wall 216*c* overlaps the printing tape spool 224 in the first direction. The cassette 210 can thus be downsized in a direction orthogonal to the up-down direction as compared with a case where at least a portion of the recess wall 216*c* does not overlap the printing tape spool 226 in the first direction.

According to the cassette 210 of the present embodiment, at least a portion of the recess 299 overlaps the printing tape spool 224 in the first direction. The cassette 210 can thus be downsized in a direction orthogonal to the up-down direction as compared with a case where at least a portion of the recess 299 does not overlap the printing tape spool 224 in the first direction.

According to the cassette 210 of the present embodiment, the first rotation axis C1 that is a rotation axis of the printing tape roll 226 is located between one end of the recess 299 and the other end thereof in the third direction. The cassette 210 can thus be downsized in a direction orthogonal to the up-down direction as compared with a case where the first rotation axis C1 is not located between one end of the recess 299 and the other end thereof in the third direction.

According to the cassette 210 of the present embodiment, in the printing tape roll 226, the printing tape 222 that is wound around the printing tape spool 224 that is rotatable, and at least a portion of the printing tape spool 224 is located between one end of the recess 299 and the other end thereof in the third direction. The cassette 210 can thus be downsized in a direction orthogonal to the up-down direction as compared with a case where at least a portion of the printing tape spool 224 is not located between one end of the recess 299 and the other end thereof in the third direction.

According to the cassette 10 of the present embodiment, the first rotation axis C1 that is a rotation axis of the printing tape roll 224 is located between the outlet 300 and one end of the recess 299 in the third direction. The cassette 210 can thus be downsized in a direction orthogonal to the up-down direction as compared with a case where the first rotation axis C1 of the printing tape spool 224 is not located between the outlet 300 and one end of the recess 299 in the third direction.

The cassette 10 of the present embodiment includes a tape case (e.g., a first case) 220 in which the printing tape roll 26 is accommodated, and a ribbon case (e.g., a second case) 221 which is located on the one side of the tape case 220 in the first direction and has the outer peripheral wall 215. The ribbon case 221 has the outlet 300 that is defined by the second sidewall 216*b* and is located between one end 299*a* of the recess 299 and the other end 299*b* thereof in the third direction. The printing tape 222 fed from the printing tape roll 226 is discharged out of the tape case 220 through the outlet 300 toward the recess 299. In the third direction, the first rotation axis C1 that is a rotation axis of the printing tape spool 226 is located between the outlet 300 and one end of the recess 299 in the third direction. The cassette 210 can thus be downsized in a direction orthogonal to the up-down direction as compared with a case where the first rotation axis C1 of the printing tape spool 226 is not located between the outlet 300 and one end 299*a* of the recess 299 in the third direction.

According to the cassette 210 of the present embodiment, the recess 299 overlaps at least a portion of the tape case (e.g., a first case) 220 in the first direction. The cassette 210 can thus be downsized in a direction orthogonal to the up-down direction as compared with a case where the recess 299 does not overlap at least a portion of the first case 210 in the first direction.

The cassette 210 according to the present embodiment includes: a feed spool 270 rotatable and disposed on the one side in the first direction relative to the printing tape roll 226, the feed spool 270 around which an ink ribbon 268 is wound, the ink ribbon 268 to be used for printing on the printing tape 222 fed from the printing tape roll 226; and a take-up spool 276 disposed on the one side in the first direction relative to the printing tape roll 226, the take-up spool 276 being rotatable to take up the ink ribbon 268 fed from the feed spool 270, and at least a portion of the feed spool 270 and at least a portion of the take-up spool 276 overlap the printing tape roll 226 in the first direction. The cassette 210 can thus be downsized in a direction orthogonal to the up-down direction as compared with a case where at least a portion of the feed spool 270 and at least a portion of the take-up spool 276 do not overlap the printing tape spool 26 in the first direction.

According to the cassette 210 of the present embodiment, in the second direction and the third direction, the distance from the center position M, which is the center of the cassette 210 in the second direction and the third direction, to the first rotation axis C1 of the printing tape roll 226 is less than the distance from the center position M to the recess 299. The cassette 210 can thus be downsized in a direction orthogonal to the up-down direction as compared with a case where the distance from the center position M of the cassette 10 to the first rotation axis C1 of the printing tape roll 226 is greater than the distance from the center position M to the recess 299.

The cassette 210 according to the present embodiment includes: (a) a printing tape roll 226 into which a printing tape 222 is wound; (b) a spacer film 238 disposed in contact with the printing tape roll 226 in a first direction; and (c) an outer peripheral wall 215 disposed on one side in the first direction relative to the printing tape roll 226 and the spacer film 238, including: a first sidewall 216*a* extending in a second direction orthogonal to the first direction; a second sidewall 216*b* extending in a third direction orthogonal to the first direction and intersecting with the second direction; and a recess wall 216*c* shaped like a U letter to define a recess 299 extending from the second sidewall 216*b* toward one side in the second direction, the recess 299 extending in the third direction on one side in the second direction further than the second sidewall 216*b* (on the left side of FIG. 16), and (d) at least a portion of the recess 299 overlaps the spacer film 238 in the first direction. The cassette 210 can thus be downsized in a direction orthogonal to the up-down direction, as at least a portion of the recess 299 overlaps the spacer film 238 in the first direction.

Third Embodiment

Figure 36:
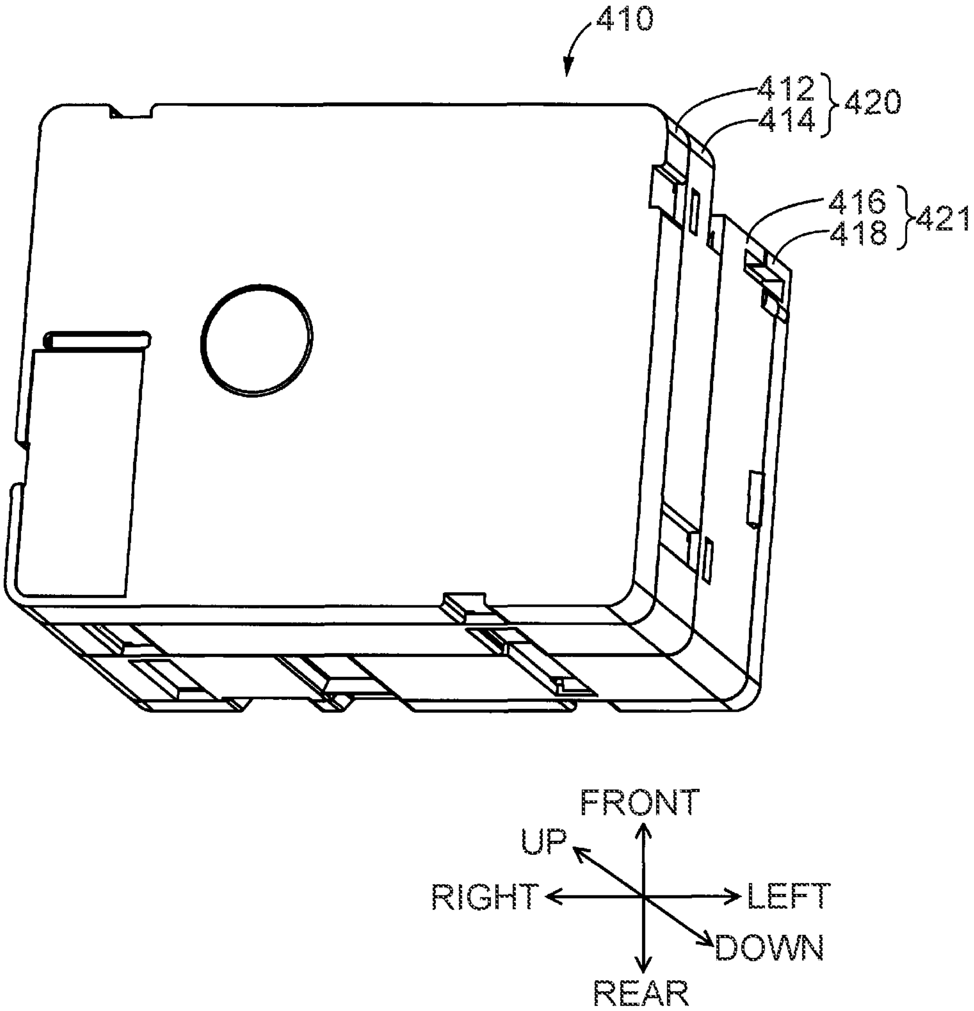
FIG. 36 is a perspective view illustrating an upper surface side of a cassette according to a third embodiment of the disclosure.
Figure 37:
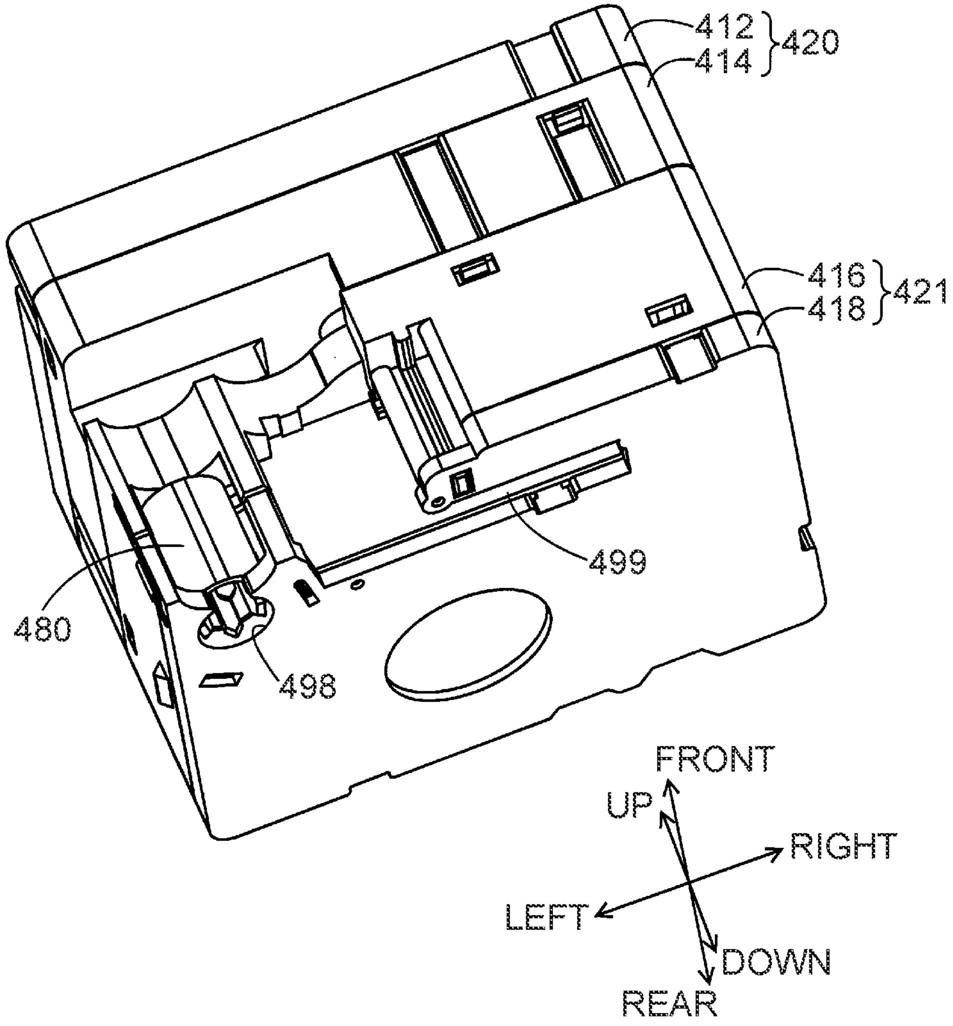
FIG. 37 is a perspective view illustrating a lower surface side of the cassette of FIG. 36.

FIG. 36 is a perspective view of a cassette 410 according to another embodiment of the disclosure, illustrated from an obverse surface side, that is, an upper surface side, of the cassette 410. FIG. 37 is a perspective view of the cassette 410, illustrated from a back surface side, that is, a lower surface side, of the cassette 410. The cassette 410 is of a heat-sensitive or thermal type and includes a printing tape 422 that itself develops color when exposed to heat. The cassette 410 has a rectangular parallelepiped shape and is slightly different in dimensions from the cassettes of the above embodiments because of not including the ink ribbon roll 72 and the take-up spool 76. The cassette 410 is detachably attachable to a cassette mounting portion 104 structured similarly to the cassette mounting portion 104 illustrated in FIG. 18. In this case, the cassette mounting portion 104 is not provided with the take-up spool drive shaft 108, but is provided with the roller drive shaft 110 protruding therefrom.

The cassette 410 of the present embodiment includes a laminating tape roll 464 and a roller 480, but does not include a take-up spool and an ink ribbon roll. A to-be-printed tape 422*a* of the printing tape 422 provided in the cassette 410 is made of a thermal material which develops color by itself when exposed to heat. The cassette 410 includes a first case or tape case 420 and a second case or ribbon case 421 similarly to the cassettes 10 and 210. The tape case 420 includes a first case member 412 and a second case member 414. The ribbon case 421 includes a third case member 416 and a fourth case member 418. The tape case 420 includes a printing tape roll 426 in a first space S1 defined therein. The ribbon case 421 is mounted on and under the tape case 420. The ribbon case 421 defines a second space S2 therein and includes a laminating tape roll 464 in the second space S2. The first case member 412, the second case member 414, the third case member 416, and the fourth case member 418 include locking claws 427, fixing claws 428, and positioning projections 429 at appropriate positions of their peripheral walls. The first case member 412, the second case member 414, the third case member 416, and the fourth case member 418 are mutually stacked on and fixed to one another by engagement between the locking claws 427 and the fixing claws 428 and by positioning at the positioning projections 429. In the present embodiment, a surface of each of the case members 412 to 418 facing upward is referred to as an upper surface or obverse surface of each of the case members 412 to 418, and a surface of each of the case members 412 to 418 facing downward is referred to as a lower surface or back surface of each of the case members 412 to 418.

The ribbon case 421 is positioned on one side in the up-down direction relative to the tape case 420. In other words, the ribbon case 421 is positioned on one side of the tape case 420 in the up-down direction. In the present embodiment, the ribbon case 421 is positioned on a lower side, which is one side, in the up-down direction relative to the tape case 420. The tape case 420 defines therein a first space S1 in which a printing tape roll 426 is rotatably accommodated. A printing tape 422, which is a medium to be printed, is wound into the printing tape roll 426. In the printing tape roll 426, the printing tape 422 that is a continuous strip is wound around a printing tape spool 424 that is a cylindrical shaft core member. The printing tape 422 is wound such that a width direction of the printing tape 422 corresponds to the up-down direction as a first direction. A radial direction of the printing tape roll 426 is the front-rear direction and the right-left direction, and the radial direction is an orthogonal direction orthogonal to the up-down direction. The orthogonal direction can be referred to as any direction parallel to a plane orthogonal to the up-down direction. The printing tape 422, the printing tape spool 424, and the printing tape roll 426 correspond to a medium to be printed, a printing medium spool, and a printing medium roll, respectively.

The ribbon case 421 defines therein the second space S2 in which a laminating tape roll 464 is rotatably accommodated. In the laminating tape roll 464, a laminating tape 460 that is a continuous strip to be adhered to a printed portion of the printing tape 422 is wound around a laminating tape spool 462 such that a width direction of the laminating tape 460 corresponds to the up-down direction.

As illustrated in FIG. 37, the fourth case member 418 of the cassette 410 has a roller exposure hole 498. A shaft end of the roller 480, which is described later, is exposed from the roller exposure hole 498. The shaft end is to receive a roller drive shaft 110 provided on the cassette mounting portion 104 as the cassette 410 is mounted on the cassette mounting portion 104 of the printing device 102. A recess 499 is defined by a side surface of the third case member 416 and a side surface of the fourth case member 418, which are a part of an outer peripheral wall 416*w* of the ribbon case 421, and a part of an outer peripheral wall of the second case member 414. The recess 499 is to receive therein the print head 106 provided in the cassette mounting portion 104 as the cassette 410 is mounted on the cassette mounting portion 104. As illustrated in FIG. 37, the upper end of the recess 499 is defined by a lower surface of the second case member 14.

Figure 38:
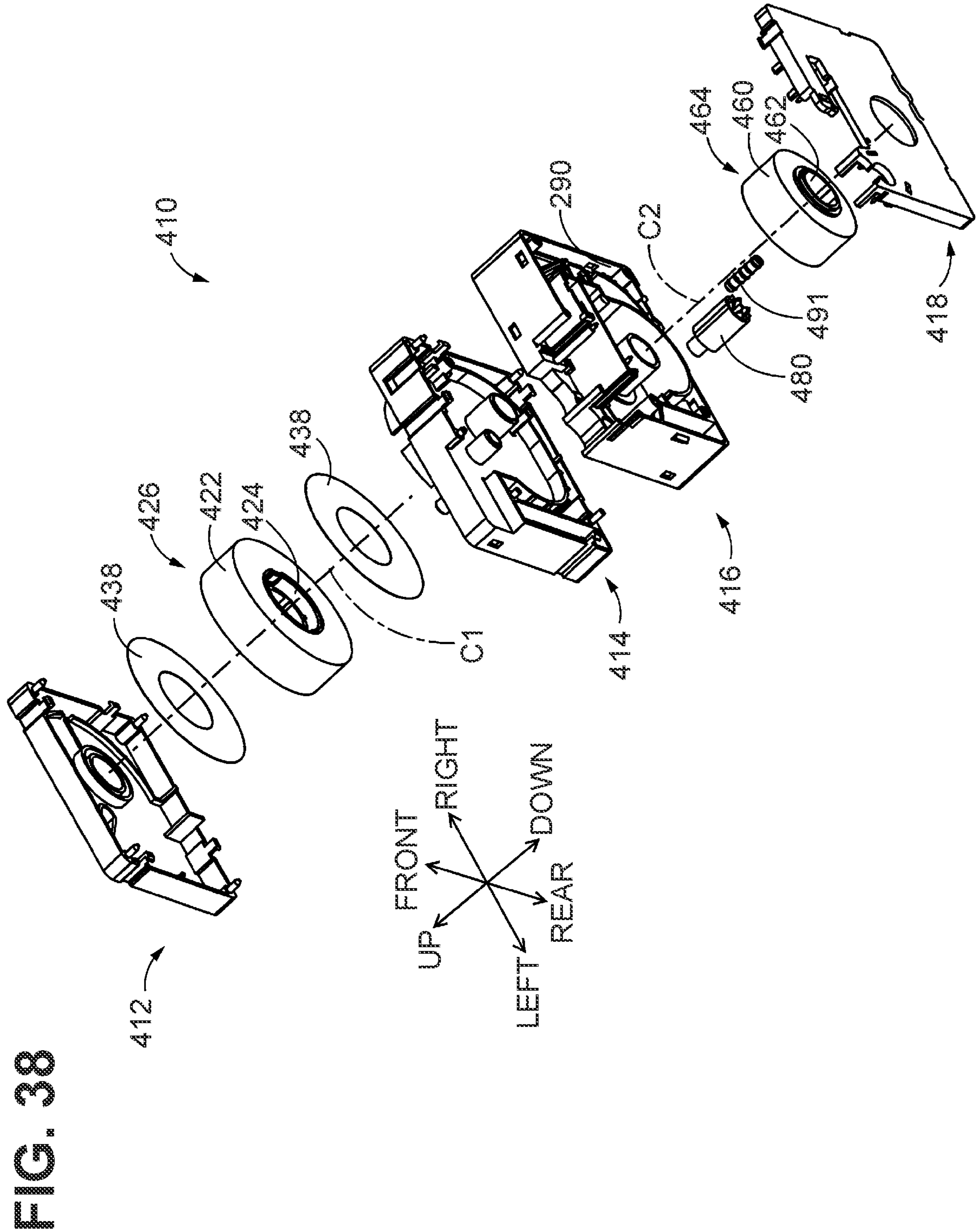
FIG. 38 is a disassembled perspective view of the cassette in the embodiment of FIG. 36, illustrating a configuration of the cassette and a case composed of a first case member, a second case member, a third case member, and a fourth case member.
Figure 39:
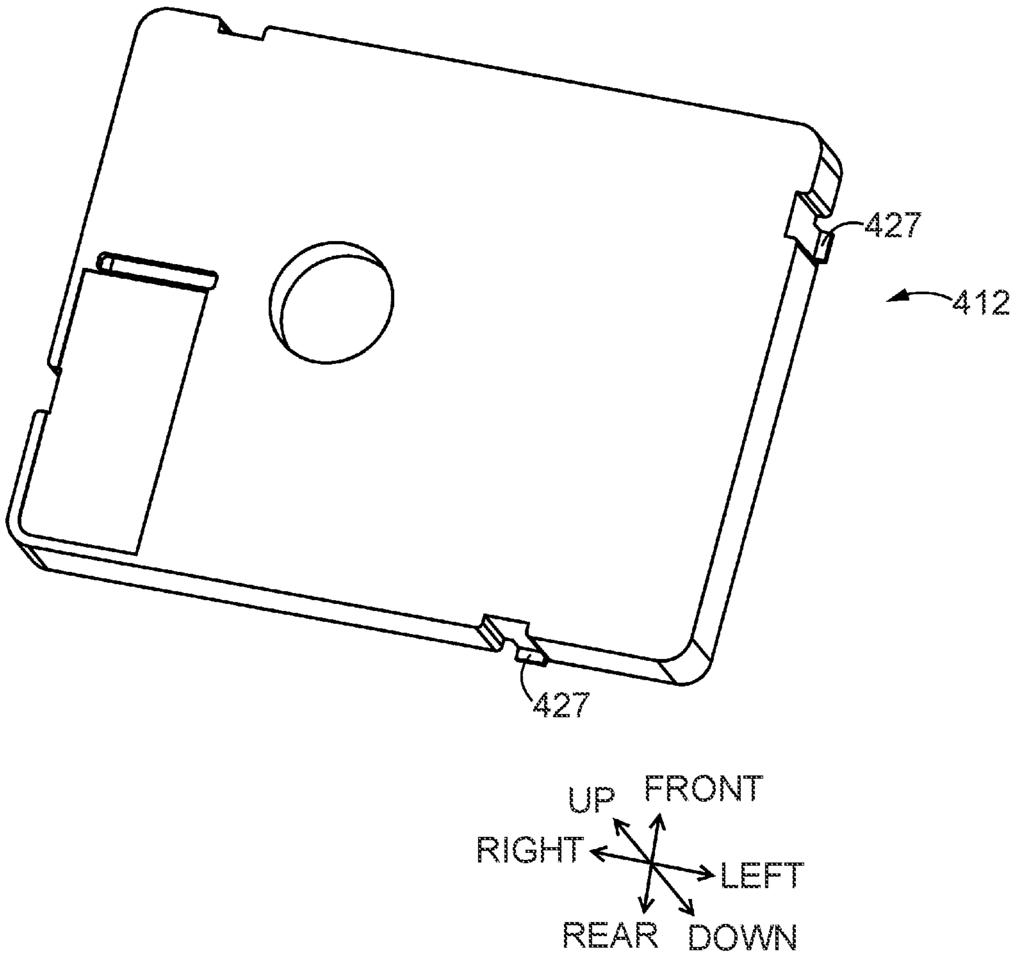
FIG. 39 is a front view illustrating an upper surface side of the first case member of FIG. 36.
Figure 40:
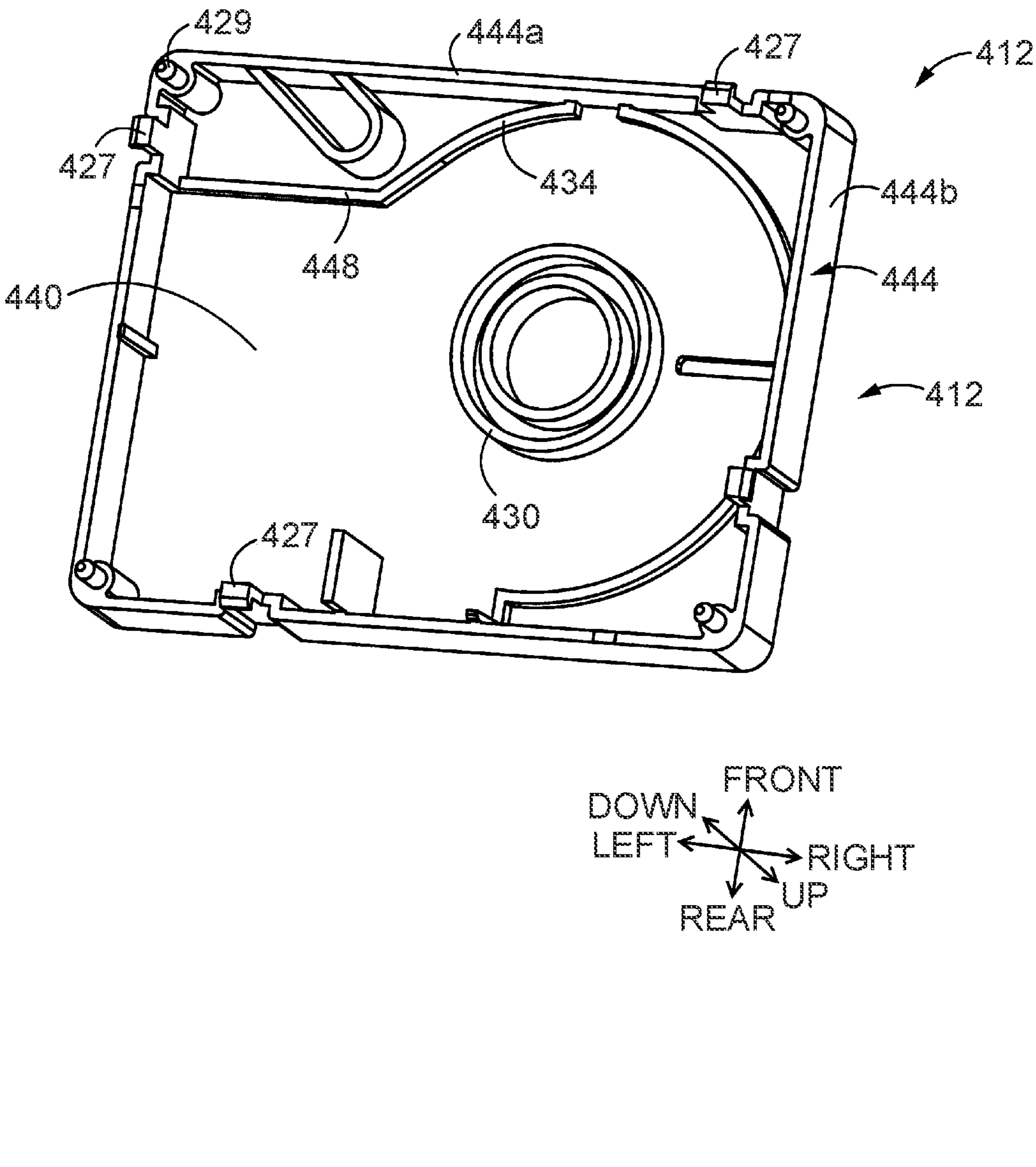
FIG. 40 is a perspective view illustrating a lower surface side of the first case member of FIG. 36.
Figure 41:
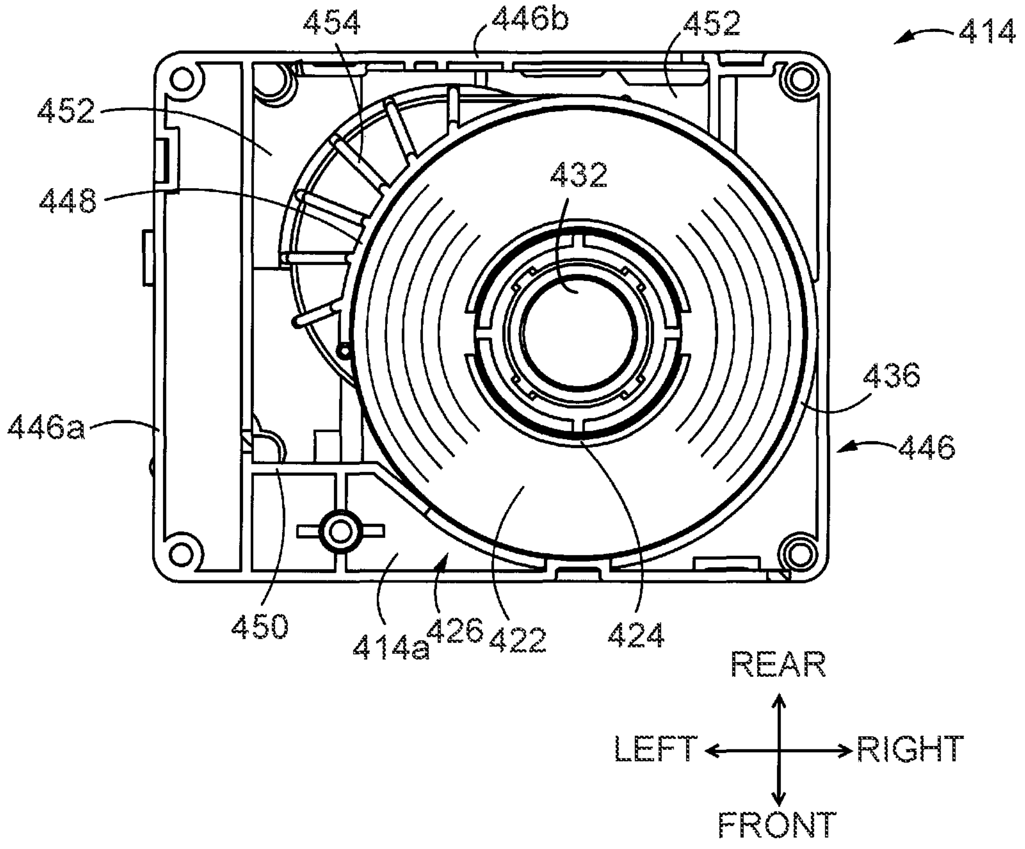
FIG. 41 is a front view illustrating an upper surface side of the second case member of FIG. 36 with a printing tape roll.
Figure 42:
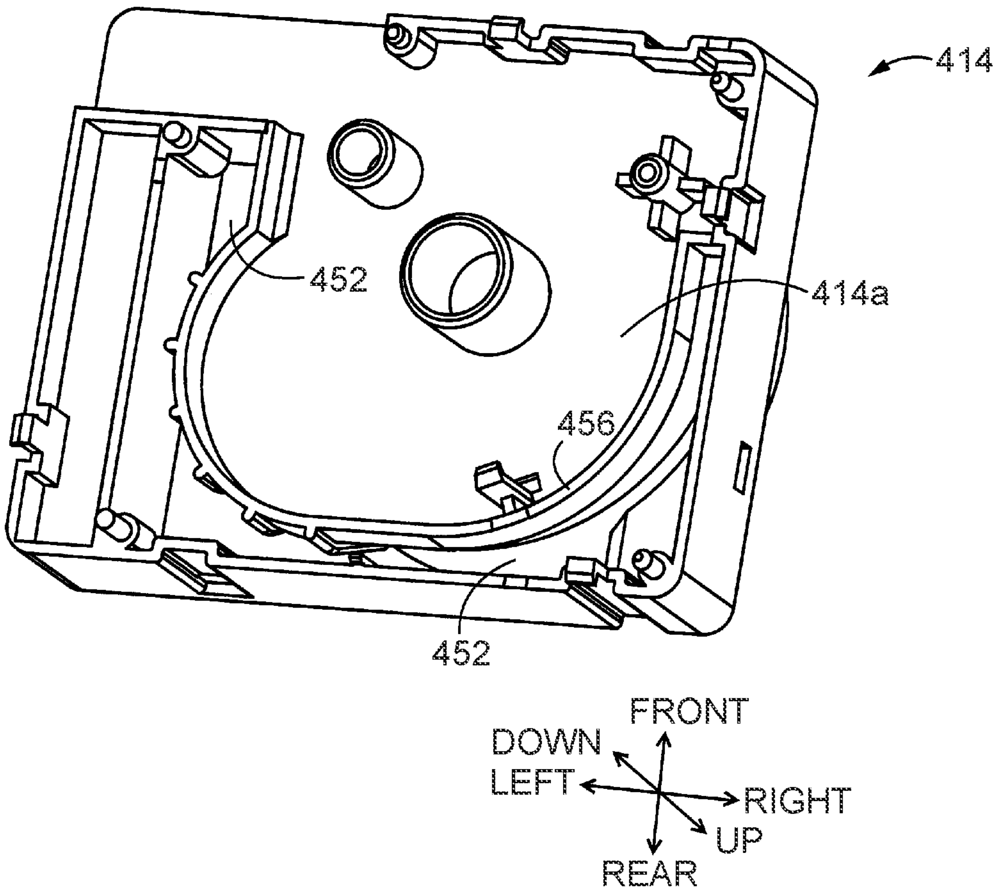
FIG. 42 is a perspective view illustrating a lower surface side of the second case member of FIG. 36.
Figure 43:
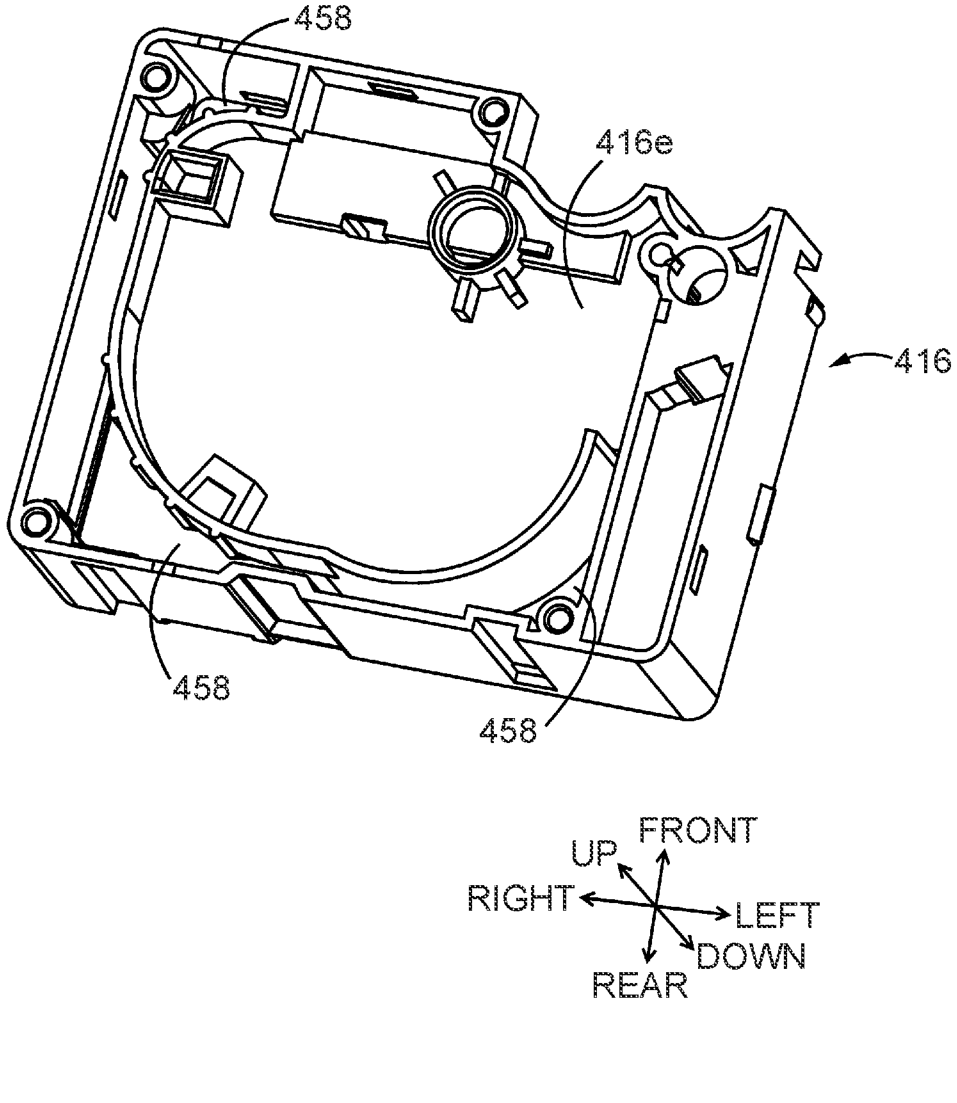
FIG. 43 is a perspective view illustrating an upper surface side of the third case member of FIG. 36.
Figure 44:
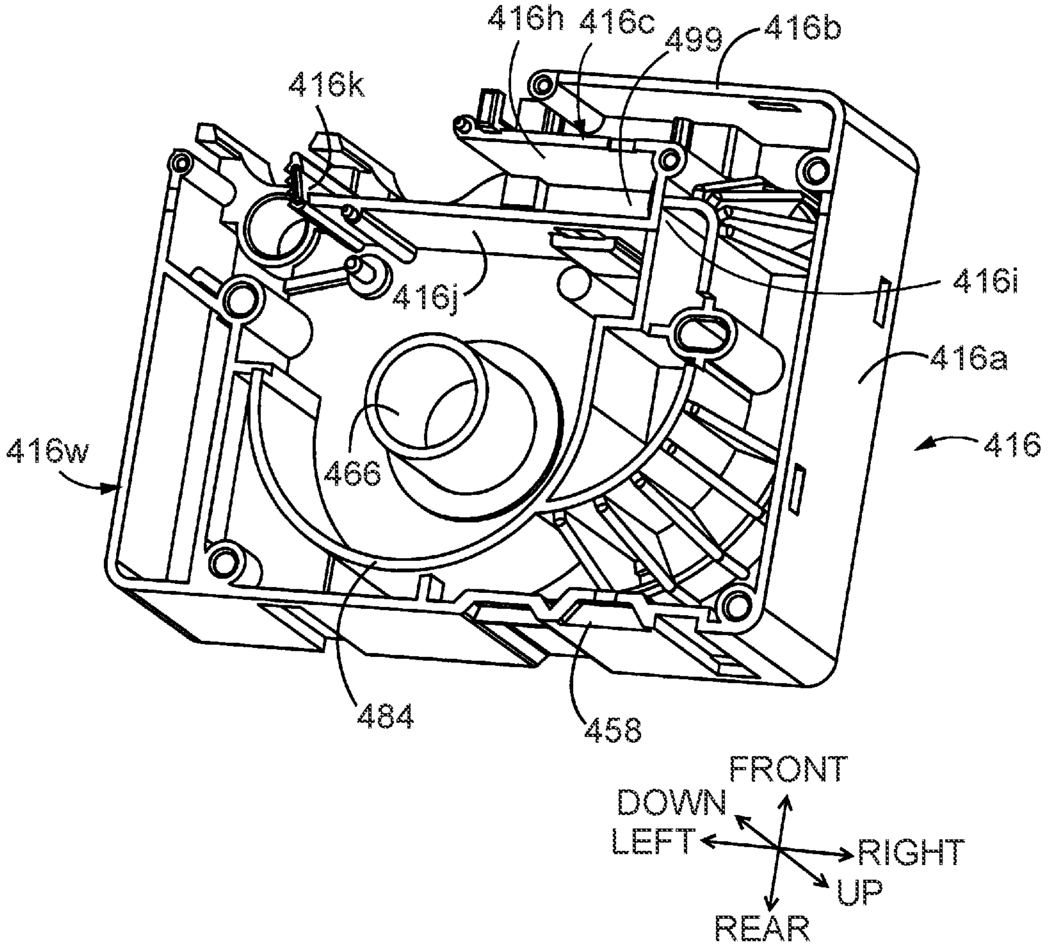
FIG. 44 is a perspective view illustrating a lower surface side of the third case member of FIG. 36.
Figure 45:
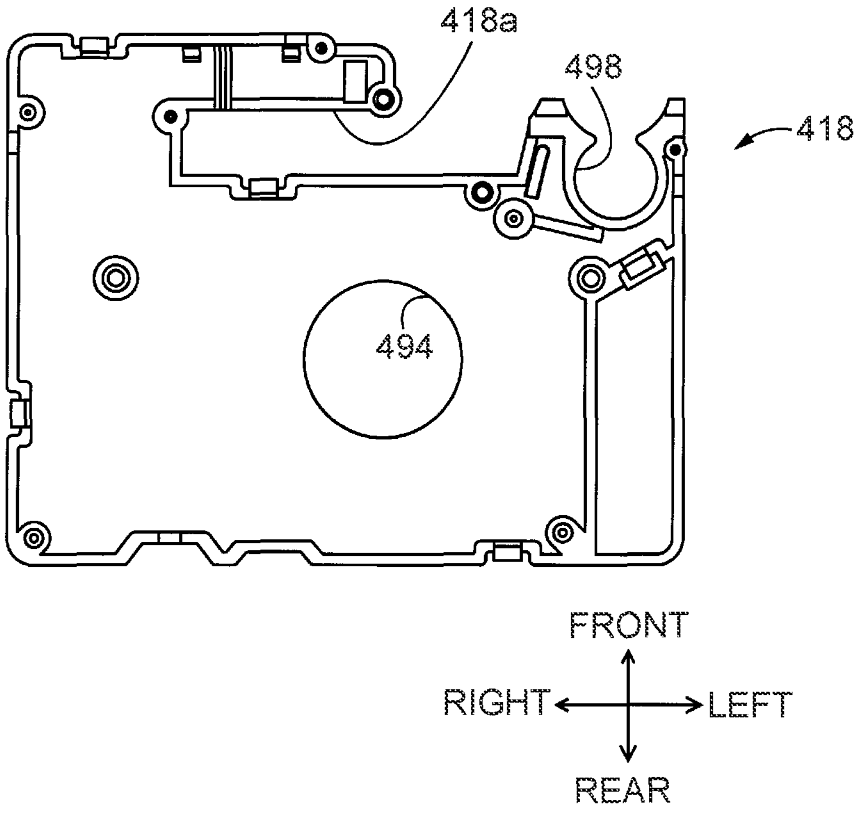
FIG. 45 is a perspective view illustrating an upper surface side of the fourth case member of FIG. 36.
Figure 46:
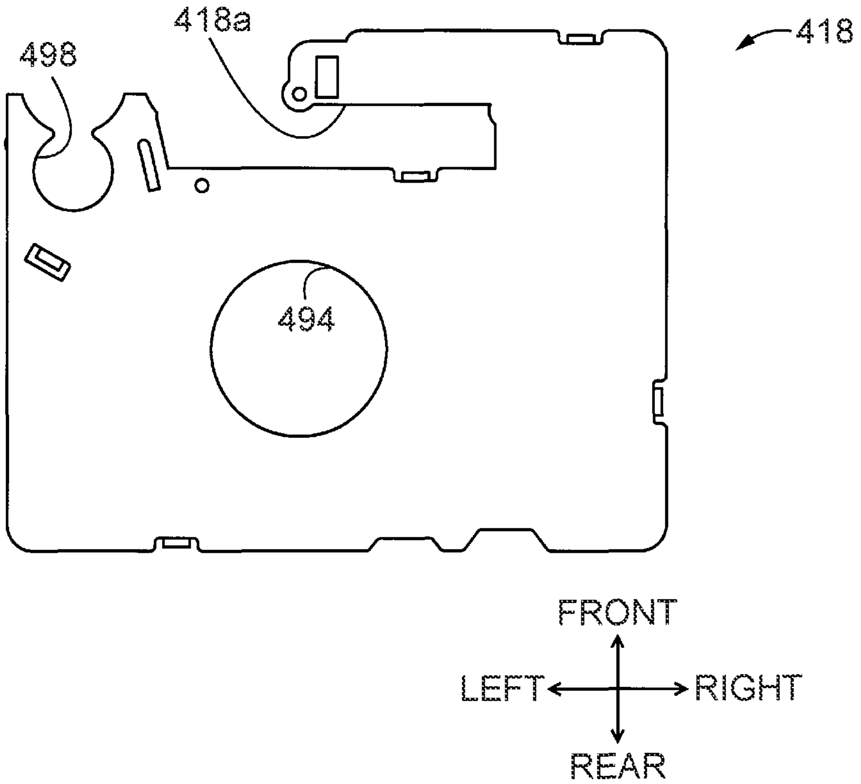
FIG. 46 is a perspective view illustrating a lower surface side of the fourth case member of FIG. 36.

FIG. 38 is a disassembled perspective view of the cassette 410, illustrating an internal configuration of the cassette 410, wherein the first case member 412, the second case member 414, the third case member 416, and the fourth case member 418 are disassembled. FIGS. 39 and 40 illustrate an upper surface side and a lower surface side of the first case member 412, respectively, which is configured similarly to the first case member 212 of the cassette 210 of the second embodiment. FIGS. 41 and 42 illustrate an upper surface side and a lower surface side of the second case member 414, respectively, which is configured similarly to the second case member 214 of the cassette 210 of the second embodiment. The upper surface side of the second case member 414 is configured as illustrated in FIG. 41, and the lower surface side thereof is configured as illustrated in FIG. 42. FIGS. 43 and 44 illustrates an upper surface side and a lower surface side of the third case member 416, respectively. FIGS. 45 and 46 illustrates an upper surface side and a lower surface side of the fourth case member 418, respectively.

Figure 48:
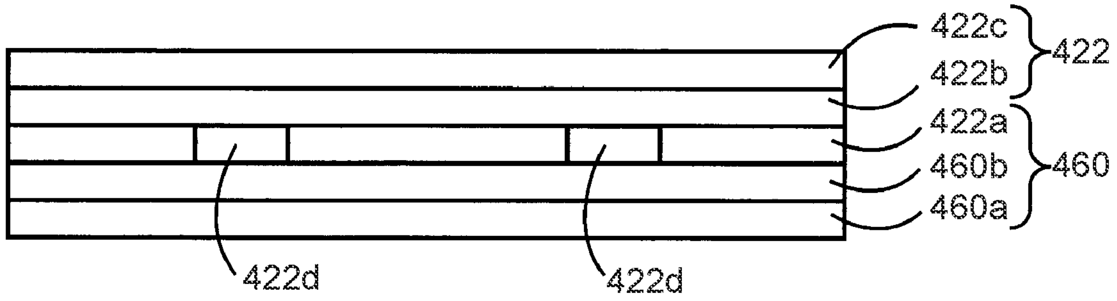
FIG. 48 illustrates the printing tape discharged from the cassette of FIG. 36.

In the first space S1 defined between the first case member 412 and the second case member 414, the printing tape roll 426 is accommodated rotatably about a first rotation axis C1 parallel to the up-down direction. The first case member 412 and the second case member 414 each have a rectangular shape. The first rotation axis C1 is offset to the right from the centers of the first case member 412 and the second case member 414 with respect to the right-left direction corresponding to the second direction, and coincides with the centers of the first case member 412 and the second case member 414 with respect to the front-rear direction corresponding to the third direction. In the present embodiment, the to-be-printed tape 422*a* is made of a thermal material that develops color by itself, for example, turns black, when subjected to heat. As illustrated in FIG. 48, local color-developing areas 422*d* are shown in part of the to-be-printed tape 422*a*.

As illustrated in FIGS. 38 and 40, a lower surface of the first case member 412 is provided with a cylindrical first support projection 430 and a first circular wall 434. The first support projection 430 is inserted into the cylindrical printing tape spool 424 to support the printing tape roll 426 rotatably. The first circular wall 434 has an inside diameter greater than an outside diameter of the printing tape roll 426. The first support projection 430 and the first circular wall 434 have an axis that is coaxial with the first rotation axis C1, and protrude downward from the lower surface of the first case member 412. As illustrated in FIG. 41, an upper surface of the second case member 414 is provided with a cylindrical second support projection 432 and a second circular wall 436. The second support projection 432 is inserted into the cylindrical printing tape spool 424 to support the printing tape roll 426 rotatably. The second circular wall 436 has an inside diameter greater than the outside diameter of the printing tape roll 426. The second support projection 432 and the second circular wall 436 have an axis that is coaxial with the first rotation axis C1, and protrude upward from the upper surface of the second case member 414. The printing tape roll 426 is disposed between the first case member 412 and the second case member 414 while spacer films 438 are each positioned on an upper or lower side of the printing tape roll 426. Each spacer film 438 has a disc-shape having an outside diameter equal to the outside diameter of the printing tape roll 426.

As illustrated in FIG. 41, a bottom plate 414*a* of the second case member 414 is formed with a through hole 452 that is defined by the second circular wall 436, a short side portion 446*a* of an outer peripheral wall 446, and a long side portion 446*b* thereof. The through hole 452 extends in the front-rear direction and in the right-left direction, that is, has an L shape in a front view. Guide ribs 454 are formed between the through hole 452 and a portion of the second circular wall 436 facing a corner at which the short side portion 446*a* and the long side portion 446*b* meet each other. The guide ribs 454 guide the printing tape 422 drawn from the printing tape roll 426 into the through hole 452. The printing tape 422 thus extends between the tape case 420 and the ribbon case 421 via the through hole 452 defined in the bottom plate 414*a* that serves as a partition between the first space S1 and the second space S2 from each other.

In FIGS. 42 and 43, the bottom plate 414*a* of the second case member 414 and the upper plate 416*e* of the third case member 416 separate the first space S1 of the tape case 420 and the second space S2 of the ribbon case 421 from each other.

As illustrated in FIG. 44, a lower surface of the third case member 416 is formed with a laminating tape roll holding wall 484 and a cylindrical projection 466. The laminating tape roll holding wall 484 defines the position of the laminating tape roll 464. The cylindrical projection 466 receives therein and rotatably supports the laminating tape spool 462 of the laminating tape roll 464. The laminating tape roll holding wall 484 is shaped like a circular arc concentric with the cylindrical projection 466 in order to hold the laminating tape spool 462.

FIG. 45 illustrates the upper surface of the fourth case member 418. FIG. 45 illustrates the lower surface of the fourth case member 418. The fourth case member 418 has a laminating tape spool support hole 494 formed therethrough in the up-down direction. The laminating tape spool support hole 494 receives therein and rotatably supports an end, which is on the fourth case member 418 side, of the laminating tape spool 462. The fourth case member 418 has a roller exposure hole 498 formed therethrough in the up-down direction. The roller exposure hole 498 receives therein and rotatably supports a shaft end, which is on the fourth case member 418 side, of the roller 480. The shaft end of the roller 480 is exposed from the roller exposure hole 498 so that the roller 480 is connectable with the roller drive shaft 110.

As illustrated in FIG. 37, the ribbon case 421 including the third case member 416 and the fourth case member 418 has a recess 499. As the cassette 410 is mounted on the cassette mounting portion 104 illustrated in FIG. 18, the recess 499 accommodates a head holding plate 114 that holds the print head 106 that stands on the cassette mounting portion 104. As illustrated in FIG. 44, a portion of the outer peripheral wall 416*w* of the third case member 416 is formed with a first sidewall 416*a*, a second sidewall 416*b*, and a recess wall 416*c*. The first sidewall 416*a* extends in a front-rear direction orthogonal to the up-down direction. The second sidewall 416*b* extends in the left-right direction orthogonal to both the up-down direction and the front-rear direction. The recess wall 416*c* is U-shaped in cross section and defines the recess 499 therein. The recess wall 416*c* includes an inner wall 416*h* facing the second sidewall 416*b* in the front-rear direction and extending in the left-right direction, an inner wall 416*i* extending rearward from the right end of the inner wall 416*h*, an inner wall 416*j* extending leftward from the left end of the inner wall 416*i*, and an inner wall 416*k* extending frontward from the left end of the inner wall 416*j*. The second sidewall 416*b* and the recess wall 416*c* define the recess 499 such that the recess 499 extends rearward from the left end of the second sidewall 416*b* and extends in the left-right direction behind the second sidewall 416*b*. As illustrated in FIGS. 45 and 46, the fourth case member 418 has a U-shaped cutout 418*a* corresponding to the recess wall 416*c*. The recess wall 416*c* and the cutout 418*a* define the recess 499. As illustrated in FIG. 37, a portion of the upper end of the recess 499 is defined by a lower surface of the second case member 414. In other words, the recess 499 coincides with the second case member 414 and the first case member 412 in the up-down direction.

Figure 47:
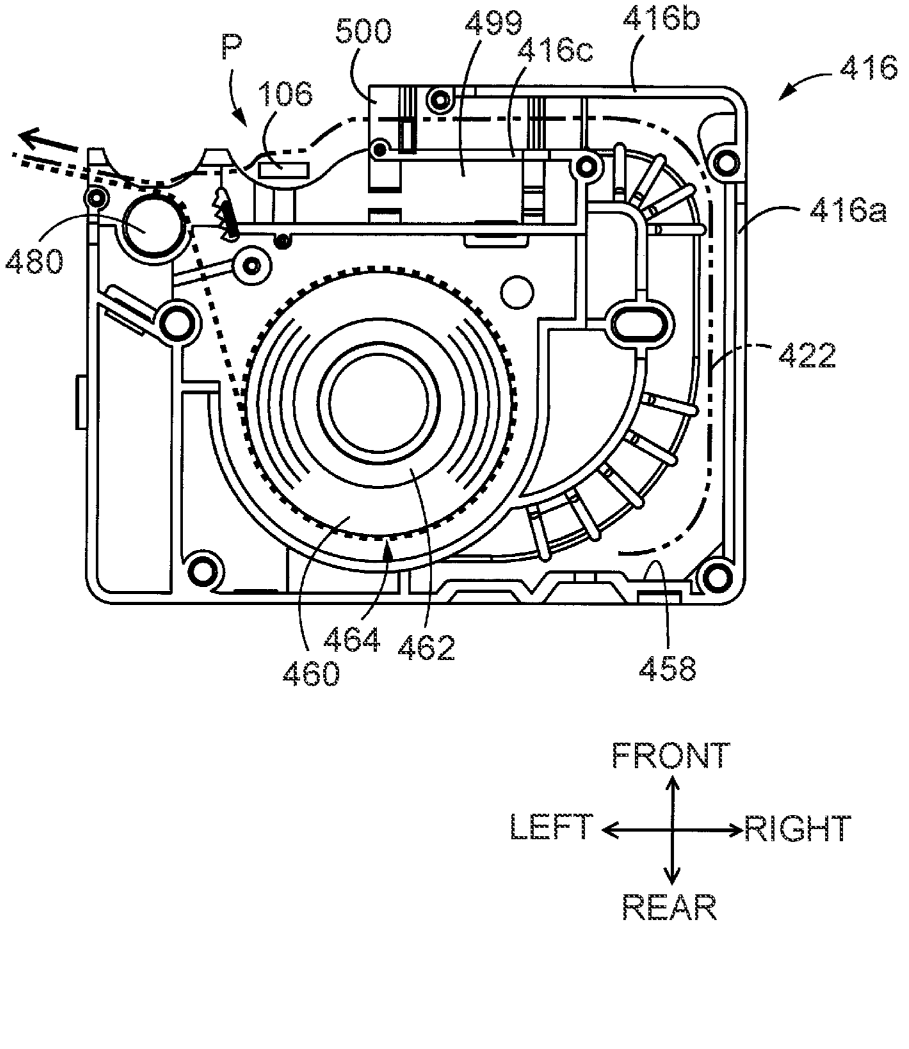
FIG. 47 is a view illustrating a path of the printing tape drawn from the printing tape roll, and a path of a laminating tape drawn from a laminating tape roll, using a view illustrating the lower surface of the third case member of FIG. 36.

FIG. 47 illustrates the lower surface of the third case member 416 in a state where the cassette 10 is mounted on the cassette mounting portion 104 of the printing device 102. The printing tape 422 is drawn from the printing tape roll 426 and is routed such that the printing tape 422 obliquely extends from the first space S1 of the tape case 420 to the second space S2 of the ribbon case 421 via the through hole 452 and the through hole 458. Thus, in FIG. 47 illustrating the third case member 416, the printing tape 422 is illustrated as extending from the through hole 458 defined at the rear end portion of the third case member 416. For the cassette 410 mounted on the cassette mounting portion 104 on which the roller drive shaft 110 stands, the roller 480, which is driven to rotate by the roller drive shaft 110, conveys the printing tape 422 and the laminating tape 460 while nipping them. The printing tape 422 is thus drawn from the printing tape roll 426 between the print head 106 and the platen roller 116 and discharged from the outlet 500. In FIG. 47, the path of the printing tape 422 is indicated by a double-dotted-and-dashed line, and the path of the laminating tape 460 is indicated by a dashed line. In FIG. 47, in response to the roller 480 being driven to rotate, the printing tape 422 is drawn from the outlet 500 toward the printing position P, where the laminating tape 460 is stacked by the roller 480. The outlet 500 is an opening that is defined by the left end portion of the second sidewall 416*b* and the left end portion of the inner wall 416*h* and is open in the left-right direction.

At the printing position P between the print head 106 and the platen roller 116, the printing tape 422 is pressed to the print head 106. In this state, heating elements disposed at a surface of the print head 106 are selectively driven to generate heat locally, causing the to-be-printed tape 422*a* of the printing tape 422 to develop color by itself, whereby characters, symbols, and other representations are printed on the printing tape 422.

FIG. 48 schematically illustrates a lamination structure of the printing tape 422 discharged from the cassette 410. The printing tape 422 is a laminate of the to-be-printed tape 422*a*, the adhesive 422*b*, and the release tape 422*c*. The release tape 422*c* is adhered to a non-print surface of the to-be-printed tape 422*a* via the adhesive 422*b*. The local color-developing areas 422*d* are formed in the to-be-printed tape 422*a* A transparent film 460*a* of the laminating tape 460 is stacked on the to-be-printed tape 422*a* as a base of the printing tape 422 via an adhesive tape 460*b*.

Figure 49:
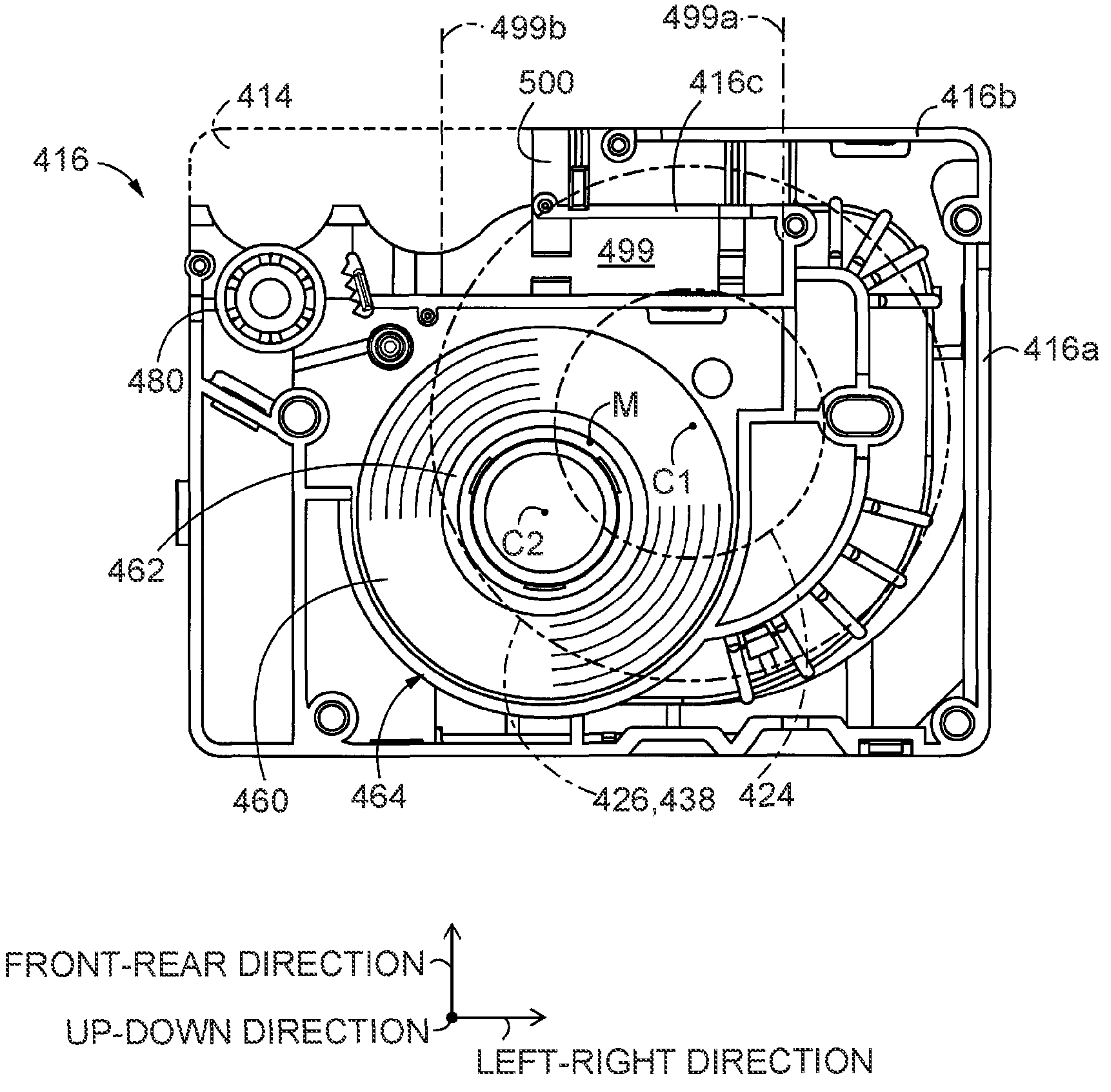
FIG. 49 is a view of the cassette of FIG. 36, illustrating relative positions of the printing tape roll, the laminating tape roll, and a recess.

FIG. 49 illustrates the lower surface of the third case member 416. The laminating tape roll 464 is accommodated in the second space S2 defined between the third case member 416 and the fourth case member 418, that is, in the ribbon case 421. As described above, the ribbon case 421 is disposed below the tape case 420 in a stacked manner. In a case where the printing tape roll 426 and the spacer films 438 accommodated in the tape case 420 are projected in the up-down direction onto a projection plane extending in the front-rear direction and the right-left direction in the second space S2, projected positions of the printing tape roll 426 and the spacer films 438 are indicated by a dotted-and-dashed line in FIG. 49. The spacer films 438 have the same diameter as the diameter of the printing tape roll 426. In FIG. 49, the dotted-and-dashed line indicates the printing tape roll 426 and the spacer films 438 collectively. As illustrated in FIG. 49, the laminating tape roll 464 is disposed in a position overlapping the printing tape roll 426 in the up-down direction.

At least a portion of the laminating tape roll 464 and the second rotation axis C2 overlap the printing tape roll 426 and the spacer films 438 in the up-down direction. In other words, at least a portion of the laminating tape roll 464 and the second rotation axis C2 are located in a projected area of the printing tape roll 426 and the spacer films 438 in the up-down direction.

In FIG. 49, the printing tape roll 426 and the spacer films 438 overlap at least a portion of the laminating tape roll 464, the second rotation axis C2, at least a portion of the recess 499, and at least a portion of the recess wall 416*c* in the up-down direction. At least a portion of the laminating tape roll 464, the second rotation axis C2, at least a portion of the recess 499, and at least a portion of the recess wall 416*c* are located in a projected area of the printing tape roll 426 and the spacer films 438 projected in the up-down direction. At least a portion of the recess 499 and at least a portion of the recess wall 416*c* overlap the printing tape spool 424 in the up-down direction. In the left-right direction, the first rotation axis C1 that is a rotation axis of the printing tape roll 426 and the printing tape spool 424 is located between a right end 499*a*, which is one end in the left-right direction, and left end 499*b*, which is the other end in the left-right direction, of the recess 499. The first rotation axis C1 that is a rotation axis of the printing tape spool 426 is located between the outlet 500 and the right end 499*a* of the recess 499 in the left-right direction. In FIG. 49, a center position M is a center of the cassette 410 in both the front-rear direction and the left-right direction. The distance from the center position M to the first rotation axis C1 of the printing tape roll 426 is less than the distance from the center position M to the recess 499 in the front-rear direction and the left-right direction.

Similarly to the above-described first and second embodiments, the cassette 410 according to the present embodiment includes: (a) a printing tape roll 426 being rotatable and into which a printing tape 422 as a medium to be printed is wound; and (b) an outer peripheral wall 415 disposed on one side in a first direction relative to the printing tape roll 426, the first direction being a width direction of the printing tape 422, the outer peripheral wall 415 defining; a first sidewall 416*a* extending in a second direction orthogonal to the first direction; a second sidewall 4216*b* extending in a third direction orthogonal to the first direction and intersecting with the second direction; and a recess wall 416*c* shaped like a U letter to define a recess 499 extending in the third direction on one side in the second direction from the second sidewall 4216*b*, and (c) at least a portion of the recess 499 overlaps the printing tape roll 426 in the first direction. The cassette 410 is thus downsized in a direction orthogonal to the up-down direction, as the tape case 420 including the printing tape roll 426 and the ribbon case 421 including the recess wall 416*c* overlap each other in the first direction, that is, the up-down direction, and at least a portion of the recess 499 overlaps the printing tape roll 426 in the first direction.

According to the cassette 410 of the present embodiment, in the printing tape roll 424, the printing tape 422 is wound around the printing tape spool 424 that is rotatable, and at least a portion of the recess wall 416*c* overlaps the printing tape spool 424 in the first direction. The cassette 410 can thus be downsized in a direction orthogonal to the up-down direction as compared with a case where at least a portion of the recess wall 416*c* does not overlap the printing tape spool 426 in the first direction.

According to the cassette 410 of the present embodiment, at least a portion of the recess 499 overlaps the printing tape spool 424 in the first direction. The cassette 410 can thus be downsized in a direction orthogonal to the up-down direction as compared with a case where at least a portion of the recess 499 does not overlap the printing tape spool 424 in the first direction.

According to the cassette 410 of the present embodiment, the first rotation axis C1 that is a rotation axis of the printing tape roll 426 is located between one end and of the recess 499 and the other end thereof in the third direction. The cassette 410 can thus be downsized in a direction orthogonal to the up-down direction as compared with a case where the first rotation axis C1 is not located between one end of the recess 499 and the other end thereof in the third direction.

According to the cassette 410 of the present embodiment, in the printing tape roll 426, the printing tape 422 is wound around the printing tape spool 424 that is rotatable, and at least a portion of the printing tape spool 424 is located between one end of the recess 499 and the other end thereof in the third direction. The cassette can thus be downsized in a direction orthogonal to the up-down direction as compared with a case where at least a portion of the printing tape spool 424 is not located between one end of the recess 499 and the other end thereof in the third direction.

According to the cassette 410 of the present embodiment, the first rotation axis C1 that is a rotation axis of the printing tape roll 424 is located between the outlet 500 and one end of the recess 499 in the third direction. The cassette 410 can thus be downsized in a direction orthogonal to the up-down direction as compared with a case where the first rotation axis C1 of the printing tape spool 424 is not located between the outlet 500 and one end of the recess 99 in the third direction.

According to the cassette 410 of the present embodiment, the recess 299 overlaps at least a portion of the tape case (e.g., a first case) 420 in the first direction. The cassette 410 can thus be downsized in a direction orthogonal to the up-down direction as compared with a case where the recess 299 does not overlap at least a portion of the first case 210 in the first direction.

According to the cassette 410 of the present embodiment, the cassette 410 includes the laminating tape roll 264 disposed on one side in the first direction relative to the printing tape roll 426 and in which the laminating tape 460 to be adhered to the printing tape 422 is wound. The laminating tape roll 464 is rotatable. At least a portion of the laminating tape roll 464 overlaps the printing tape roll 426 in the first direction. The cassette 410 can thus be downsized in a direction orthogonal to the up-down direction as compared with a case where at least a portion of the laminating tape roll 464 does not overlap the printing tape roll 426 in the first direction.

According to the cassette 410 of the present embodiment, in the laminating tape roll 464, the laminating tape 460 is wound around the laminating tape spool 462. The laminating tape spool 462 overlaps the printing tape roll 426 in the first direction. The cassette 410 can thus be downsized in a direction orthogonal to the up-down direction as compared with a case where the laminating tape spool 462 does not overlap the printing tape roll 426 in the first direction.

According to the cassette 410 of the present embodiment, the second rotation axis C2 that is a rotation axis of the laminating tape spool 462 is located between one end and of the recess 499 and the other end 416*b* thereof in the third direction. The cassette 410 can thus be downsized in a direction orthogonal to the up-down direction as compared with a case where the second rotation axis C2 of the laminating tape spool 462 is not located between one end of the recess 499 and the other end 416*b* thereof in the third direction.

According to the cassette 410 of the present embodiment, in the second direction and the third direction, the distance from the center position M, which is the center of the cassette 410 in the second direction and the third direction, to the first rotation axis C1 of the printing tape roll 426 is less than the distance from the center position M to the recess 499. The cassette 410 can thus be downsized in a direction orthogonal to the up-down direction as compared with a case where the distance from the center position M of the cassette 410 to the first rotation axis C1 of the printing tape roll 426 is greater than the distance from the center position M to the recess 499.

The cassette 410 according to the present embodiment includes: (a) a printing tape roll 426 into which a printing tape 422 is wound; (b) a spacer film 438 disposed in contact with the printing tape roll 426 in a first direction; and (c) an outer peripheral wall 415 disposed on one side in the first direction relative to the printing tape roll 426 and the spacer film 438, including: a first sidewall 416*a* extending in a second direction orthogonal to the first direction; a second sidewall 416*b* extending in a third direction orthogonal to the first direction and intersecting with the second direction; and a recess wall 416*c* shaped like a U letter to define a recess 499 extending from the second sidewall 416*b* toward one side in the second direction, the recess 499 extending in the third direction on one side in the second direction further than the second sidewall 416*b* (on the left side of FIG. 49), and (d) at least a portion of the recess 499 overlaps the spacer film 438 in the first direction. The cassette 410 can thus be downsized in a direction orthogonal to the up-down direction, as at least a portion of the recess 499 overlaps the spacer film 438 in the first direction.

Fourth Embodiment

Figure 50:
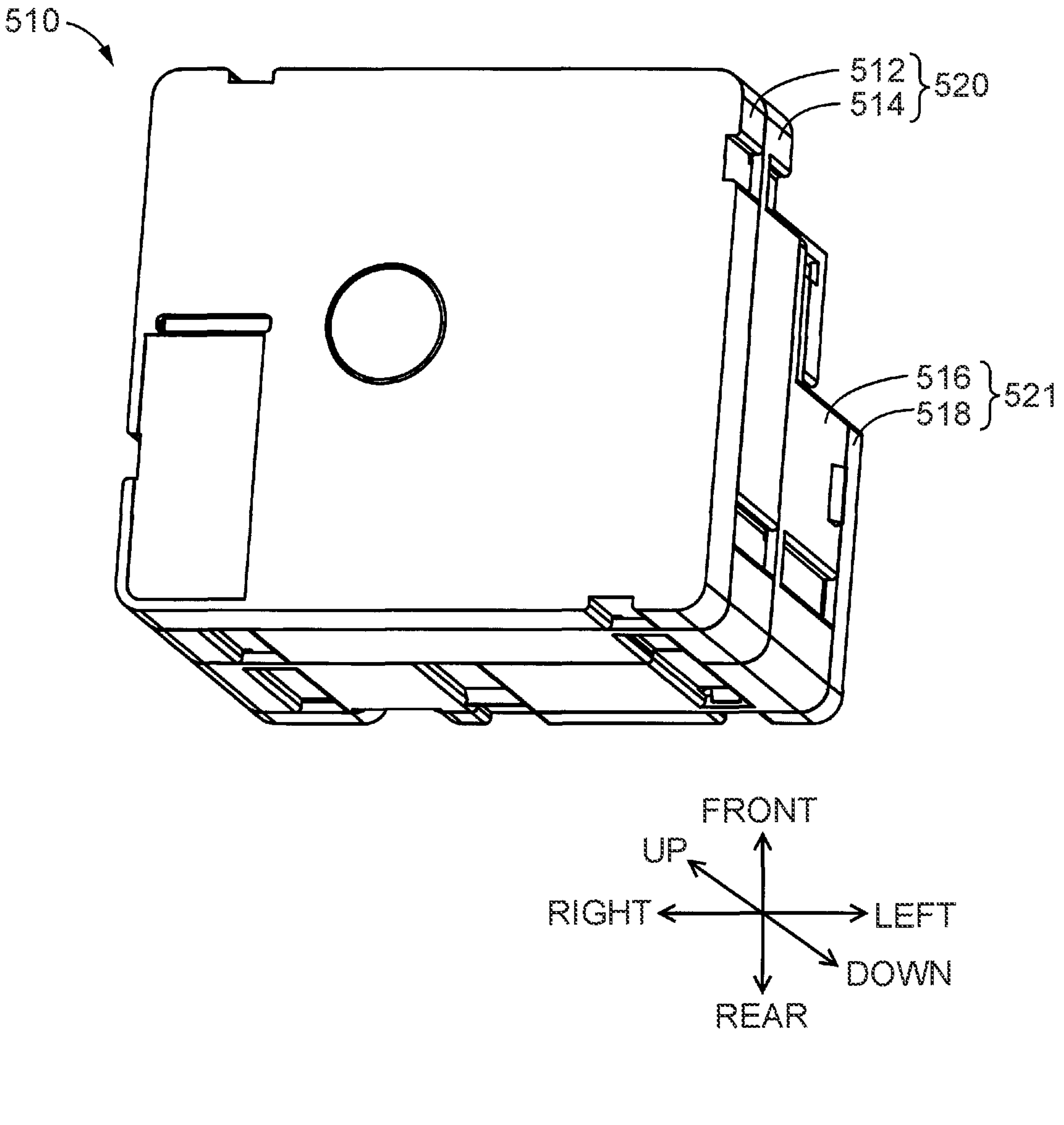
FIG. 50 is a perspective view illustrating an upper surface side of a cassette according to a fourth embodiment of the disclosure.
Figure 51:
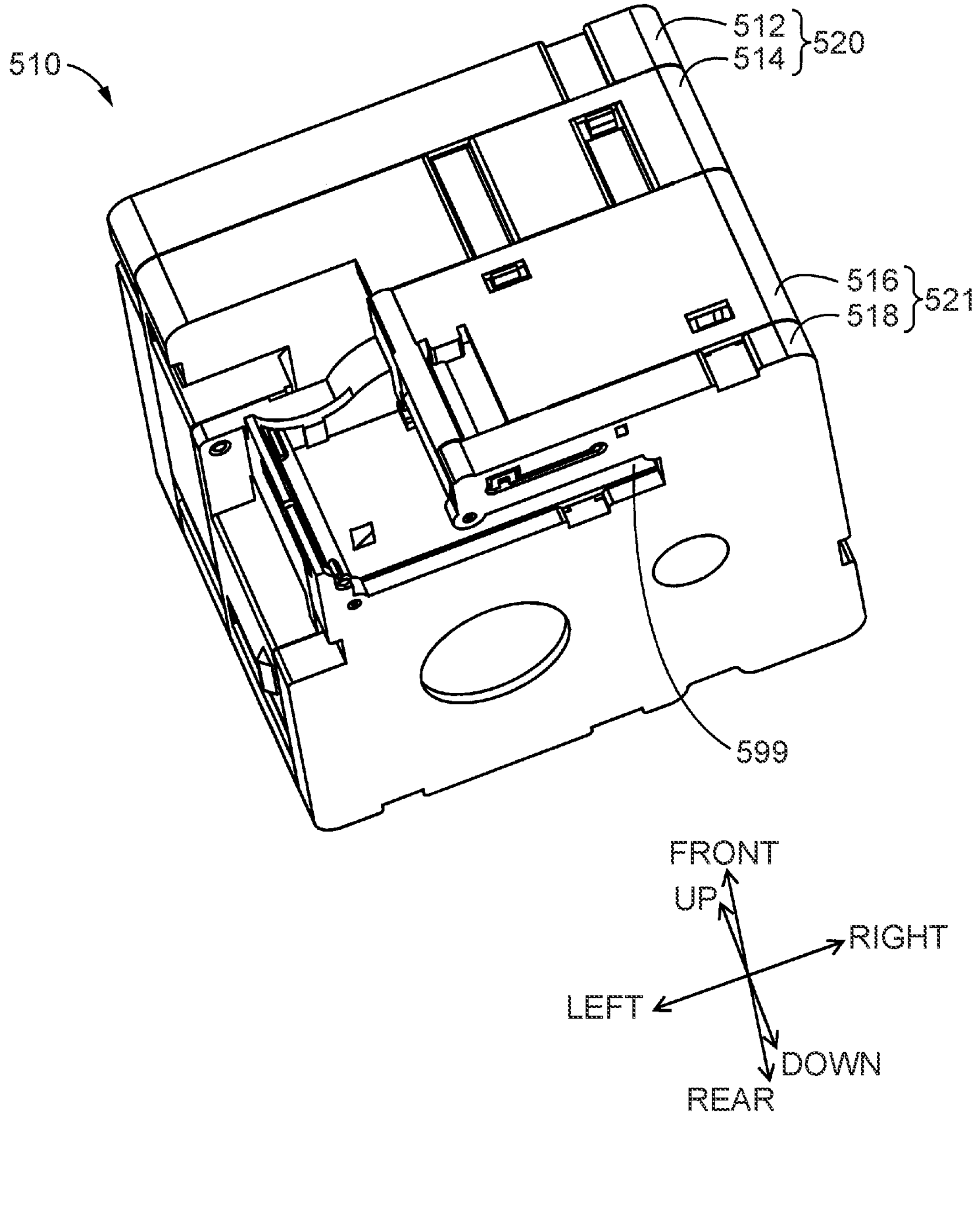
FIG. 51 is a perspective view illustrating a lower surface side of the cassette FIG. 50.
Figure 52:
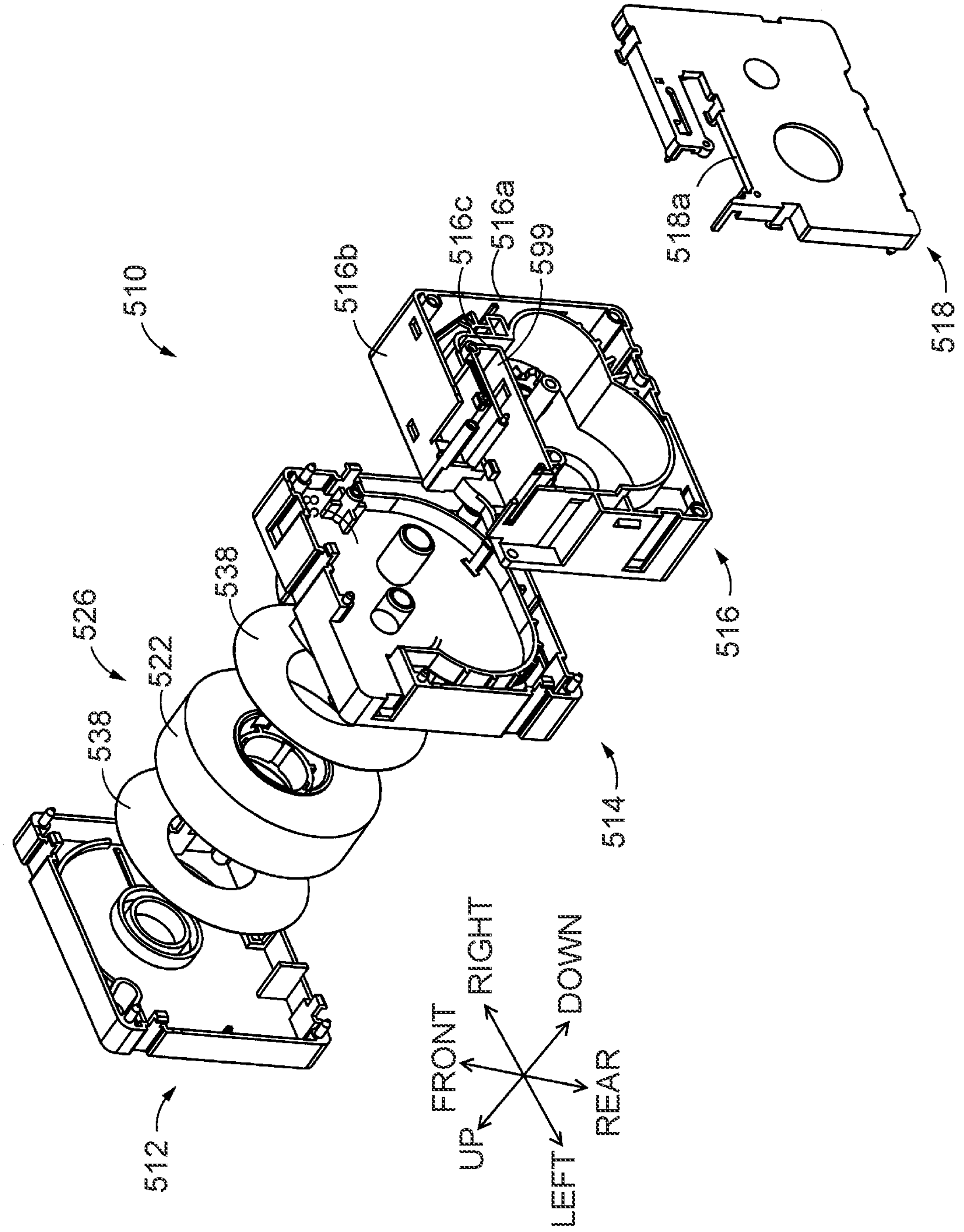
FIG. 52 is a disassembled perspective view of the cassette in the embodiment of FIG. 50, illustrating a configuration of the cassette and a case composed of a first case member, a second case member, a third case member, and a fourth case member.
Figure 53:
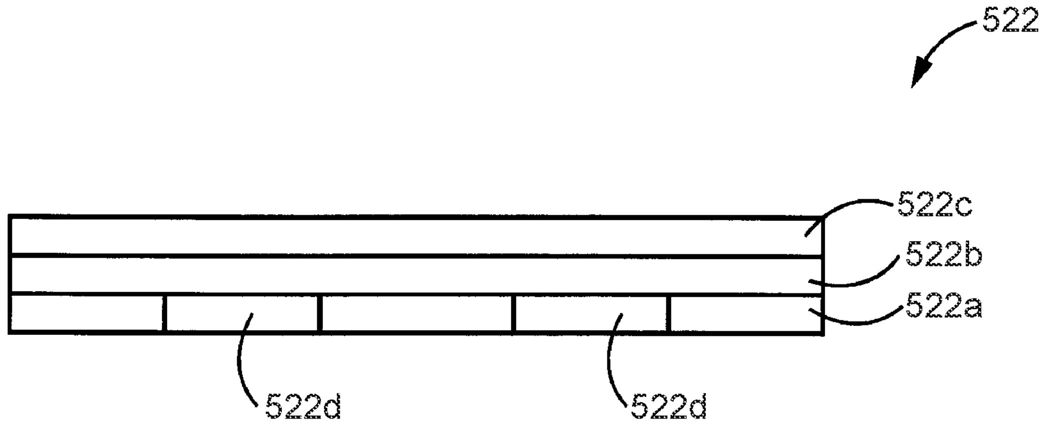
FIG. 53 illustrates the printing tape discharged from the cassette of FIG. 50.

FIG. 50 is a perspective view of an upper surface side of a cassette 510 according to another embodiment of the disclosure. FIG. 51 is a perspective view of a lower surface side of the cassette 510. As illustrated in FIG. 52, the cassette 510 of the present embodiment includes only a printing tape roll 526. In the printing tape roll 526 of the present embodiment, a printing tape 522 is structured by stacking a to-be-printed tape 522*a* as a base, an adhesive 522*b*, and a release tape 522*c*, similarly to the printing tape 422 of the third embodiment. The to-be-printed tape 522*a* has a printing surface. The release tape 522*c* is stacked on a surface opposite to the printing surface of the to-be-printed tape 522*a* via the adhesive 522*b*. FIG. 53 schematically illustrates the printing tape 522 discharged from the cassette 510. The printing tape 522 of the present embodiment is structured by stacking the to-be-printed tape 522*a* as a base formed of a thermal material that develops color by itself, for example, turns black, when subjected to heat, the adhesive 522*b*, and the release tape 522*c*, similarly to the printing tape 422 of the third embodiment illustrated in FIG. 34. The to-be-printed tape 522*a* has the printing surface. The release tape 522*c* is stacked on a surface opposite to the printing surface of the to-be-printed tape 522*a* via the adhesive 522*b*. Local color-developing areas 522*d* are shown in part of the to-be-printed tape 522*a*.

As shown in FIG. 52, the cassette 510 of the present embodiment is composed of a first case member 512, a second case member 514, a third case member 516, and a fourth case member 518, which are structured similarly to the first case member 212, the second case member 214, the third case member 216, and the fourth case member 218 of the cassette 210 of FIG. 21 of the second embodiment. The cassette 510 differs from the cassette 210 in that it does not include the ink ribbon roll 272 where the ink ribbon 268 is wound around the feed spool 270 and the take-up spool 276 for taking up the ink ribbon 268.

According to the cassette 510 of the present embodiment, as the third case member 516 of the cassette 510 includes a first sidewall 516*a*, a second sidewall 516*b*, and a recess wall 516*c* defining a recess 599, which are similar to the first sidewall 216*a*, the second sidewall 216*b*, and the recess wall 216*c* defining the recess 299 of the third case member 216 of the cassette 210, the same effects as those of the cassette 210 can be obtained.

The above-described embodiments are merely example embodiments of the disclosure. Various changes may be made without departing from the spirit and scope of the disclosure.

Figure 54:
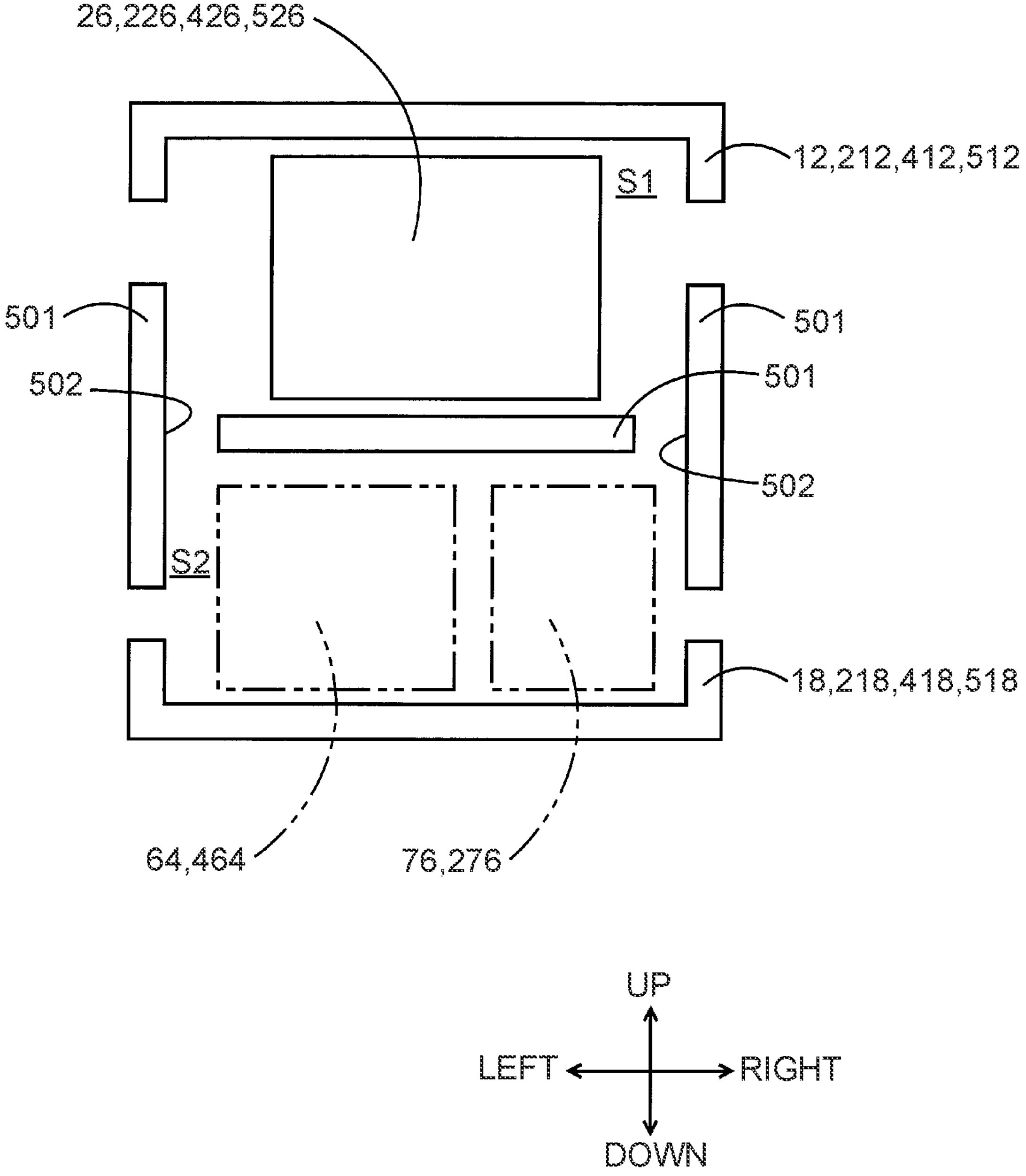
FIG. 54 is a schematic view illustrating a configuration of a cassette according to another embodiment of the disclosure.

The cassette 10, 210, 410, 510 of the above-described embodiments are configured such that four case members, which are the first case member 12, 212, 412, 512 the second case member 14, 214, 414, 514, the third case member 16, 216, 416, 516 and the fourth case member 18, 218, 418, 518, are stacked on each other in the up-down direction. Nevertheless, the cassette 10, 210, 410, 510 is not limited to this configuration. For example, as illustrated in FIG. 54, a cassette 10, 210, 410, 510 may be configured such that three case members, which are the first case member 12, 212, 412, 512, a fifth case member 501, and a fourth case member 18, 218, 418, 518, are stacked on each other in the up-down direction. The fifth case member 501 has a through hole 502 penetrating therethrough. The through hole 502 corresponds to the through hole 52, 58 of the above-described embodiments, and separates a first space S1 and a second space S2 from each other. The fifth case member 501 may be configured such that its upper surface side has a shape similar to the upper surface side of the second case member 14, 214, 414, 514 and its lower surface side has a shape similar to the lower surface side of the third case member 16, 216, 416, 516. In this modification, the first case member 12, 212, 412, 512 and the fifth case member 501 constitute a first case having the first space S1 therein, and the fifth case member 501 and the fourth case member 18, 218, 418, 518 constitute a second case having the second space S2 therein.

In the above embodiment, the recess 99, 299, 499, 599 has a shape surrounded by the U-shaped recess wall 16*c*, 216*c*, 416*c*, 516*c*, but is not limited to this shape. For example, it may be a circular recess.

In the above-described embodiments, the printing tape roll, the laminating tape roll, the ink ribbon roll, and the take-up spool are disposed such that their diameters extends horizontally with respect to the front-rear direction and the right-left direction, but they are not limited to extending horizontally. For example, in a case where the printing tape roll is not provided horizontally with respect to the front-rear direction and the left-right direction, the first direction which is the width direction of the printing tape is a direction different from the up-down direction of the above-described embodiments. In this case, the second direction orthogonal to the first direction, which is the width direction of the printing tape, and the third direction orthogonal to the first direction and the second direction are each different from the front-rear direction and the left-right direction of the above embodiments.

The positions of the printing tape, the laminating tape roll, the ink ribbon roll, and the take-up spool are not limited to positions illustrated in the above-described embodiments. For example, in the first embodiment, the laminating tape roll 64 may be disposed further to the right than the take-up spool 76, and the take-up spool 76 may be disposed further to the front than the ink ribbon roll 72.

In the first embodiment, all of the recess 99, the laminating tape roll 64, the feed spool 70, and the take-up spool 76 are disposed in positions overlapping the printing tape roll 26 in the up-down direction, but are not limited to this configuration. It is only required that at least the recess 99 is disposed at a position overlapping the printing tape roll 26 in the up-down direction. Similarly, it is only required that, in the second to fourth embodiments, at least the recess is disposed in a position overlapping the printing tape roll in the vertical direction. Further, in the above-mentioned first to fourth embodiments, the recess or the recess wall overlaps the printing tape spool in the up-down direction, but it is only required that at least the recess or the recess wall may overlaps the printing tape wound around the printing tape spool in the up-down direction.

The printing tape roll of the above-described first to fourth embodiments are configured such that the printing tape is wound around the printing tape spool that is a cylindrical shaft core member. However, the printing tape roll may be configured such that the printing tape is wound around the first support projection and the second support projection, without being wound around the printing tape spool. Similarly, the laminating tape 60 may be rolled without being wound around the laminating tape spool 62, and be located with the outer periphery of the laminating tape 60 defined by the laminating tape roll holding wall 84 and the arc-shaped wall 92.

What is claimed is:

1. A cassette comprising:

a printing tape roll being rotatable and into which a printing tape as a medium to be printed is wound; and an outer peripheral wall disposed on one side in a first direction relative to the printing tape roll, the first direction being a width direction of the printing tape, the outer peripheral wall including:

a first side wall extending in a second direction orthogonal to the first direction;

a second side wall extending in a third direction orthogonal to the first direction and intersecting with the second direction; and a recess wall defining a recess extending from the second side wall toward one side in the second direction, the recess extending in the third direction on one side in the second direction further than the second side wall, wherein at least a portion of the recess overlaps the printing tape roll in the first direction.

2. The cassette according to claim 1, wherein, in the printing tape roll, the printing tape is wound around a printing tape spool being rotatable, and wherein at least a portion of the recess wall overlaps the printing tape spool in the first direction.

3. The cassette according to claim 2, wherein at least a portion of the recess overlaps the printing tape spool in the first direction.

4. The cassette according to claim 1, wherein, in the third direction, a rotation axis of the printing tape roll is located between one end of the recess and another end thereof in the third direction.

5. The cassette according to claim 1, wherein, in the printing tape roll, the printing tape is wound around the printing tape spool being rotatable, and wherein, in the third direction, at least a portion of the printing tape spool is located between the one end of the recess and the another end thereof in the third direction.

6. The cassette according to claim 5, wherein, in the third direction, a rotation axis of the printing tape spool is located between the one end of the recess and the another end thereof in the third direction.

7. The cassette according to claim 6, further comprising:

a first case accommodating therein the printing tape roll; and a second case disposed on the one side in the first direction relative to the first case, the second case having the outer peripheral wall, wherein the second case has an outlet defined by the second side wall, the outlet being located in the third direction between the one end of the recess and the another end thereof in the third direction to discharge the printing tape to be fed from the printing tape roll from the second case toward the recess, and wherein, in the third direction, the rotation axis of the printing tape spool is located between the outlet and the one end of the recess in the third direction.

8. The cassette according to claim 7, wherein the recess overlaps at least a portion of the first case in the first direction.

9. The cassette according to claim 1, further comprising:

a feed spool rotatable and disposed on the one side in the first direction relative to the printing tape roll, the feed spool around which an ink ribbon is wound, the ink ribbon to be used for printing on the printing tape fed from the printing tape roll; and a take-up spool disposed on the one side in the first direction relative to the printing tape roll, the take-up spool being rotatable to take up the ink ribbon fed from the feed spool, wherein at least a portion of the feed spool and at least a portion of the take-up spool overlap the printing tape roll in the first direction.

10. The cassette according to claim 1, further comprising a laminating tape roll into which a laminating tape to be adhered to the printing tape is wound, the laminating tape roll being rotatable and disposed on the one side in the first direction relative to the printing tape roll, wherein at least a portion of the laminating tape roll overlaps the printing tape roll in the first direction.

11. The cassette according to claim 10, wherein, in the laminating tape roll, the laminating tape is wound around a laminating tape spool, wherein the laminating tape spool overlaps the printing tape roll in the first direction.

12. The cassette according to claim 11, wherein, in the third direction, a rotation axis of the laminating tape spool is located between the one end of the recess and the another end thereof in the third direction.

13. The cassette according to claim 1, wherein, in the second direction and the third direction, a distance from a center of the cassette in the second direction and the third direction to the rotation axis of the printing tape roll is less than a distance from the center of the cassette to the recess.

14. A cassette comprising:

a printing tape roll into which a printing tape is wound;

a spacer film disposed in contact with the printing tape roll in a first direction being a width direction of the printing tape; and an outer peripheral wall disposed on one side in the first direction relative to the printing tape roll and the spacer film, the outer peripheral wall including:

a first side wall extending in a second direction orthogonal to the first direction;

a second side wall extending in a third direction orthogonal to the first direction and intersecting with the second direction; and a recess wall defining a recess extending from the second side wall toward one side in the second direction, the recess extending in the third direction on one side in the second direction further than the second side wall, wherein at least a portion of the recess overlaps the spacer film in the first direction.

15. A cassette comprising:

a printing tape roll into which a printing tape as a medium to be printed is wound, the printing tape roll being rotatable about a rotation axis, the rotation axis extending in a first direction; and a recess wall disposed on one side in the first direction relative to the printing tape roll, the recess wall defining a recess configured to receive a print head therein, wherein at least a portion of the recess overlaps the printing tape roll in the first direction.

16. The cassette according to claim 15, further comprising an outer peripheral wall disposed on one side in the first direction relative to the printing tape roll, the outer peripheral wall including:

a first side wall extending in a second direction orthogonal to the first direction; and a second side wall extending in a third direction orthogonal to the first direction and intersecting with the second direction, wherein the recess extends in the third direction.

17. A cassette comprising:

a printing tape roll into which a printing tape as a medium to be printed is wound, the printing tape roll being rotatable about a rotation axis, the rotation axis extending in a first direction; and a recess wall disposed on one side in the first direction relative to the printing tape roll, the recess wall defining a recess configured to accommodate a head holding plate for holding a print head, wherein at least a portion of the recess overlaps the printing tape roll in the first direction.

18. The cassette according to claim 17, further comprising an outer peripheral wall disposed on one side in the first direction relative to the printing tape roll, the outer peripheral wall including:

a first side wall extending in a second direction orthogonal to the first direction; and a second side wall extending in a third direction orthogonal to the first direction and intersecting with the second direction, wherein the recess extends in the third direction.

19. A cassette comprising:

a printing tape roll into which a printing tape as a medium to be printed is wound, the printing tape roll being rotatable about a rotation axis, the rotation axis extending in a first direction; and a print-head recess configured to receive a print head therein, the print-head recess disposed on one side in the first direction relative to the printing tape roll, wherein at least a portion of the print-head recess overlaps the printing tape roll in the first direction.

20. The cassette according to claim 19, further comprising a recess wall defining the print-head recess.

21. A cassette comprising:

a printing tape roll into which a printing tape as a medium to be printed is wound; and an outer peripheral wall disposed on one side in a first direction relative to the printing tape roll, the first direction being a width direction of the printing tape, the outer peripheral wall including:

a first side wall extending in a second direction orthogonal to the first direction;

a second side wall extending in a third direction orthogonal to the first direction and intersecting with the second direction; and a recess wall defining a recess configured to receive a print head therein, the recess extending in the third direction, wherein at least a portion of the recess overlaps the printing tape roll in the first direction.

* * * * *